United States Patent
King et al.

(10) Patent No.: US 8,387,443 B2
(45) Date of Patent: Mar. 5, 2013

(54) MICROCANTILEVER WITH REDUCED SECOND HARMONIC WHILE IN CONTACT WITH A SURFACE AND NANO SCALE INFRARED SPECTROMETER

(75) Inventors: William P. King, Champaign, IL (US); Jonathan R. Felts, Buford, GA (US); Craig Prater, Santa Barbara, CA (US); Kevin Kjoller, Santa Barbara, CA (US)

(73) Assignees: The Board of Trustees of The University of Illinois, Urbana, IL (US); Anasys Instruments, Santa Barbara, CA (US)

(*) Notice: Subject to any disclaimer, the term of this patent is extended or adjusted under 35 U.S.C. 154(b) by 721 days.

(21) Appl. No.: 12/558,150

(22) Filed: Sep. 11, 2009

(65) Prior Publication Data

US 2011/0061452 A1   Mar. 17, 2011

(51) Int. Cl.
*G01B 5/28* (2006.01)
(52) U.S. Cl. .......................................... 73/105
(58) Field of Classification Search ........................ None
See application file for complete search history.

(56) References Cited

U.S. PATENT DOCUMENTS

| | | |
|---|---|---|
| 2,175,696 A | 10/1939 | Lederer |
| 3,610,986 A | 10/1971 | King |
| 4,166,269 A | 8/1979 | Stephens et al. |
| 4,933,108 A | 6/1990 | Soredal |
| 5,345,815 A | 9/1994 | Albrecht et al. |
| 5,386,720 A | 2/1995 | Toda et al. |
| 5,441,343 A | 8/1995 | Pylkki et al. |
| 5,444,244 A | 8/1995 | Kirk et al. |
| 5,451,371 A | 9/1995 | Zanini-Fisher et al. |
| 5,463,277 A | 10/1995 | Kimura et al. |
| 5,464,966 A | 11/1995 | Gaitan et al. |
| 5,468,959 A | 11/1995 | Tohda et al. |
| 5,583,286 A | 12/1996 | Matsuyama |
| 5,801,070 A | 9/1998 | Zanini-Fisher et al. |
| 5,929,438 A | 7/1999 | Suzuki et al. |
| 5,936,237 A | 8/1999 | van der Weide |
| 5,969,238 A | 10/1999 | Fischer |
| RE36,488 E | 1/2000 | Elings et al. |
| 6,050,722 A | 4/2000 | Thundat et al. |

(Continued)

FOREIGN PATENT DOCUMENTS

| | | |
|---|---|---|
| WO | 94/10822 | 5/1994 |
| WO | 03/011747 | 2/2003 |

(Continued)

OTHER PUBLICATIONS

French, P.J. (2002) "Polysilicon: A Versatile Material for Microsystems," *Sens Actuators A* 99:3-12.

(Continued)

*Primary Examiner* — Andre Allen
(74) *Attorney, Agent, or Firm* — Lathrop & Gage LLP

(57) ABSTRACT

Described herein are devices and methods for sensing pulsed forces. Some of the described devices and methods are also useful for measuring infrared absorbances and compiling spectral and chemical maps of surfaces. Also described are microcantilever having reduced harmonic frequencies when operating in contact mode. Some of the described microcantilevers comprise an internal resonator configured to vibrate substantially independent of friction between the microcantilever tip and a surface when the microcantilever operates in contact mode. A number of the described devices and methods are useful for monitoring pulsed forces with enhanced sensitivity.

34 Claims, 42 Drawing Sheets

U.S. PATENT DOCUMENTS

| | | | |
|---|---|---|---|
| 6,073,485 A | 6/2000 | Kitamura | |
| 6,079,255 A | 6/2000 | Binnig et al. | |
| 6,094,971 A | 8/2000 | Edwards et al. | |
| 6,096,559 A | 8/2000 | Thundat et al. | |
| 6,097,197 A | 8/2000 | Matsuyama et al. | |
| 6,233,206 B1 | 5/2001 | Hamann et al. | |
| 6,261,469 B1 | 7/2001 | Zakhidov et al. | |
| 6,383,823 B1 | 5/2002 | Takahashi et al. | |
| 6,436,346 B1 | 8/2002 | Doktycz et al. | |
| 6,452,170 B1 | 9/2002 | Zypman et al. | |
| 6,467,951 B1 | 10/2002 | Ghoshal | |
| 6,487,515 B1 | 11/2002 | Ghoshal | |
| 6,507,328 B1 | 1/2003 | Lee | |
| 6,535,824 B1 | 3/2003 | Mansky et al. | |
| 6,583,412 B2 | 6/2003 | Williams | |
| 6,667,467 B2 | 12/2003 | Shimizu et al. | |
| 6,668,627 B2 | 12/2003 | Lange et al. | |
| 6,762,402 B2 | 7/2004 | Choi et al. | |
| 6,763,705 B1 | 7/2004 | Thundat et al. | |
| 6,785,041 B1 | 8/2004 | Vodopyanov | |
| 6,862,923 B2 | 3/2005 | Buguin et al. | |
| 6,865,044 B1 | 3/2005 | Albrecht et al. | |
| 6,880,386 B1 | 4/2005 | Krotil et al. | |
| 6,893,884 B2 | 5/2005 | Shi et al. | |
| 6,894,272 B2 | 5/2005 | Kranz et al. | |
| 6,930,502 B2 | 8/2005 | Lee et al. | |
| 6,932,504 B2 | 8/2005 | Takahashi et al. | |
| 6,935,167 B1 | 8/2005 | Sahin et al. | |
| 6,983,644 B2 | 1/2006 | Yamanaka et al. | |
| 7,033,840 B1 | 4/2006 | Tagge et al. | |
| 7,038,996 B2 | 5/2006 | Binnig et al. | |
| 7,074,340 B2 | 7/2006 | Lugstein et al. | |
| 7,129,486 B2 | 10/2006 | Spizig et al. | |
| 7,155,964 B2 | 1/2007 | Huang et al. | |
| 7,168,298 B1 | 1/2007 | Manginell et al. | |
| 7,208,730 B2 | 4/2007 | Berstis | |
| 7,211,789 B2 | 5/2007 | Berstis | |
| 7,260,980 B2 | 8/2007 | Adams et al. | |
| 7,261,461 B2 | 8/2007 | Grudin et al. | |
| 7,268,348 B2 | 9/2007 | Binning et al. | |
| 7,281,419 B2 | 10/2007 | Wang et al. | |
| 7,291,466 B2 | 11/2007 | Su et al. | |
| 7,404,314 B2 | 7/2008 | Sahin et al. | |
| 7,451,638 B1 | 11/2008 | Sahin et al. | |
| 7,497,613 B2 | 3/2009 | King et al. | |
| 7,521,257 B2 | 4/2009 | Adams et al. | |
| 7,677,088 B2 | 3/2010 | King | |
| 7,723,909 B2 | 5/2010 | Yamaguchi et al. | |
| 7,741,615 B2 | 6/2010 | Putterman et al. | |
| 7,877,816 B2* | 1/2011 | Spizig et al. | 850/10 |
| 7,928,343 B2 | 4/2011 | King et al. | |
| 8,001,830 B2 | 8/2011 | Dazzi et al. | |
| 2003/0081651 A1 | 5/2003 | Gianchandani et al. | |
| 2003/0101006 A1 | 5/2003 | Mansky et al. | |
| 2004/0007680 A1 | 1/2004 | Kim et al. | |
| 2004/0020279 A1 | 2/2004 | Degertekin et al. | |
| 2004/0028119 A1 | 2/2004 | Takahashi et al. | |
| 2004/0195096 A1 | 10/2004 | Tsamis et al. | |
| 2004/0223884 A1 | 11/2004 | Chen et al. | |
| 2004/0228258 A1 | 11/2004 | Binnig et al. | |
| 2005/0017624 A1 | 1/2005 | Novet et al. | |
| 2005/0109081 A1 | 5/2005 | Zribi et al. | |
| 2005/0127926 A1 | 6/2005 | Lee et al. | |
| 2005/0164299 A1 | 7/2005 | Stewart | |
| 2006/0012279 A1 | 1/2006 | Nanataki et al. | |
| 2006/0032289 A1 | 2/2006 | Pinnaduwage et al. | |
| 2006/0040057 A1 | 2/2006 | Sheehan et al. | |
| 2006/0150720 A1 | 7/2006 | Nakayama et al. | |
| 2006/0207317 A1 | 9/2006 | Watanabe | |
| 2006/0222047 A1 | 10/2006 | Reading | |
| 2006/0238206 A1 | 10/2006 | Eng et al. | |
| 2006/0254345 A1 | 11/2006 | King et al. | |
| 2006/0289510 A1 | 12/2006 | Atkins et al. | |
| 2007/0012094 A1* | 1/2007 | Degertekin et al. | 73/105 |
| 2007/0063141 A1 | 3/2007 | Duerig et al. | |
| 2007/0103697 A1* | 5/2007 | Degertekin | 356/501 |
| 2007/0107502 A1* | 5/2007 | Degertekin | 73/105 |
| 2007/0109091 A1 | 5/2007 | Landsberger et al. | |
| 2007/0114401 A1 | 5/2007 | King et al. | |
| 2007/0125753 A1 | 6/2007 | Fink et al. | |
| 2007/0189920 A1 | 8/2007 | Gimzewski | |
| 2007/0190562 A1 | 8/2007 | Berstis | |
| 2007/0193347 A1 | 8/2007 | Bradshaw et al. | |
| 2007/0286254 A1 | 12/2007 | Fon et al. | |
| 2007/0295064 A1* | 12/2007 | Degertekin et al. | 73/105 |
| 2008/0093226 A1 | 4/2008 | Briman et al. | |
| 2008/0150656 A1 | 6/2008 | Hagelin et al. | |
| 2008/0283755 A1 | 11/2008 | Dazzi et al. | |
| 2008/0295583 A1 | 12/2008 | Giessibl | |
| 2008/0307865 A1* | 12/2008 | Degertekin | 73/105 |
| 2009/0013770 A1 | 1/2009 | Proksch et al. | |
| 2009/0056428 A1 | 3/2009 | King | |
| 2009/0139340 A1 | 6/2009 | King et al. | |
| 2009/0249521 A1 | 10/2009 | Dazzi et al. | |
| 2010/0127170 A1 | 5/2010 | Fujita et al. | |
| 2011/0030109 A1 | 2/2011 | Saito | |
| 2011/0074293 A1 | 3/2011 | Hagmann | |
| 2011/0078834 A1 | 3/2011 | King | |
| 2011/0126329 A1 | 5/2011 | Despont et al. | |
| 2011/0154546 A1 | 6/2011 | Proksch et al. | |
| 2011/0167524 A1 | 7/2011 | Hu et al. | |
| 2011/0268148 A1 | 11/2011 | King et al. | |

FOREIGN PATENT DOCUMENTS

| | | |
|---|---|---|
| WO | 2006/046924 | 5/2006 |
| WO | 2006/073426 | 7/2006 |
| WO | 2006/107991 | 11/2006 |
| WO | 2007/011364 | 1/2007 |
| WO | 2007/026177 | 3/2007 |
| WO | 2008/143817 | 11/2008 |
| WO | 2009/097487 | 8/2009 |
| WO | 2010/022285 | 2/2010 |
| WO | WO 01/20283 | 3/2011 |

OTHER PUBLICATIONS

Asano et al. (Sep. 1992) "Field-Excited Electron Emission from Ferroelectric Ceramic in Vacuum," *Jpn. J. Appl. Phys.* 31(9B):3098-3101.

Auciello et al. (1995) "Low Voltage Electron Emission from $Pb(Zr_xTi_{1-x})O_3$-Based Thin Film Cathodes," *Appl. Phys. Lett.* 66:2183-2185.

Bhatia et al. (2011) "High-Temperature Piezoresponse Force Microscopy," *Appl. Phys. Lett.* 99:173103.

Bian et al. (2007) "Electron Emission from $SrTiO_3$-Coated Silicon-Tip Arrays," *J. Vac. Sci. Technol. B* 21:817-821.

Bian et al. (2009) "Field Emission Properties of Si Tip Arrays Coated with N-Doped $SrTiO_3$ Thin Films at Different Substrate Temperature," *J. Appl. Phys.* 105:013312.

Buguin et al. (May 7, 2001) "Active Atomic Force Microscopy Cantilevers for Imaging in Liquids," *Appl. Phys. Lett.* 78(19):2982-2984.

Byer et al. (1972) "Pyroelectric Coefficient Direct Measurement Technique and Application to a nsec Response Time Detector," *Ferroelectrics* 3:333-338.

Cahill, D.G. (1990) "Thermal Conductivity Measurement from 30 to 750K: The 3ω Method," *Rev. Sci. Instrum.* 61(2):802-808.

Chandra et al. (2007) "A Landau Primer for Ferroelectrics," In; *Physics of Ferroelectrics, Spring Topics in Applied Physics* 105:69-116.

Chen et al. (May 2008) "Si Field Emitter Arrays Coated with Thin Ferroelectric Films," *Ceram. Int.* 34:971-977.

Choi et al. (2004) "Enhancement of Ferroelectricity in Strained $BaTiO_3$ Thin Films," *Science* 306:1005-1009.

Chu et al. (2006) "Nanoscale Domain Control in Multiferroic $BiFeO_3$ Thin Films," *Adv. Mater.* 18:2307-2311.

Chu et al. (2007) "Domain Control in Multiferroic $BiFeO_3$ Through Substrate Vicinality," *Adv. Mater.* 19:2662-2666.

Chu et al. (Jun. 2008) "Electric-Field Control of Local Ferromagnetism Using a Magnetoelectric Multiferroic," *Nature Mater.* 7:478-482 Plus Corrigendum, p. 678 Aug. 2008.

Chu et al. (2009) "Nanoscale Control of Domain Architectures in $BiFeO_3$ Thin Films," *Nano Lett.* 9:1726-1730.

Dames et al. (2005) "1ω, 2ω, and 3ω Methods for Measurements of Thermal Properties," *Rev. Sci. Instrum.* 76(12):124902.

Damodaran et al. (2011) "Nanoscale Structure and Mechanism for Enhanced Electromechanical Response of Highly-Strained BiFeO$_3$ Thin Films," *Adv. Mater.* 23:3170-3175.

Dunaevsky et al. (Jun. 15, 1999) "Electron/Ion Emission from the Plasma Formed on the Surface of Ferroelectrics. I. Studies of Plasma Parameters without Applying and Extracting Voltage," *J. Appl. Phys.* 85(12):8464-8473.

Enders et al. (2004) "Lorentz-Force-Induced Excitation of Cantilevers for Oscillation-Mode Scanning Probe Microscopy," *Surf. Interface Anal.* 36(2):119-123.

Gundel et al. (1989) "Copious Electron Emission from PLZT Ceramics with High Zirconium Concentration," *Ferroelectrics* 100:1-16.

Gundel et al. (1990) "Electric Field-Excited Electron Emission from PLZT-X/65/35 Ceramics," *Ferroelectrics* 110:183-192.

Gundel et al. (Jan. 1991) "Time-Dependent Electron Emission frrom Ferroelectrics by External Pulsed Electric Fields," *J. Appl. Phys.* 69(2):975-982.

Hammiche et al. (Feb. 2004) "Progress in Near-Field Photothermal Infra-Red Microscopy," *J. Microscopy* 213(2):129-134.

Higa et al. (1998) "Gated Si Field Emitter Array Prepared by Using Anodization," *J. Vac. Sci. Technol. B* 16(2):651-653.

Hii et al. (2006) "Characterizing Field Emission from Individual Carbon Nanotubes at Small Distances," *J. Vac. Sci. Technol. B* 24(3):1081-1087.

Jensen et al. (2010) "Emittance of a Field Emission Electron Source," *J. Appl. Phys.* 107:014903.

Jensenius et al. (May 1, 2000) "A Microcantilever-Based Alcohol Vapor Sensor-Application and Response Model," *Appl. Phys. Lett.* 76(18):2615-2617.

Kang et al. (2003) "Effect of Annealing Temperature on the Electron Emission Characteristics of Silicon Tips Coated with $Ba_{0.67}Sr_{0.33}TiO_3$ Thin Film," *J. Vac. Sci. Technol. B* 21(1):453-457.

Kang et al. (May/Jun. 2001) "Electron Emission from Silicon Tips Coated with Sol-Gel $(Ba_{0.67}Sr_{0.33})TiO_3$ Ferrolelectric Thin Film," *J. Vac. Sci. Technol. B* 19(3):1073-1076.

Krasik et al. (Feb. 2003) "Ferroelectric Plasma Sources and Their Applications," *IEEE Trans. Plasma Sci.* 31(1):49-59.

Lang et al. (Aug. 2005) "Pyroelectricity: From Ancient Curiosity to Modern Imaging Tool," *Phys. Today* :31-36.

Lee et al. (1998) "Fabrication and Characterization of Silicon Field Emitter Arrays by Spin-On-Glass Etch Back," *J. Vac. Sci. Technol. B* 16(1):238-241.

Lee et al. (2007) "Microcantilever Actuation via Periodic Internal Heating," *Rev. Sci. Instrum.* 78(12):126102.

Lee et al. (Dec. 2006) "Electrical, Thermal, and Mechanical Characterization of Silicon Microcantilever Heaters," *J. Microelectromech. Syst.* 15(6):1644-1655.

Lu et al. (2007) "Field Emission of Silicon Emitter Arrays Coated with Sol-Gel $(Ba_{0.65}Sr_{0.35})_{1-x}La_xTiO_3$ Thin Films," *J. Appl. Phys.* 102:014113.

Mandelshtam et al. (1997) "Harmonic Inversion of Time Signals," *J. Chem. Phys.* 107(17):6756-6769.

Mandelshtam et al. (Sep. 8, 1998) Erratum "Harmonic Inversion of Time Signals and Its Applications," [j. Chem. Phys. 107:6756(1997)] *J. Chem. Phys* 109(10):4128.

Martin et al. (2008) "Nanoscale Control of Exchange Bias with BiFeO$_3$ Thin Films," *Nano Lett.* 8(7):2050-2055.

Pabst et al. (2007) "Leakage Mechanisms in BiFeO$_3$ Thin Films," *Appl. Phys. Lett.* 90:072902.

Pantel et al. (2010) "Switching Kinetics in Epitaxial BiFeO$_3$ Thin Films," *Appl. Phys. Lett.* 107:084111.

Pintilie et al. (2009) "Orientation-Dependent Potential Barriers in Case of Epitaxial Pt-BiFeO$_3$-SrRuO$_3$ Capacitors," *Appl. Phys. Lett.* 94:232902.

Pogorelov et al. (2010) "Corrected Field Enhancement Factor for the Floating Sphere Model of Carbon Nanotube Emitter," *J. Appl. Phys.* 108:044502.

Riege (1994) "Electron Emission from Ferroelectrics —A Review," *Nuc. Instr. Meth. Phys. Res. A* 340:80-89.

Rosenblum et al. (1974) "Thermally Stimulated Field Emission from Pyroelectric LiNbO$_3$," *App. Phys. Lett.* 25:17-19.

Rosenman et al. (1984) "Electron Emission During the Switching of Ferroelectric Lead Germanate," *J. Exp. Theor. Phys. Lett.* 39:477-480.

Rosenman et al. (Dec. 2000) "Electron Emission from Ferroelectrics," *J. Appl. Phys.* 88(11):6109-6161.

Rozenman et al. (Dec. 1980) "Exoelectron Emission Accompanying the Transverse Piezoelectric Effect in Lithium Niobate," *Sov. Tech. Phys. Lett.* 6(12):661-662; English translation of; *Pis'ma Zh. Tekh. Fiz.* 6, 1531 (1980).

Salmain et al. (1991) "Fourier Transform Infrared Spectroscopic Method for the Quantitative Trace Analysis of Transition-Metal Carbonyl-Labeled Bioligands," *Anal. Chem.* 63:2323-2329.

Seidel et al. (2009) "Conduction at Domain Walls in Oxide Multiferroics," *Nature Mat.* 8:229-234.

Shannon et al. (1997) "Dual Mode Electron Emission from Ferroelectric Ceramics," *Appl. Phys. Lett.* 70:1625-1627.

Sharp et al. (1982) "Use of Low-Frequency Sinusoidal Temperature Waves to Separate Pyroelectric Currents from Nonpyroelectric Currents. Part II: Experiment," *J. Appl. Phys.* 53:8980-8987.

Shur et al. (1996) "Plasma-Assisted Electron Emission from (Pb,La)(Zr,Ti)O$_3$ Ceramic Cathodes," *J. Appl. Phys.* 79:3669-3674.

Shur et al. (1996) "Surface Discharge Plasma Induced by Spontaneous Polarization Switching," *Appl. Phys. Lett.* 70:574-576.

Shur et al. (1998) "A High-Perveance Ferroelectric Cathode with a Narrowed Electron Energy Spread," *J. Phys. D: Appl. Phys.* 31:1375-1382.

Shur et al. (1999) "Two Modes of Plasma-Assisted Electron Emission from Ferroelectric Ceramics," *J. Phys. D: Appl. Phys.* 32:L29-L33.

Sulchek et al. (May 2000) "High-Speed Atomic Force Microscopy in Liquid," *Rev. Sci. Instrum.* 71(5):2097-2099.

Vodopyanov et al. (2003) "Pulsed Mid-IR Optical Parametric Oscillators," in *Solid-State Mid-Infrared Laser Sources*; Sorokina et al. Eds. *Topics Appl. Phys.* 89:141-178.

Xiao et al. (2008) "Large Pyroelectric Effect in Undoped Epitaxial Pb(Zr, Ti)O$_3$ Thin Films on SrTiO$_3$ Substrates," *Appl. Phys. Lett.* 93:052913.

Yang et al. (2010) Above-Bandgap Voltages from Ferroelectric Photovoltaic Devices, *Nature Nanotechnol.* 5:143-147.

Yu et al. (Jul. 19, 2010) "Interface Ferromagnetism and Orbital Reconstruction in BiFeO$_3$-La$_{0.7}$Sr$_{0.3}$MnO$_3$ Heterostructures," *Phys. Rev. Lett.* 105:027201.

Zeches et al. (Nov. 13, 2009) "A Strain-driven Morphotropic Phase Boundary in BiFeO$_3$," *Science* 326(5955):977-980.

Zhang et al. (Feb. 2011) "Large Field-Induced Strains in a Lead-Free Piezoelectric Material," *Nature Nanotechnol.* 6:98-102.

Zhao et al, (2006) "Thermal Contributions to the Bending of Bimaterial Cantilever Sensors," *Appl. Phys. Lett.* 89:033110.

Abedinov et al. (2001) "Micromachined Piezoresistive Cantilever Array With Integrated Resistive Microheater for Calorimetry and Mass Detection," *J. Vac. Sci Technol. A* 19(6):2884-2888.

Abel et al. (Jun. 2007) "Thermal Metrology of Silicon Microstructures Using Raman Spectroscopy," *IEEE Trans. Comp. Pack. Tech.* 30(2):200-208.

Akiyama et al. (2000) "Integrated Atomic Force Microscopy Array Probe with Metal-Oxide-Semiconductor Field Effect Transistor Stress Sensor, Thermal Bimorph Actuator, and On-Chip Complementary Metal-Oxide-Semiconductor Electronics," *J. Vac. Sci. Technol. B* 18(6):2669-2675.

Albright et al. (Apr. 1999) "'True' Temperature Measurements on Microscope Semiconductor Targets," In: SPIE Conference on Thermosense XXI, Orlando, Florida, SPIE 3700:245-250.

Allen et al. (1998) "MEMS-Based Scanning Calorimeter for Thermodynamic Properties of Nanostructures," *Microscale Thermophys. Eng.* 2:11-19.

Beckel et al. (Mar. 30, 2007) "Micro-Hotplates—A Platform for Micro-Solid Oxide Fuel Cells," *J. Power Sources* 166:143-148.

Belmonte et al. (Apr. 26, 2006) "High-Temperature Low-Power Performing Micromachined Suspended Micro-Hotplate for Gas sensing Applications," *Sens. Actuators B. Chem.* 114:826-835.

Berger et al. (Jul 1, 1996) "Thermal Analysis Using a Micromechanical Calorimeter," *Appl. Phys. Lett.* 69(1):40-42.

Berger et al. (1998) "Micromechanical Thermogravimetry," *Chem. Phys. Lett.* 294:363-369.
Beyder et al. (2006) "Reducing Probe Dependent Drift in Atomic Force Microscope with Symmetrically Supported Torsion Levers," *Rev. Sci Instrum.* 77:056105.
Binnig et al. (1986) "Atomic Force Microscope," *Phys. Rev. Lett.* 56(9):930-933.
Binnig et al. (Mar. 1, 1999) "Ultrahigh-Density Atomic Force Microscopy Data Storage with Erase Capability," *Appl. Phys. Lett.* 74(9):1329-1331.
Biswal et al. (2006) "Nanomechanical Detection of DNA Melting on Microcantilever Surfaces," *Anal. Chem.* 78:7104-7109.
Biswal et al. (2007) "Using a Microcantilever Array for Detecting Phase Transitions and Stability of DNA," *Clin. Lab. Med.* 27:163-171.
Biswal et al. (Aug. 2006) "Using a Microcantilever Array for Detecting Phase Transitions and Stability of DNA," *J. Assoc. Lab. Auto.* 11:222-226.
Boisen et al. (2000) "Environmental Sensors Based on Micromachined Cantilevers with Integrated Read-Out," *Ultramicroscopy* 82:11-16.
Brown et al. (1999) "Cantilever-in-Cantilever Micromachined Pressure Sensors Fabricated in CMOS Technology," *Proc. 1999 IEEE Can. Conf. on Elec. and Comp. Eng.*:1686-1691.
Butt et al. (1995) "Calculation of Thermal Noise in Atomic Force Microscopy," *Nanotechnology* 6(1):1-7.
Cavicchi et all. (Jan. 1, 2004) "Micro-Differential Scanning Calorimeter for Combustible Gas Sensing," *Sens. Actuators B. Chem.* 97:22-30.
Chen et al. (Aug. 1994) "Resonance Response of Scanning Force Microscopy Cantilevers," *Rev. Sci. Instrum.* 65(8):2532-2537.
Chui et al. (Mar. 1998) "Low-Stiffness Silicon Cantilevers with Integrated Heaters and Piezoresistive Sensors for High-Density AFM Thermomechanical Data Storage," *J. Microelectrmech. Syst.* 7(1):69-78.
Chui et al. (2007) "Advanced Temperature Compensation for Piezoresistive Sensors Based on Crystallographic Orientation," *Rev. Sci. Instrum.* 78:043706.
Chui et al. (1996) "Low Stiffness Silicon Cantilevers for Thermal Writing and Peizoresistive Readback with Atomic Force Microscope," *Appl. Phys. Lett.* 69:2767-2769.
Chui et al. (1999) "Intrinsic Carrier Thermal Runaway in Silicon Microcantilevers," *Microscale Thermophys. Eng.* 3:217-228.
Datskos (1996) "Remote Infrared Radiation Detection Using Piezoresistive Microcantilevers," *Appl. Phys. Lett.* 69: 2986-2988.
Dazzi et al. (2007) "Analysis of Nano-Chemical Mapping Performed by an AFM-Based ("AFMIR") Acousto-Optic Technique," *Ultramicroscopy* 107(12):1194-1200.
Dazzi et al. (2005) "Local Infrared Microspectroscopy with Subwavelength Spatial Resolution with an Atomic Force Microscope Tip used as a Photothermal Sensor," *Optics Lett.* 30(18):2388-2390.
Dazzi et al. (2006) "Subwavelength Infrared Spectromicroscopy using an AFM as a Local Absorption Sensor," *Infrared Phys. Technol.* 49:113-121.
Dazzi et al. (2004) "Theoretical Study of an Absorbing Sample in Infrared Near-Field Spectromicroscopy," *Optics Comm.* 235:351-360.
Dazzi (2008) "Sub-100nm Infrared Spectroscopy and Imaging based on a near-field photo-thermal technique ("PTIR")," in Biomedical vibrational spectroscopy, J. Wiley ed., 291.
Degamber et al. (Sep. 2004) "Simultaneous DSC/FTIRS/TMA," *Meas. Sci. Technol.* 15:L5-L10.
Denlinger et al. (Apr. 1994) "Thin-Film Microcalorimeter for Heat-Capacity Measurements from 1.5K to 800K," *Rev. Sci. Instrum.* 65:946-958.
Despont et al. (2000) "VLSI-NEMS Chip for Parallel AFM Data Storage," *Sens. Actuators A* 80:100-107.
Dreschler et al. (2003) "Cantilevers with Nano-Heaters for Thermomechanical Storage Application," *Microelectr. Eng.* 67/68:397-404.
Dücsö et al. (May 1997) "Porous Silicon Bulk Micromachining for Thermally Isolated Membrane Formation," *Sens. Actuators A Phys.* 60:235-239.

Efremov et al. (Feb. 26, 2002) "Thin-Film Differential Scanning Calorimetry: A New Probe for Assignment of the Glass Transition of Ultrathin Polymer Films," *Macromolecules* 35:1481-1483.
Efremov et al. (Aug. 22, 2003) "Glass Transition in Ultrathin Polymer Films: Calorimetric Study," *Phys. Rev. Lett.* 91:085703.
Efremov et al. (Jun. 26, 2003) "Glass Transition of Thin Films of Poly(2-Vinyl Pyridine) and Poly(Methyls Methacrylate): Nanocalorimetry Measurements," *Thermochim Acta* 403:37-41.
Efremov et al. (Jun. 15, 2004) "Probing Glass Transition of Ultrathin Polymer Films at a Time Scale of Seconds Using Fast Differential Scanning Calorimetry," *Macromolecules* 37:4607-4616.
Efremov et al. (2004) "Ultrasensitive, Fast, Thin-Film Differential Scanning Calorimeter," *Rev. Sci Instrom.* 75:179-191.
Felts et al. (2009) "Mechanical Design for Tailoring Resonance Harmonics of an Atomic Force Microscope Cantilever During Tip-Surface Contact," *J. Micromech. Microeng.* 19: 115008.
Fernando et al. (2007) "Improved Cantilever Profiles for Sensor Elements," *J. Phys. D-Appl. Phys.* 40(24):7652-7655.
Frisbie et al. (1994) "Functional Group Imaging by Chemical Force Microscopy," *Science* 265:2071.
Fritz et al. (2000) "Translating Biomolecular Recognition into Nanomechanics," *Science* 288:316-318.
Fung et al. (Jun. 1996) "Thermal Analysis and Design of a Micro-Hotplate for Integrated Gas-Sensor Applications," *Sens. Actuators A Phys.* 54:482-487.
Fürjes et al. (Apr. 30, 2002) "Thermal Investigation of Micro-Filament Heaters," *Sens. Actuators A. Phys.* 99:98-103.
Fürjes et al. (2004) "Thermal Characterization of Micro-Hotplates Used in Sensor Structures," *Superlattices Microstruct.* 35:455-464.
Fürjes et al. (Jul. 2002) "Materials and Processing for Realization of Micro-Hotplates Operated at Elevated Temperature," *J. Micromech. Microeng.* 12:425-429.
Gimzewski et al. (1994) "Observation of a Chemical Reaction Using a Micromechanical Sensor," *Chem. Phys. Lett.* 217:589-594.
Goericke et al. (2007) "Microcantilever Hotplates with Temperature-Compensated Peizoresistive Strain Sensors," *Sens. Actuators A* 143(2):181-190.
Gotsmann et al. (2005) "Experimental Observation of Attractive and Repulsive Thermal Forces on Microcantilevers," *Appl. Phys Lett.* 87:194102.
Gotsmann et al. (2004) "Thermally Activated Nanowear Models of a Polymer Surface Induced by a Heated Tip," *Langmuir* 20:1495-1500.
Graf et al. (Jan. 2005) "3D Nonlinear Modeling of Microhotplates in CMOS Technology for Use as Metal-Oxide-Based Gas Sensors," *J. Micromech. Microeng.* 15:190-200.
Gruverman (1996) "Scanning Force Microscopy for the Study of Domain Structure in Ferroelectric Thin Films," *J Vac. Sci. Technol. B: Microelectron. Nanometer Struct.* 14(2):602-605.
Guo et al. (Jan. 2007) "A Monolithic Integrated 4×4 Tin Oxide Gas Sensor Array with On-Chip Multiplexing and Differential Readout Circuits," *Solid-State Electron.* 51:69-76.
Hagleitner et al. (Nov. 15, 2001) "Smart Single-Chip Gas Sensor Microsystem," *Nature* 414:293-296.
Han et al. (May 17, 2005) "Size Effect on Heat Transfer in Micro Gas Sensors," *Sens. Actuators A Phys* 120:397-402.
Han et al. (2005) "A Novel Temperature-Compensating Structure for Micromechanical Bridge Resonator," *J. Micromech. Microeng.* 15: 702-705.
Hey et al. (1997) "A Combined Differential Scanning Calorimeter Optical Video Microscope for Crystallization Studies," *J. Therm. Anal.* 49:991-998.
Hodges (2001) "Improved Atomic Force Microscope Cantilever Performance by Ion Beam Modification," *Rev. Sci. Instrum.* 72(10):3880-3883.
Holbery et al. (2000) "Experimental Determination of Scanning Probe Microscope Cantilever Spring Constants Utilizing a Nanoindentation Apparatus," *Rev. Sci. Instrum.* 71(10):3769-3776.
Hotovy et al. (Apr. 2008) "Gallium Arsenide Suspended Microheater for MEMS Sensor Arrays," *Microsyst. Tech.* 14:629-635.
Hsu et al. (2004) "Cubic AgPbmSbTe2+m: Bulk Thermoelectric Materials with High Figure of Merit," *Science* 303:818-821.

Hu et al. (2008) "Investigation of the Natural Convection Boundary Condition in Microfabricated Structures," *Int. J. Therm. Sci.* 47:820-824.

Huiling (2008) "Concentrated-mass cantilever enhances multiple harmonics in tapping mode atomic force microscopy," *Appl. Phys. Lett.* 92(15):151903.

Hull (1999) "Electrical Properties," and "Implantation/ Irradiation of Silicon," In; *Properties of Crystalline Silicon*, Ch. 8 and 14, INSPEC, London pp. 411-475 and 731-773.

Nutter et al. (1993) "Calibration of Atomic-Force Microsope Tips," *Rev. Sci. Instrum.* 64: 1869-1873.

International Search Report and Written Opinion, Corresponding to International Application No. PCT/US09/32545, Mailed Apr. 9, 2009.

International Search Report and Written Opinion, Corresponding to International Application No. PCT/US09/54539, Mailed Dec. 23, 2009.

Johnson et al. (Jan 17, 1992) "Applications of Simultaneous Dsc Ftir Analysis," *Thermochim. Acta* 195:5-20.

Kim et al. (2007) "Nanotopographical Imaging Using a Heated Atomic Force Microscope Cantilever Probe," *Sens. Actuators A* 136:95-103.

Kim et al. (Jun. 2009) "Thermal Conduction Between a Heated Microcantilever and a Surrounding Air Environment," *Appl. Therm. Eng.* 29(8-9):1631-1641.

King et al. (Dec. 2002) "Design of Atomic Force Microscope Cantilevers for Combined Thermomechanical Writing and Thermal Reading in Array Operation," *J. Microelectromech. Syst.* 11(6):765-774.

King et al. (2006) "Nanoscale Thermal Analysis of an Energetic Material," *Nano Lett.* 6(9):2145-2149.

King et al. (Feb. 26, 2001) "Atomic Force Microscope Cantilevers for Combined Thermomechanical Data Writing and Reading," *Appl. Phys. Lett.* 78:1300-1302.

Krebs et al. (1993) "A Low-Power Integrated Catalytic Gas Sensor," Sens. Actuators B 13/14:1155-1158.

Laconte et al. (Oct. 2004) "SOI CMOS Compatible Low-Power Microheater Optimization for the Fabrication of Smart Gas Sensors," *IEEE Sens. J.* 4(5):670-680.

Lai et al. (Aug. 28, 1995) "High-Speed ($10^4$ ° C/s) Scanning Microcalorimetry with Monolayer Sensitivity (J/m2)," *Appl. Phys. Lett.* 67:1229-1231.

Lai et al. (Jul 1, 1996) "Size-Dependent Melting Properties of Small Tin Particles: Nanocalorimetric Measurements," *Phys. Rev. LEtt.* 77:99-102.

Lai et al. (Mar. 2, 1998) "Melting Point Depression of Al Clusters Generated During the Early Stages of Film Growth: Nanocalorimetry Measurements," *Appl. Phys. Lett.* 72:1098-1100.

Lee et al. (2003) "Classifying Combustible Gases Using Microgas Sensor Array," *Sens. Actuators B* 93:1-6.

Lee et al. (2007) "Characterization of Liquid and Gaseous Micro- and Nanojets using Microcantilever Sensors," *Sens. Actuators A* 134:128-139.

Lee et al. (2007) "Microcantilever Hotplates: Design, Fabrication, and Characterization," *Sens. Actuators A* 136:291-298.

Lee (May 2007) "Fabrication, Characterization and Application of Multifunctional Microcantilever Heaters," Ph.D. Dissertation, Georgia Institute of Technology.

Lee et al. (2008) "Microthermogravimetry Using a Microcantilever Hot Plate with Integrated Temperature-Compensated Piezoresistive Strain Sensors," *Rev. Sci Instrum.* 79:054901.

Lee et al. (2008) "Phase Change and Cooling Characteristics of Microjets Measured using Microcantilever Heaters," *Sens. Actuators A* 147:64-69.

Lee et al. (2007) "Thermal Conduction from Microcantilever Heaters in Partial Vacuum," *J. Appl. Phys.* 101:14906.

Lee et al. (2008) "Liquid Operation of Silicon Microcantilever Heaters," *IEEE Sens. J.* 8:1805-1806.

Lee et al. (Mar. 15, 2002) "A Microsensor array with Porous Tin Oxide Thin Films and Microhotplate Dangled by Wires in Air," *Sens. Actuators B Chem.* 83:250-255.

Lee et al. (Dec. 2008) "Differential Scanning Calorimeter Based on Suspended Membrane Single Crystal Silicon Microhotplate," *J. Microelectromechanical Syst.* 17(6):1513-1525.

Li et al. (2008) "Concentrated-Mass Cantilever Enhances Multiple Harmonics in Tapping-Mode Atomic Force Microscopy," *Appl. Phys. Lett.* 92(15):151903.

Lutwyche et al. (1999) "5×5 2D AFM Cantilever Arrays a First Step Towards a Terabit Storage Device," *Sens. Actuators A* 73:89-94.

Lyeo et al. (2004) "Profiling the Thermoelectric Power of Semiconductor Junctions with Nanometer Resolution," *Science*, 203:816-818.

Maali et al. (2006) "Reduction of the Cantilever Hydrodynamic Damping Near a Surface by Ion-Beam Milling," *J Appl. Phys.* 99(2):024908.

Madou (1997) "Wet Bulk Micromachining," and "Microfabrication Applications," in Fundamentals of Microfabrication, Ch. 4 and 10, CRC Press, Boca Raton, Florida, pp. 145-215 and 449-514.

Mamin, H.J. (1996) "Thermal Writing Using a Heated Atomic Force Microscope Tip," *Appl. Phys. Lett.* 69:433-435.

Marie et al. (2002) "Adsorption Kinetics and Mechanical Properties of Thiol-Modified DNA-oligos on Gold Investigated by Microcantilever Sensors," *Ultramicroscopy* 91:29-36.

Meier et al. (Aug. 2005) "Chemical Warfare Agent Detection Using MEMS-Compatible Microsensor Arrays," *IEEE Sens. J.* 5:712-725.

Melamud (2007) "Temperature-compensated high-stability silicon resonators," *Appl. Phys. Lett.* 90: 244107.

Najafi et al. (Oct. 1994) "A Micromachined Ultra-Thin-Film Gas Detector," *IEEE Trans. Electron. Dev.* 41:1770-1777.

Nelson et al. (2006) "Direct Deposition of Continuous Metal Nanostructures by Thermal Dip-Pen Nanolithography," *Appl. Phys. Lett.* 88:033104.

Nelson et al. (2007) "Measuring Material Softening with Nanoscale Spatial Resolution Using Heated Silicon Probes," *Rev. Sci. Instrum.* 78:023702.

Nelson et al. (2007) "Temperature Calibration of Heated Silicon Atomic Force Microscope Cantilevers," *Sens. Actuators A* 140:51-59.

Nelson, B.A. (May 2007) "Nanoscale Thermal Processing Using a Heated Atomic Force Microscope Tip," Ph.D. Dissertation, Georgia Institute of Technology.

Oden (1996) "Uncooled Thermal Imaging Using a Piezoresistive Microcantilever," Appl. Phys. Lett. 69(21): 3277-3279.

Olson et al. (2003) "The Design and Operation of a MEMS Differential Scanning Nanocalorimeter for High-Speed Heat Capacity Measurements of Ultrathin Films," *J. Microelectromech. Syst.* 12:355-364.

Olson et al. (Feb. 1, 2005) "Size-Dependent Melting of Bi Nanoparticles," *J. Appl. Phys.* 97:034304.

Pagonis et al. (2004) "Fabrication and Testing of an Integrated Thermal Flow Sensor Employing Thermal Isolation by a Porous Silicon Membrane Over an Air Cavity," *J. Micromech. Microeng.* 14:793-797.

Park et al. (Apr. 2007) "Frequency-Dependent Electrical and Thermal Response of Heated Atomic Force Microscope Cantilevers," *J. Microelectromech. Syst.* 16(2):213-222.

Park et al. (2007) "Topography Imaging with a Heated Atomic Force Microscope Cantilever in Tapping Mode," *Rev. Sci. Instrum.* 78:043709.

Park et al. (2008) "Routine Femtogram-Level Chemical Analyses Using Vibrational Spectroscopy and Self-Cleaning Scanning Probe Microscopy Tips," *Anal. Chem.* 80:3221-3228.

Park et al. (2007) "Low Temperature Characterization of Heated Microcantilevers," *J. Appl. Phys.* 101:094504.

Pedrak et al. (2003) "Micromachined Atomic Force Microscopy Sensor with Integrated Piezoresistive Sensor and Thermal Bimorph Actuator for High-Speed Tapping-Mode Atomic Force Microscopy Phase-Imaging in Higher Eigenmodes," *J. Vac. Sci. Technol. B* 21(6):3102-3107.

Pinnaduwage et al. (Oct. 2, 2003) "A Microsensor for Trinitoluene Vapour," *Nature* 425:474.

Pinnaduwage et al. (Nov. 2004) "A Sensitive, Handheld Vapor Sensor Based on Microcantilevers," *Rev. Sci. Instrum.* 75(11):4554-4557.

Privorotskaya et al. (2009) "Silicon Microcantilever Hotplates with High Temperature Uniformity," *Sens. Act. A* 152:160-167.

Rabe et al. (1996) "Vibrations of Free and Surface-Coupled Atomic Force Microscope Cantilevers: Theory and Experiment," *Rev. Sci. Instrum.* 67(9):3281-3293.

Rabe et al. (2000) "Quantitative Determination of Contact Stiffness Using Atomic Force Acoustic Microscopy," *Ultrasonics* 38(1-8):430-437.

Rasmussen et al. (2003) "Optimized Cantilever Biosensor with Piezoresistive Read-Out," *Ultramicroscopy* 97:371-376.

Ravi (Nov. Dec. 1991) "Oxidation Sharpening of Silicon Tips," *J. Vac. Sci. Technol. B*. 9:2733-2737.

Reggiani et al. (2002) "Electron and Hole Mobility in Silicon at Large Operating Temperatures—Part I: Bulk Mobility," *IEEE Trans Electron Dev.* 49:490-499.

Remmert et al. (Oct. 2007) "Contact Potential Measurement Using a Heated Atomic Force Microscope Tip," *Appl. Phys. Lett.* 91(14):143111.

Remmert. (May 2007) "Nano Thermal and Contact Potential Analysis with Heated Probe Tips," M.S. Dissertation, Georgia Institute of Technology.

Rinaldi et al. (2008) "Frequency Tuning AFM Optical Levers Using a Slot," *Microsyst. Technol.* 14(3):361-369.

Rinaldi et al. (2007) "Tuning the Dynamic Behavior of Cantilever MEMS Based Sensors and Actuators," *Sens. Rev.* 27(2):142-150.

Roylance et al. (Dec. 1979) "A Batch-Fabricated Silicon Accelerometer," *IEEE Trans. Elec. Dev.* 26(12):1911-1917.

Sadewasser et al. (2006) "Modified Atomic Force Microscopy Cantilever Design to Facilitate Access of Higher Modes of Oscilllation," *Rev. Sci Instrum.* 77:073703.

Sadewasser (2006) "Special Cantilever Geometry for the Access of Higher Oscillation Modes in Atomic Force Microscopy," *Appl. Phys. Lett.* 89(3):3.

Sahin et al. (2004) "High-Resolution Imaging of Elastic Properties Using Harmonic Cantilevers," *Sens. Actuators A: Physical* 114(2-3):183-190.

Sberveglieri et al. (Aug. 1997) "Silicon Hotplates for Metal Oxide Gas Sensor Elements," *Microsyst. Tech.* 3:183-190.

Semancik et al. (1998) "Kinetically Controlled Chemical Sensing Using Micromachined Structures," *Acc. Chem. Res.* 31:279-287.

Sheehan et al. (Aug. 30, 2004) "Nanoscale Deposition of Solid Inks via Thermal Dip Pen Nanolithography," *Appl. Phys. Lett.* 85(9):1589-1591.

Sheng et al. (Jun. 25, 1998) "A Low-Power CMOS Compatible Integrated Gas Sensor Using Maskless Tun Oxide Sputtering," *Sens. Actuators B. Chem.* 49:81-87.

Shirke et al. (May-Jun 2007) "Femtomolar Isothermal Desorption Using Microhotplate Sensors," *J. Vac. Sci. Technol. A* 25:514-526.

Solzbacher et al. (2003) "A Comprehensive Analytical and Numerical Analysis of Transient and Static Micro Hotplate Characteristics," In; *Transducers '03*, The $12^{th}$ international Conference on Solid State Sensors, Actuators and Microsystems, Boston : 1856-1859.

Solzbacher et al. (Jun. 10, 2000) "A Modular System of SiC-Based Microhotplates for the Application in Metal Oxide Gas Sensors," *Sens. Actuators B Chem.* 64:95-101.

Spannhake et al. (2007) "$SnO_2$: Sb—A New Material for High-Temperature MEMS Heater Applications: Performance and Limitations," *Sens Actuators B Chem.* 124:421-428.

Sprunt et al. (Sep 1997) "Simultaneous FT-Raman Differential Scanning Calorimetry Measurements Using a Low-Cost Fiber-Optic Probe," *Appl. Spectrosc.* 51:1410-1414.

Stark (2004) "Optical Lever Detection in Higher Eigenmode Dynamic Atomic Force Microscopy," *Rev. Sci. Instrum.* 75(11):5053-5055.

Stark et al. (1999) "Tapping-Mode Atomic Force Microscopy and Phase-Imaging in Higher Eigenmodes," *Appl. Phys. Lett.* 74(22):3296-3298.

Su et al. (2002) "Characterization of a Highly Sensitive Ultra-Thin Piezoresistive Silicon Cantilever Probe and Its Application in Gas Flow Velocity Sensing," *J. Micromech. Microeng.* 12:780-785.

Suehle et al. (Mar. 1993) "Tin Oxide Gas Sensor Fabricated Using CMOS Micro-Hotplates and In situ Processing," *IEEE Electron Dev. Lett.* 14:118-120.

Sunden et al. (2006) "Room-Temperature Chemical Vapor Deposition and Mass Detection on a Heated Atomic Force Microscope Cantilever," *Appl. Phys. Lett.* 88:033107.

Szoszkiewicz et al. (2007) "High-Speed, Sub-15 nm Feature Size Thermochemical Nanolithography," *Nano Lett.* 7:1064-1069.

Thundat et al. (May 23, 1994) "Thermal and Ambient-Induced Deflections of Scanning Force Microscope Cantilevers," *Appl. Phys. Lett.* 64(21):2894-2896.

Thundat et al. (Mar. 27, 1995) "Detection of Mercury Vapor Using Resonating Microcantilevers," *Appl. Phys. Lett.* 66(13):1695-1697.

Thundat et al. (Feb. 1, 1995) "Vapor Detection Using Resonating Microcantilevers," *Anal. Chem.* 67(3): 519-521.

Tortonese et al. (Feb. 22, 1993) "Atomic Resolution with an Atomic Force Microscope Using Piezoresistive Detection," *Appl. Phys. Lett.* 62(8):834-836.

Triantafyllopoulou et al. (2006) "Alternative Micro-Hotplate Design for Low Power Sensor Arrays," *Microelectron. Eng.* 83:1189-1191.

Tsamis et al. (Oct. 15, 2003) "Thermal Properties of Suspended Porous Silicon Micro-Hotplates for Sensor Applications," *Sens. Actuators B Chem.* 95:78-82.

Udrea et al. (Aug. 30, 2001) "Design and Simulations of SOICMOS Micro-Hotplate Gas Sensor," *Sens. Actuators B Chem.* 78:180-190.

Unal et al. (2007) "Nanoscale Quantitative Stress Mapping with Atomic Force Microscopy," *Appl. Phys. Lett.* 90: 113111.

Unal et al. (2006) "Ultrafast Molecule Sorting and Delivery by Atomic Force Microscopy," *Appl. Phys. Lett.* 88: 183105.

Varesi et al. (1998) "Scanning Joule Expansion Microscopy at Nanometer Scales," *Appl. Phys. Lett.* 72(1):37-39.

Vettiger et al. (2002) "The 'Millipede'—Nanotechnology Entering Data Storage," *IEEE Trans. Nanotechnol*.1:39-55.

Washburn et al. (2005) "Micro-Flame Ionization Detection Using a Catalytic Micro-Combustor," *2005 IEEE Sensors* :322-325.

Wiche et al. (Sep. 23, 2005) "Thermal Analysis of Silicon Carbide Based Micro Hotplates for Metal Oxide Gas Sensors," *Sens. Actuators A. Phys.* 123-124:12-17.

Williams et al (1986) "Scanning Thermal Profiler," *Appl. Phys. Lett.* 49(23):1587-1589.

Wu et al. (2001) "Bioassay of Prostate-Specific Antigen (PSA) using Microcantilevers," *Nat. Biotechnol*.19:856-860.

Yang et al. (2006) "Nano-Mechanical Electro-Thermal Probe Array Used for High-Density Storage Based on NEMS Technology," *Microelec. Reliability* 46:805-810.

Zeyen et al. (2007) "Design and test of a novel higher harmonic imaging AFM probe with a dedicated second cantilever for harmonic amplification," Transducers and Eurosensors '07—14th International Conference on Solid-State Sensors, Actuators and Microsystems :1545-1548.

Zeyen et al. (2008) "Preamplifying cantilevers for contact resonance mode imaging," Solid-State Sensors, Actuators, and Microsystems Workshop, Hilton Head Island, South Carolina, Jun. 1-5, 44-47.

Zeyen et al. (2009) "Preamplifying Cantilevers for Dynamic Atomic Force Microscopy," *Appl. Phys. Lett.*, 94:103507.

Zhang et al. (Aug. 2007) "Nanoscale Calorimetry Using a Suspended Bridge Configuration," *J. Microelectromech Syst.* 16:861-871.

Zhang et al. (Oct. 15, 2000) "Size-Dependent Melting Point Depression of Nanostructures: Nanocalorimetric Measurements," *Phys. Rev. B. Condens Matter* 62:10548-10557.

Zhang et al. (Jan. 17, 2005) "Thermal Characterization of Liquids and Polymer Thin Films Using a Microcalorimeter," *Appl. Phys. Lett.* 86(3):034101.

Zhang et al. (2006) "A Micro-Pirani Vacuum Gauge Based on Micro-Hotplate Technology," *Sens. Act. A* 126: 300-305.

Zhong et al. (1993) "Fractured Polymer Silica Fiber Surface Studied by Tapping Mode Atomic-Force Microscopy," *Surf. Sci.* 290(1-2):L688-L692.

Dadykin et al. (2003), "Low-macroscopic-field emission from piezo-electric thin film and crystals," Materials Science and Engineering A353:12-21.

Pavlyk et al. (2001), "Evolution of metastable centers on the CdS surface stimulated by temperature decrease," DRIP IX, Rimini, Italy—Sep. 24-28, 2001, P1-44, p. 168.

Rozhko (1984), Acoustoelectron emission from the piezoelectric LiNbO3, retrieved on Sep. 18, 2012 from the Internet: <URL: http://adsabs.harvard.edu/abs/1984PZhTF..10.1122R>.

Yamashita et al. (2005), "An RF-MEMS Device With a Lateral Field-Emission Detector", retrieved on Sep. 18, 2012 from the Internet: <URL: http://toshi.iis.u-tokyo.ac.jp/toshilab/?plugin=attach&refer=Publication%2Finternationai%20Conferences&openfile=IVNC%20abstract.pdf>.

International Search Report and Written Opinion dated Oct. 4, 2012 for International Application No. PCT/US12/48326.

* cited by examiner

Cantilever response

Laser Pulse f1 = 69.844 kHz  Q1 = 46.0
f2 = 94.120 kHz  Q2 = 30.0
f3 = 160.25 kHz  Q3 = 39.3 f1 = 69.863 kHz  Q1 = 41.3
f2 = 96.465 kHz  Q2 = 28.6 f1 = 68.873 kHz  Q1 = 43.0
f2 = 93.385 kHz  Q2 = 32.2
f3 = 127.49 kHz  Q3 = 56.5

4 f1 = 69.874 kHz    Q1 = 42.6
f2 = 97.073 kHz    Q2 = 41.2
f3 = 117.60 kHz    Q3 = 134.4

5 f1 = 69.870 kHz    Q1 = 43.3
f2 = 101.32 kHz    Q2 = 128.7
f3 = 138.38 kHz    Q3 = 184.8
f4 = 215.35 kHz    Q4 = 169.9

6 f1 = 66.651 kHz    Q1 = 87.6
f2 = 93.752 kHz    Q2 = 35.0
f3 = 208.42 kHz    Q3 = 70.1

7

8 f1 = 69.770 kHz     Q1 = 51.0
f2 = 87.784 kHz     Q2 = 31.2
f3 = 174.13 kHz     Q3 = 82.1
f4 = 377.88 kHz     Q4 = 76.7

9 f1 = 69.734 kHz     Q1 = 54.1
f2 = 103.92 kHz     Q2 = 55.1
f3 = 181.19 kHz     Q3 = 42.9

10 f1 = 69.819 kHz    Q1 = 55.3
f2 = 110.74kHz     Q2 = 52.4

11 f1 = 50.967 kHz    f4 = 79.225 kHz     Q1 = 98.1   Q4 = 27.1
f2 = 61.660 kHz    f5 = 124.68 kHz     Q2 = 78.5   Q5 = 74.1
f3 = 69.906 kHz                        Q3 = 47.4

CSC37B

NSC36C

1

2

3

4

5

6

US 8,387,443 B2

MICROCANTILEVER WITH REDUCED SECOND HARMONIC WHILE IN CONTACT WITH A SURFACE AND NANO SCALE INFRARED SPECTROMETER

STATEMENT REGARDING FEDERALLY SPONSORED RESEARCH OR DEVELOPMENT

This invention was made with United States governmental support under Award No. 70NANB7H7025 awarded by the National Institute of Standards and Technology, Award No. DMI0328162 awarded by the National Science Foundation and Award No. N66001-08-1-2038 awarded by the Defense Advanced Research Projects Agency. The U.S. government has certain rights in the invention.

CROSS REFERENCE TO RELATED APPLICATION

Not Applicable.

BACKGROUND OF THE INVENTION

This invention is in the field of microcantilevers. This invention relates generally to use of microcantilevers to map absorption of electromagnetic radiation by a sample.

Microcantilevers have been employed in atomic force microscopy (AFM) for making contour maps of surfaces with extremely high sensitivity and resolution. While AFM has been extremely successful at mapping topography of samples at the micro and nanoscale, it has limited capability to characterize the chemical composition of a sample. Infrared spectroscopy is a benchmark technique that is widely used to analyze the chemical composition of a sample by measuring and/or mapping the absorption of infrared energy as a function of wavelength. Vibrational resonances in molecules create characteristic absorption peaks that allow identification and characterization of specific chemical species.

Recently, use of microcantilevers in infrared spectroscopic applications has been developed. Published U.S. Patent Application US 2006/0222047 and International Patent Application WO 2006/107991 describe use of microcantilevers to generate a three dimensional tomographical reconstruction and a nanoscale infrared spectroscopic micro-tomogram of a sample.

Published U.S. Patent Application US 2008/0283755 describes a technique for determining localized infrared spectra of a sample using an AFM probe. Lateral and vertical deflections of AFM probes in response to expansion of a surface due to absorption of infrared radiation are monitored to obtain infrared absorptions of the surface. By scanning the probe across the surface and using a variable wavelength infrared source, infrared spectroscopic maps of the surface can be obtained.

U.S. Pat. No. 6,452,170 describes methods for determining a force of interaction between a sample and a cantilever tip. Interactions are determined by measuring a plurality of points on the deflected cantilever and use of non-Hookian modeling to account for higher order vibrational modes to calculate the interaction force.

U.S. Pat. No. 6,935,167 describes methods for tuning resonance frequencies of a microcantilever. Published U.S. Patent Application, US 2009/0013770 discloses methods for probing multiple vibrational eigenmodes of a cantilever.

SUMMARY OF THE INVENTION

Provided herein are methods and devices for sensing pulsed forces with specific application in measuring infrared absorption at the micro- and/or nano-scale. A method of this aspect comprises the steps of: providing a sample having a surface; providing a microcantilever comprising a fixed end, a non-fixed end with a tip and a freely resonating portion, wherein the tip is in contact with the surface; providing a pulsed force between the sample and the tip; and detecting a deflection of the freely resonating portion of the microcantilever, thereby sensing a response of the microcantilever to the pulsed force. Methods of this aspect are useful for sensing a transient force between the tip and the surface; for example forces having a duration selected over the range of 0 to 100 μs, 1 to 100 ns or 1 to 100 μs.

In an exemplary embodiment, the tip is maintained in contact with the surface during the providing and detecting steps. For certain embodiments, the response of the cantilever is sensed at a plurality of locations on the sample. For exemplary embodiments, the responses of the microcantilever as a function of relative tip-sample position are indicative of compositional variations in the sample over the plurality of locations. In some embodiments, the microcantilever response is a transient response.

A further embodiment of this aspect comprises a step of providing a plurality of relative translations between the tip and the surface, thereby positioning the tip in contact with a plurality of locations of the surface. Optionally, the steps of providing a pulsed force between the sample and the tip and detecting a deflection of the freely resonating portion are repeated for each of the plurality of locations.

In a specific embodiment, at least a portion of the sample is exposed to a pulse of electromagnetic radiation; for example, electromagnetic radiation comprising infrared radiation. For certain embodiments, the pulsed force is the result of thermal expansion of the sample due to absorption of infrared radiation by at least a portion of the sample. Optionally, a method of this aspect further comprises a step of sensing the response of the cantilever as a function of wavelength of incident electromagnetic radiation.

In general, for embodiments, the microcantilever is excited in one or more flexural and/or vibrational modes. In a preferred embodiment, the pulsed force between the sample and the tip is amplified. For example, a quality factor for one or more vibrational modes of the microcantilever is selected over the range of 10 to 1000. Optionally, the quality factor is selected over the range of 10 to 50, 50 to 100, 100 to 500, or 500 to 1000. For certain embodiments, the methods provided herein are able to provide a signal to noise ratio greater than 40, for example selected over the range of 40 to 100.

In embodiments, the freely resonating portion of the microcantilever comprises one or more internal resonators. In one example, the freely resonating portion of the microcantilever comprises a first internal resonator having a fixed end and a free end. In a second embodiment of this aspect, the freely resonating portion of the microcantilever comprises a second internal resonator having a fixed end and a free end, for example the second internal resonator is positioned substantially within the first internal resonator.

In a certain embodiment, the tip is in contact with a submicron region of the surface and the step of providing a pulsed force comprises exposing at least the submicron region of the surface to a pulse of infrared electromagnetic radiation and wherein the response of the microcantilever is indicative of absorption of infrared electromagnetic radiation by the submicron region of the surface.

In another aspect, provided herein are methods for sensing an infrared absorption of a submicron region of a sample. A method of this aspect comprises the steps of: providing a sample having a surface; providing a microcantilever comprising a fixed end, a non-fixed end with a tip and a freely resonating portion, wherein the tip is in contact with a submicron region of the surface; exposing at least the submicron region of the surface in contact with the tip to a pulse of infrared electromagnetic radiation; and detecting a deflection of the freely resonating portion of the microcantilever, thereby sensing absorption of infrared electromagnetic radiation by the submicron region of the sample.

In one embodiment, the pulse of infrared electromagnetic radiation comprises a pulse of infrared electromagnetic radiation of a first wavelength, thereby sensing absorption of infrared electromagnetic radiation of the first wavelength by a submicron region of the sample. In a further embodiment, at least the submicron region of the surface in contact with the tip is exposed to a pulse of infrared electromagnetic radiation of a second wavelength, thereby sensing absorption of infrared electromagnetic radiation of the second wavelength by the submicron region of the sample. A specific embodiment of this aspect comprises the steps of exposing at least the submicron region of the surface in contact with the tip to a plurality of pulses of infrared electromagnetic radiation over a range of wavelengths and detecting a deflection of the freely resonating portion, thereby determining an infrared absorption spectrum of a submicron region of the sample.

A specific method of this aspect further comprises a step of providing a plurality of relative translations between the tip and the surface, thereby positioning the tip in contact with a plurality of locations of the surface. A further embodiment comprises repeating the steps of exposing at least the submicron region of the surface in contact with the tip to a pulse of infrared electromagnetic radiation and detecting a deflection of the freely resonating portion for each of the plurality of locations.

In one embodiment, the exposing and detecting steps are repeated for a plurality of submicron regions of the sample to create a chemical map of the sample, wherein the chemical map of the sample is a plot indicating the composition of the surface as a function of relative translation between the tip and the sample based on the absorption of infrared radiation from the plurality of submicron regions of the sample.

In another aspect, provided herein are devices for sensing pulsed forces. An embodiment of this aspect comprises: a microcantilever having a fixed end, a non-fixed end with a tip and a freely resonating portion, wherein the tip is in contact with a surface; a force generator configured for providing a pulsed force between the tip and the surface; and a detector configured for sensing a deflection of the microcantilever in response to the pulsed force. In a specific embodiment, the tip of the microcantilever is maintained in contact with the surface during sensing.

In yet another aspect, provided herein are devices for sensing absorption of electromagnetic radiation by a submicron region of a surface. An embodiment of this aspect comprises: a surface; a microcantilever having a fixed end, a non-fixed end with a tip and a freely resonating portion, wherein the tip is in contact with the surface; a source of electromagnetic radiation, configured to direct a beam of electromagnetic radiation to the surface; and a detector, configured for sensing a deflection of the microcantilever in response to absorption of electromagnetic radiation by the surface. In a specific embodiment, the tip of the microcantilever is maintained in contact with the surface during sensing.

Additional microcantilever devices are further described herein. In one embodiment, a microcantilever device comprises a microcantilever having a fixed end and a free end with a tip, wherein the tip is in contact with a surface, and wherein the microcantilever has a first contact mode flexural mode frequency and a second contact mode flexural mode frequency, and wherein the ratio of the second contact mode flexural mode frequency to the first contact mode flexural mode frequency is selected over the range of 1.6 to 5.0, 1.6 to 2.4, 1.6 to 3.0, 1.6 to 3.5, 3.7 to 5.0, or 4.2 to 5.0. In further embodiments, the microcantilever has a third contact mode flexural mode frequency and the ratio of the third contact mode flexural mode frequency to the first contact mode flexural mode frequency is selected over the range of 2.5 to 11.0 or 4.0 to 15.0. In this context, third contact mode flexural mode refers to a contact mode flexural mode having a frequency higher than at least two other contact mode flexural modes. In a specific embodiment, the first contact mode flexural mode frequency is selected over the range of 5.0 to 1000 kHz.

Devices of this aspect are useful, for example, for amplifying forces between the microcantilever tip and the surface. Microcantilevers of a number of shapes and sizes are contemplated. A specific microcantilever shape is a rectangular microcantilever, for example having a width selected over the range of 10 to 300 µm, a thickness selected over the range of 1 to 5 µm and/or a length selected over the range of 30 to 1000 µm.

Some microcantilever embodiments comprise a first internal resonator having a fixed end and a free end, for example an internal resonator that vibrates substantially independent of friction between the tip and the surface. Useful internal resonators include those which amplify forces between the tip and the surface, including transient forces. Some microcantilever embodiments further comprise a second internal resonator having a fixed end and a free end, for example a second internal resonator positioned substantially within the first internal resonator.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 8, 9, 10, 11, 12, 13, 14, 15, 16, 17 and 18 also depict the first few contact mode flexural shapes for the respective microcantilever designs.

DETAILED DESCRIPTION OF THE INVENTION

Figure 1:
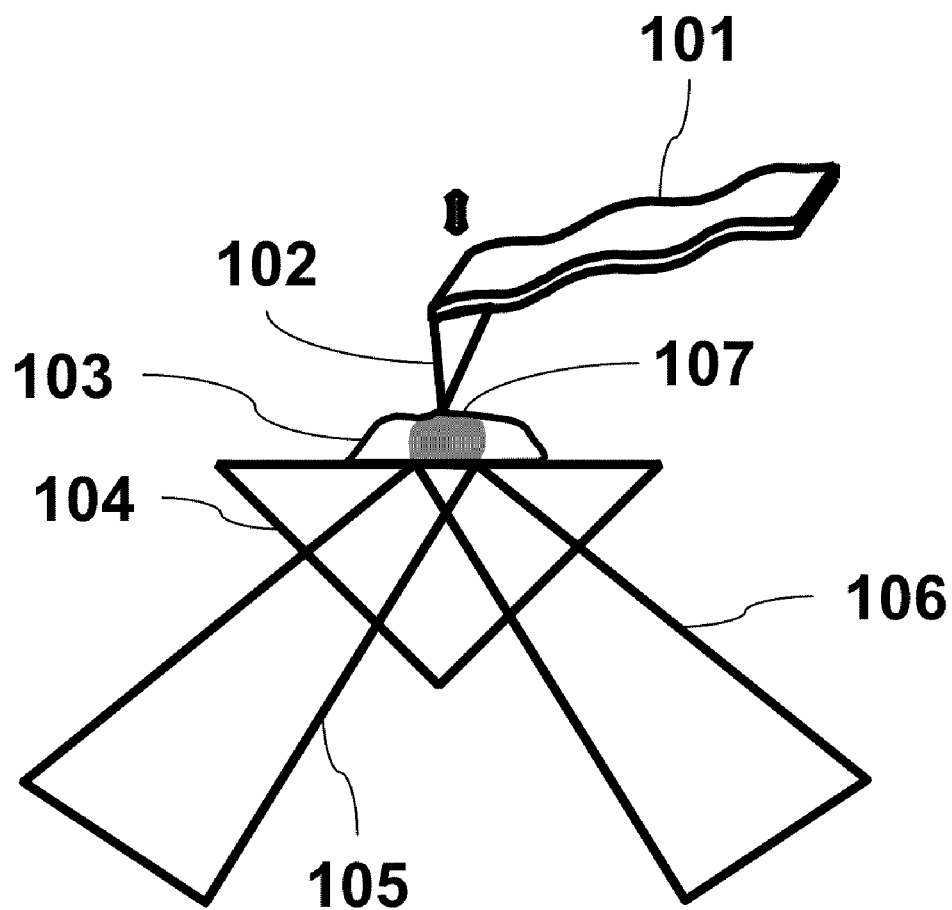
FIG. 1 illustrates an overview of an embodiment for sensing absorption of electromagnetic radiation by a sample.
Figure 1:
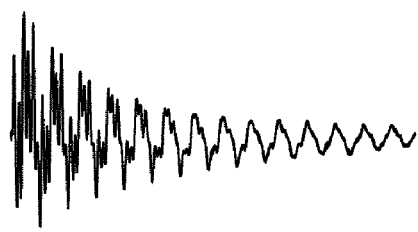
Figure 1:

In general the terms and phrases used herein have their art-recognized meaning, which can be found by reference to standard texts, journal references and contexts known to those skilled in the art. The following definitions are provided to clarify their specific use in the context of the invention.

"Cantilever" and "microcantilever" are used interchangeably herein and refer to a structure having at least one fixed or attached end and at least one free, non-fixed or unattached end, for example a microcantilever of an atomic force microscope. A microcantilever generally comprises a tip, for example useful for probing properties of a surface, such as contours. In some embodiments, microcantilevers have dimensions on the order of 1 to 1000 μm. Useful microcantilevers comprise those having any useful shape, including platform or rectangular shaped cantilevers, circular shaped cantilevers, ladder shaped cantilevers, U-shaped cantilevers, triangular shaped cantilevers, and cantilevers having cutout portions. "Rectangular microcantilever" specifically refers to a microcantilever having a platform type shape, with a length, a width and a height. Rectangular microcantilevers also include embodiments where there are one or more cutout portions. For some embodiments, a "cutout portion" refers to a region of a microcantilever where material is removed from a cantilever that would be an otherwise monolithic body. For specific embodiments, a cutout portion refers to regions within a microcantilever that comprise air or other material which do not allow coupling and/or substantial coupling of mechanical energy from one portion of a microcantilever to another portion of a microcantilever.

"Fixed end" or "fixed base" refers to an end of a microcantilever which is attached to the microcantilever base. A fixed end of a microcantilever is unable to move independently of the microcantilever base.

"Free end" or "non-fixed end" refers to an end of a microcantilever which is not attached to the microcantilever base. The free end of a microcantilever is able to move independently of the microcantilever base, for example when the microcantilever bends or vibrates. For some embodiments, when a cantilever is operating in contact mode, the free end of the cantilever or the tip of the cantilever is in contact with an object, such as a surface; in these embodiments the free end is coupled to the sample. For embodiments, when a cantilever is operating in tapping mode, the free end of the cantilever is permitted to vibrate.

"Freely resonating portion," "free resonator," "paddle," "internal paddle" and "internal resonator" synonymously refer to portions of a microcantilever which are able to and/or are configured for vibrating substantially independent of friction between the microcantilever tip and a surface. In some embodiments, a freely resonating portion of a microcantilever refers to a portion of a microcantilever surrounded by one or more cutout portions. For some embodiments, an internal resonator refers to a portion of a microcantilever which is located at an internal position of a microcantilever and is surrounded by one or more cutout portions. In some embodiments, a freely resonating portion or internal resonator of a microcantilever operating in contact mode vibrates for a duration and/or with an amplitude greater than the microcantilever tip. In some embodiments, a freely resonating portion of a microcantilever is physically and/or mechanically separated by three or more sides from other regions of a microcantilever. Some freely resonating portions of a microcantilever embodiment may further include additional freely resonating portions internal to an outer freely resonating portion. Some microcantilever embodiments comprise folded free resonators.

"Force generator" refers to an object, device or technique configured for generating a force, vibration, or impulse. In an embodiment, a force generator is a piezoelectric transducer. In embodiments, a force generator is an acoustic or an ultrasonic wave. In an embodiment, a force generator is absorption of electromagnetic radiation, for example infrared electromagnetic radiation that, when absorbed by a sample, induces rapid thermal expansion of a region of the sample, thus producing a force on an AFM probe in contact with the sample.

"Electromagnetic radiation" refers to visible light as well as non-visible electromagnetic radiation, such as visible radiation, ultraviolet radiation, infrared radiation, x-ray radiation and microwave radiation. "Infrared radiation" and "infrared electromagnetic radiation" refer to electromagnetic radiation having a wavelength in the range of 700 nm to 1 mm.

"Pulse of electromagnetic radiation" refers to a temporally and spatially localized distribution of photons. In some embodiments, a pulse of electromagnetic radiation has a specific duration; that is, where the pulse has a start and an end, in between which the intensity of photons is above a threshold, for example zero. In the present description, use of the term pulse of electromagnetic radiation is intended to be consistent with use of this term in the art of optics and spectroscopy. Examples of a pulse of electromagnetic radiation include, but are not limited to, a laser pulse, a flash and an on/off cycle of a source of electromagnetic radiation. Pulses of electromagnetic radiation include monochromatic pulses and pulses comprising multiple wavelengths. Useful pulses of electromagnetic radiation include those having a duration selected in the range of 1 to 100 μs, for example selected in the range of 1 to 100 ns or 1 to 100 μs.

"Source of electromagnetic radiation" refers to an instrument or device that generates electromagnetic radiation that can be directed towards a region of a sample and/or a microcantilever. Useful sources include a laser, a laser diode, an optical parametric oscillator, an optical parametric generator, a quantum cascade laser, a fiber laser, a Q-switched laser, a superluminescent diode, a VCSEL and/or another device capable of generating electromagnetic radiation. In the case where the source of electromagnetic radiation is used to measure the absorbance of a region of a sample, the source may be tunable, i.e. its center wavelength may be adjusted and/or swept to obtain a spectrum of absorption. The source of electromagnetic radiation may also be a broadband source, for example an incandescent source and/or a globar. In the case of a broadband source, it may be desirable to use Fourier transform interferometric techniques to obtain wavelength dependent measurements of absorbance.

"Sense" and "sensing" refer to determination and/or observation of a signal indicative of a value, variable and/or property. In some embodiments, sensing refers to direct measurement of a value, variable and/or property; in other embodiments, sensing requires transformation (e.g., a mathematical transformation) to convert one value, variable and/or property into a measured and/or detected value.

"Measure" and "measuring" refer to determination of an absolute or relative value of a variable and/or property.

"Detect" and "determine" refer to observation and/or measurement of a property, object or value and/or a change in a property, object or value.

"Deflection" refers to motion of one object, such as a bending or elastic deformation. Deflection may comprise static motion, transient motion and/or vibrational motion, for example due to a force and/or the presence of another object.

"Absorption" refers to a process whereby electromagnetic radiation is taken up by matter, for example absorption of infrared electromagnetic radiation or absorption of visible electromagnetic radiation.

"Absorbance" refers to a measure of the ability of a material to block or otherwise absorb electromagnetic radiation. In one embodiment, the absorbance, A, of a material may be described as a function of the ratio of $I/I_0$, where I is the intensity of electromagnetic radiation after passing through the material and $I_0$ is the intensity of electromagnetic radiation before passing through the material. In some cases, absorbance may be defined as $A=-\log(I/I_0)$. For many materials, absorbance is a function of the wavelength of the electromagnetic radiation. Absorbance need not be a quantitative or absolute measurement, but can instead be a measurement of relative absorption. Absorbance may be normalized to a maximum absorbance value in a given wavelength range or to an absorbance at a specific wavelength.

"Spectrum" refers to a plot of a variable as a function of wavelength, frequency, wavenumber and/or energy; a spectrum can also refer to an array of values or multidimensional distribution of variables as a function of wavelength, frequency, wavenumber and/or energy. "Absorption spectrum" refers to a plot of absorbance as a function of wavelength, frequency, wavenumber and/or energy. An infrared absorption spectrum can be plotted as a function of wavelength, frequency, wavenumber and/or energy of electromagnetic radiation.

"Submicron region" refers to a portion of an object that has at least one characteristic dimension less than 1 micrometer. For example, a 900 nm spherical domain in a composite sample comprises a submicron region. Submicron regions may also be as small as a few nanometers or less. In some embodiments, a submicron region refers to the portion of an object or surface in contact with the tip of a microcantilever and that portion of the object or surface immediately surrounding the portion in contact with the tip. In some embodiments, upon exposure to infrared electromagnetic radiation a submicron region expands in size and causes a deflection of the microcantilever.

"Contact mode" refers to a mode of operation of an atomic force microscope or microcantilever where the microcantilever tip is generally maintained in contact with a surface.

"Flexural mode" refers to a characteristic vibrational bending mode of a microcantilever which oscillates at a characteristic frequency. A flexural mode can refer to the first order or a higher vibrational mode of a microcantilever. "Contact mode flexural mode" refers to a characteristic vibrational mode of a microcantilever having a tip which is maintained in contact with a surface. The contact mode flexural modes and the free flexural modes (non-contact flexural modes) of a microcantilever are generally different and oscillate with different characteristic frequencies. In some embodiments, a contact flexural mode depends on the mechanical properties of the sample that is in contact with the tip of a microcantilever.

"Transient force" refers to a force which changes as a function of time, for example a pulsed force. "Transient response" refers to a response which changes as a function of time.

"Pulsed force" refers to an impulse force and/or a force having a temporal profile of a short duration, for example a duration characteristic of an impulse force or a duration characteristic of a pulse of electromagnetic radiation, such as a laser pulse or flash. In embodiments, a pulsed force has a duration selected in the range of 1 to 100 μs, for example selected in the range of 1 to 100 ns or 1 to 100 μs. In specific embodiments, a pulsed force is due to rapid thermal expansion of a region of a sample in response to the absorption of electromagnetic radiation. Pulsed forces may also be the result of rapid deformation or deflection of a sample due to electric, magnetic, piezoelectric, acoustic, ultrasonic and other forces.

"Quality factor" or "Q" refers to a measure of the sharpness of an oscillatory resonance, for example a flexural oscillation of a cantilever. The Quality factor is generally defined to be the resonant frequency divided by the width of the resonance at half the maximum energy, i.e. $Q=f_0/\Delta f$.

"Substantially independent" refers to the ability of one object to behave, move, or otherwise perform a function without being affected by or with reduced effects from another object.

"Substantially within" refers to containment of one object within the bounds of another object.

"Relative translation" refers to a movement of two objects such that the position of the two objects changes with respect to one another.

"Compositional variation" refers to a distribution of one or more materials within an object. For certain embodiments, compositional variation refers to the spatial positions of different materials or components within an object "Chemical map" refers to a spatial plot showing spatially resolved variations in chemical composition. In the case of specific identification of component materials, a chemical map can show the relative positions of chemical components within an object.

Described herein are devices and methods for sensing pulsed forces. Some of the described devices and methods are also useful for measuring infrared absorbances and compiling spectral and chemical maps of surfaces. Also described are microcantilever having reduced harmonic frequencies when operating in contact mode. Some of the described microcantilevers comprise an internal resonator configured to vibrate substantially independent of friction between the microcantilever tip and a surface when the microcantilever operates in contact mode. A number of the described devices and methods are useful for monitoring pulsed forces with enhanced sensitivity.

FIG. 1 illustrates an overview of an embodiment for sensing absorption of electromagnetic radiation by a sample. A microcantilever 101 is positioned such that the tip 102 is in contact with a sample 103. The sample is placed on a prism 104. Incoming electromagnetic radiation 105 is directed into prism 104 where it undergoes total internal reflection and outgoing electromagnetic radiation 106 is reflected out of the prism. A portion of the electromagnetic radiation interacts with the sample 103 in region 107. Region 107 heats and expands due to absorption of electromagnetic radiation, imparting a force onto microcantilever 101. Microcantilever 101 undergoes motion due to the force. FIG. 1 also illustrates an example microcantilever deflection response to a pulse of electromagnetic radiation.

Figure 2A:
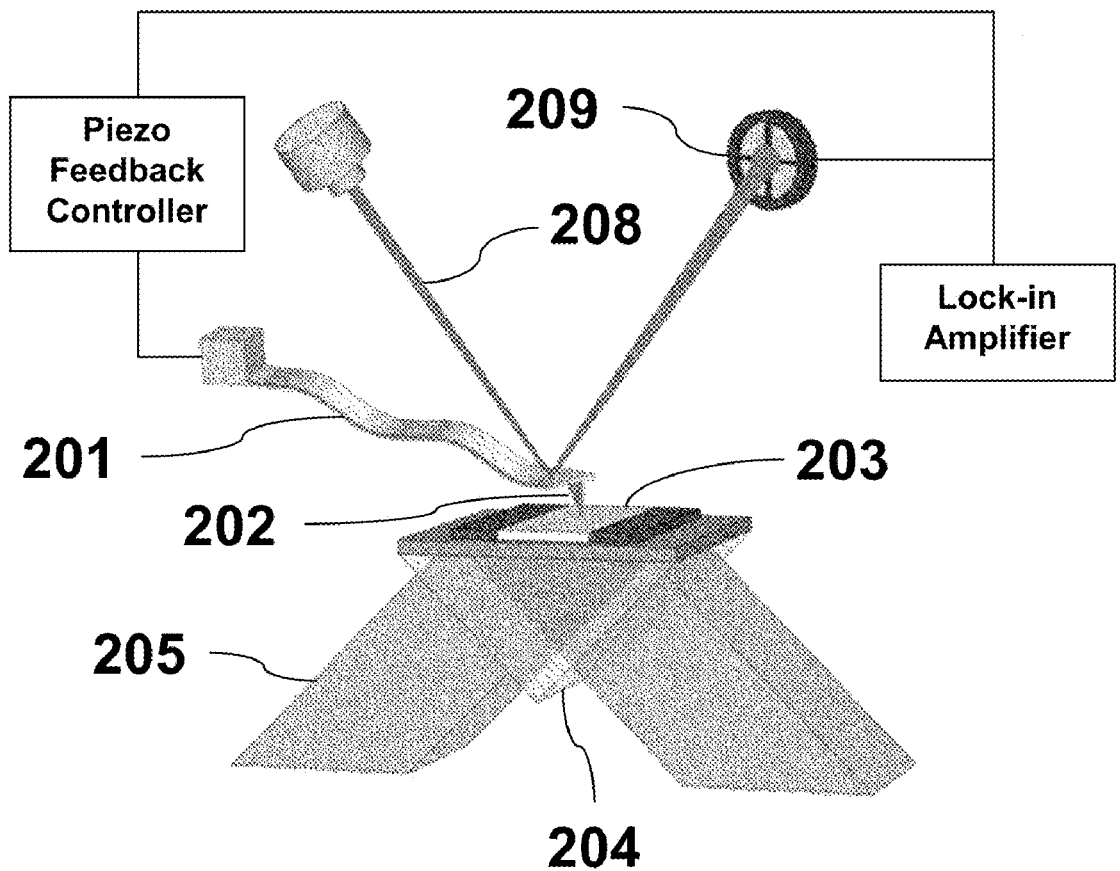
FIG. 2A illustrates an embodiment of a system for infrared absorption measurements.

FIG. 2A illustrates an embodiment of a system for infrared absorption measurements, showing microcantilever 201 with tip 202 positioned in contact with a sample 203. Infrared electromagnetic radiation 205 undergoes total internal reflection inside prism 204. Absorption by sample 203 causes microcantilever 201 to be deflected. A light source 208, for example a laser diode, is focused onto the microcantilever 201 and is reflected to a position sensitive detector 209 which allows for the deflections of microcantilever 201 to be detected. In other embodiments, light source 208 is a light emitting diode, a superluminescent diode, an optical fiber, a helium neon laser or another source of electromagnetic radiation that can be directed towards the cantilever. In certain embodiments, position sensitive detector 209 is a quadrant detector, a bi-cell, a lateral effect photodiode, a diode array and/or another detector configured for determining the relative position of the light beam reflected from the cantilever. Many alternative embodiments exist for detecting the deflection of the cantilever including techniques that employ optical interferometry, electron tunneling, capacitance detection, piezoresistive detection, piezoelectric detection and thermal dissipation of a heated cantilever, for example. Any arrangement of detection mechanisms that allow monitoring and/or detection of a relative position, height, bend and/or angle of the cantilever can be employed.

Figure 2B:
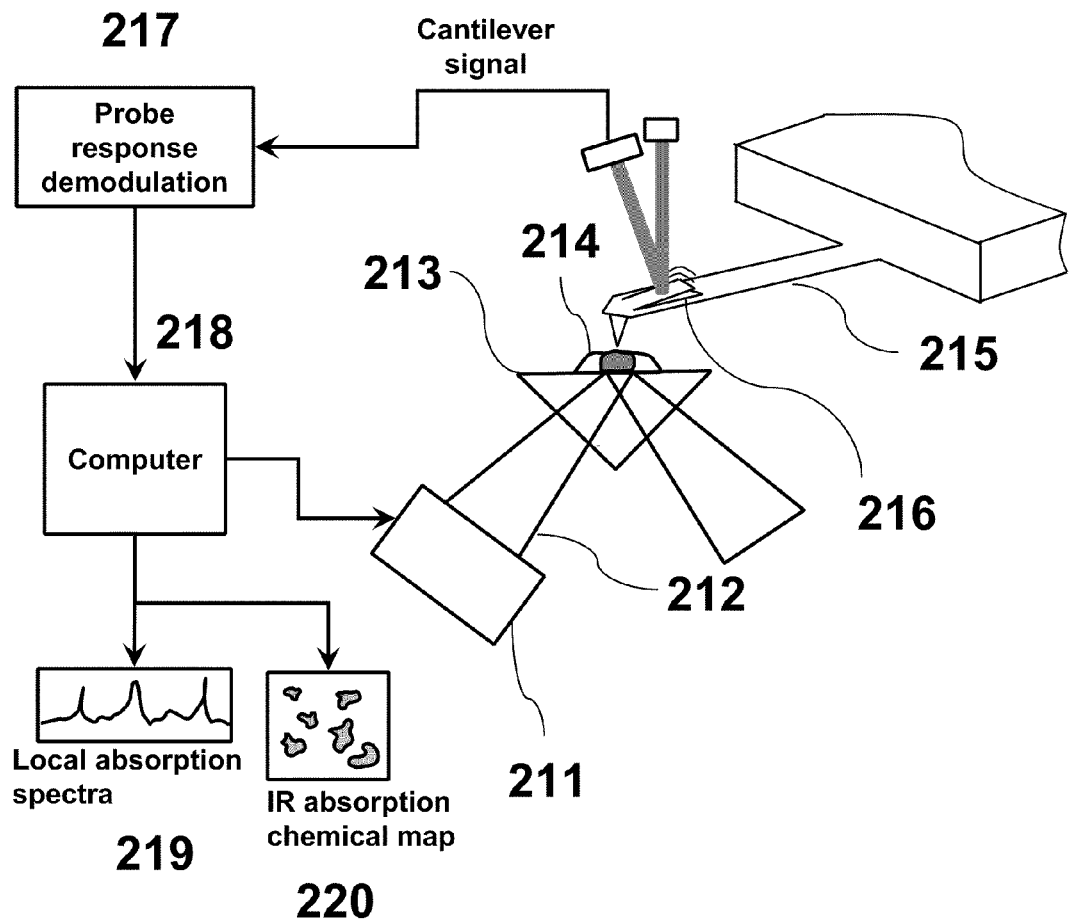
FIG. 2B illustrates an embodiment of a system for infrared absorption measurements using a microcantilever.

FIG. 2B illustrates an embodiment of a system for infrared absorption or chemical mapping measurements. A source of electromagnetic radiation 211 generates a beam 212 that is incident on a sample 214. In the embodiment shown, sample 214 is mounted on a prism 213 such that beam 212 is generally internally reflected from the surface of the prism. This arrangement is optional, and the beam 212 can alternately strike the sample from the top and the sample need not be mounted on a prism. When electromagnetic radiation from beam 212 is absorbed by the sample 214, it can cause the sample to heat and rapidly expand. The rapid thermal expansion can create a force impulse on the tip of microcantilever 215. This impulse force can then initiate oscillation of a free resonator 216 that is integrated within microcantilever 215. Since the free resonator 216 is decoupled from the sample surface, it can ring for an extended time after the thermal expansion of the sample (and hence force pulse) has dissipated. As will be seen later, this free resonator can significantly increase the sensitivity and signal to noise of the detection of infrared (IR) absorption versus a microcantilever without a free resonator.

A probe response demodulator 217 processes the deflection of the cantilever to obtain a measure of the response of the microcantilever to the pulsed force. The modulator 217 in general will create or calculate signals representative of oscillatory motion of the cantilever induced by the force pulse. For certain embodiments, the demodulator 217 measures microcantilever responses; for example, including the peak-to-peak oscillation, the deflection at a given time, the amplitude, frequency and/or phase of one or more resonant modes of the cantilever (including those of the free resonator). In some embodiments, the demodulator generates signals based on the transient response of the microcantilever and/or steady state response. It should be made clear that many alternative constructions of the cantilever response can be created that will provide a sufficient measurement of the relative intensity of the pulsed force. The demodulator may employ lock-in amplifier technology, RMS-to-DC converters, Fourier Transform techniques, short-time Fourier Transforms, harmonic inversion or other techniques that produce signals indicative of oscillatory motion of the cantilever. The demodulator 217 can be implemented in analog electronics, digital electronics or combinations thereof, including the use of field programmable gate arrays, digital signal processors, microprocessors, computers, and the like. Examples of such demodulation schemes are described in co-pending application U.S. Ser. No. 12/315,859 which is hereby incorporated by reference. A computer 218 is used in some embodiments to control the source 211, receive demodulated signals from demodulator 217 and output to display and storage devices.

The source 211 may be a source of infrared radiation, for example a tunable optical parametric oscillator as described by Vodopyanov in U.S. Pat. No. 6,785,041. In this case, the center wavelength of the source 211 may be swept and signal indicative of the cantilever motion in response to absorbed radiation may be plotted as a function of wavelength or wavenumber. The resulting spectrum 219 can show peaks that are characteristic of molecular resonances of specific chemical species. These spectra can be collected from submicron regions of the sample providing characterization of chemical composition on the micro and nanoscale. The source can also be tuned to one or more wavelengths and chemical maps 220 can be created by plotting a cantilever response as a function of relative position on the sample. In one case, relative translation is generated between the cantilever and the sample to move the point of contact and hence point of measurement of the cantilever tip on the sample. Relative translation can be created by moving the sample, the probe or a combination of the two. Relative translation is often generated by piezoelectric scanners, but many alternate scanning devices can be used including devices that use, electrostatic, electrostrictive, magnetostrictive, inductive, motorized and/or other mechanisms that produce relative motion in response to an input signal.

In other embodiments, the source of electromagnetic radiation 211 instead or also covers other wavelength ranges including visible, ultraviolet, and terahertz radiation. In the case of a visible source, absorption spectra can also be used to locally map visible absorption, which may be important, for example, in the mapping of efficiency of photovoltaics. The source 211 may also be a broadband source, for example an incandescent source and/or a globar. In the case of a broadband source, it may be desirable to use Fourier transform interferometric techniques to obtain wavelength dependent measurements of absorbance. These techniques are used for example in Fourier Transform Infrared (FTIR) spectroscopy.

Figure 3:
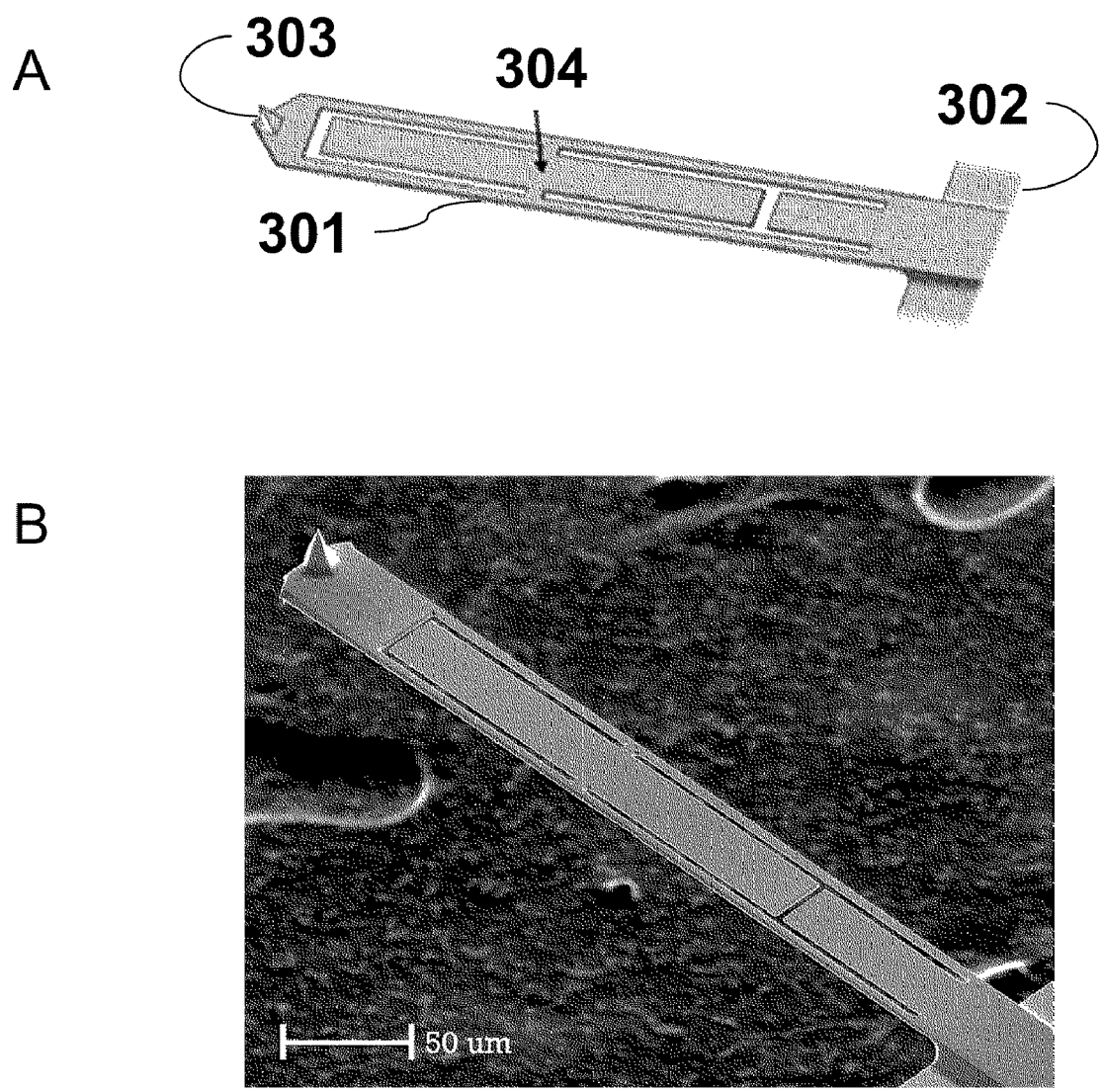
FIG. 3A shows a microcantilever embodiment and FIG. 3B shows an electron micrograph image of a fabricated microcantilever.
Figure 4:
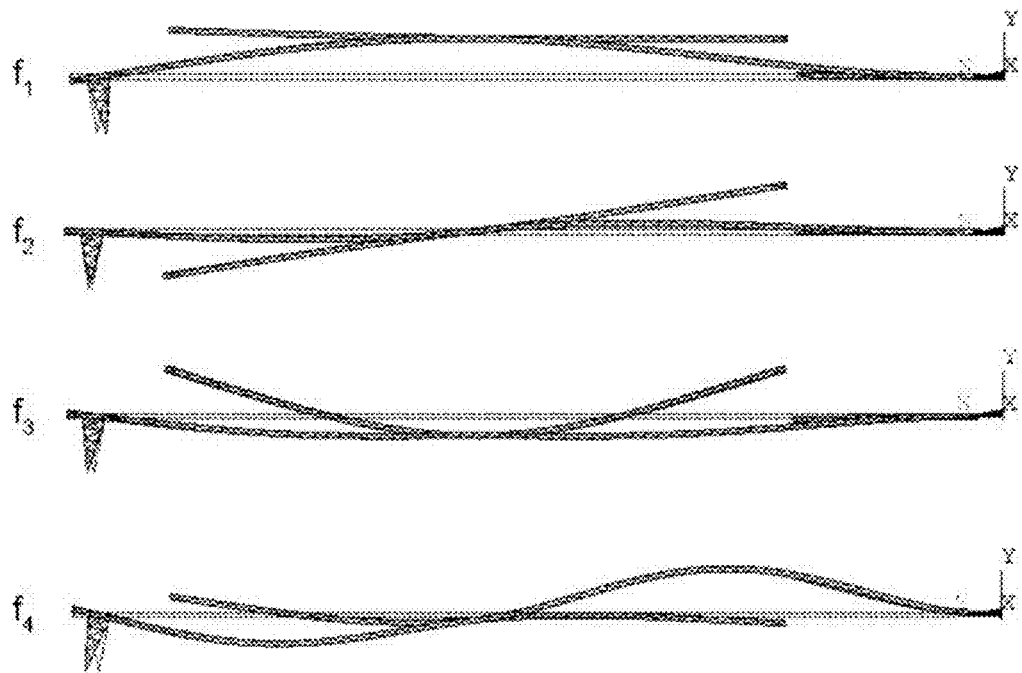
FIG. 4 shows the first four contact mode flexural shapes for the microcantilever of FIG. 3.

FIG. 3A shows an illustration of an embodiment showing a microcantilever 301 attached at base 302 and including a tip 303 and freely resonating paddle 304. FIG. 3B depicts an electron micrograph image of a fabricated microcantilever embodiment based on this design. The paddle portion of the microcantilever in FIG. 3 is configured such that it has a single attachment point to the rest of the microcantilever. Such a configuration allows the paddle to vibrate substantially independent of friction between the tip of the microcantilever and a surface when the microcantilever operates in contact mode. FIG. 4 shows the first four contact mode flexural shapes for the microcantilever of FIG. 3.

Figure 5:
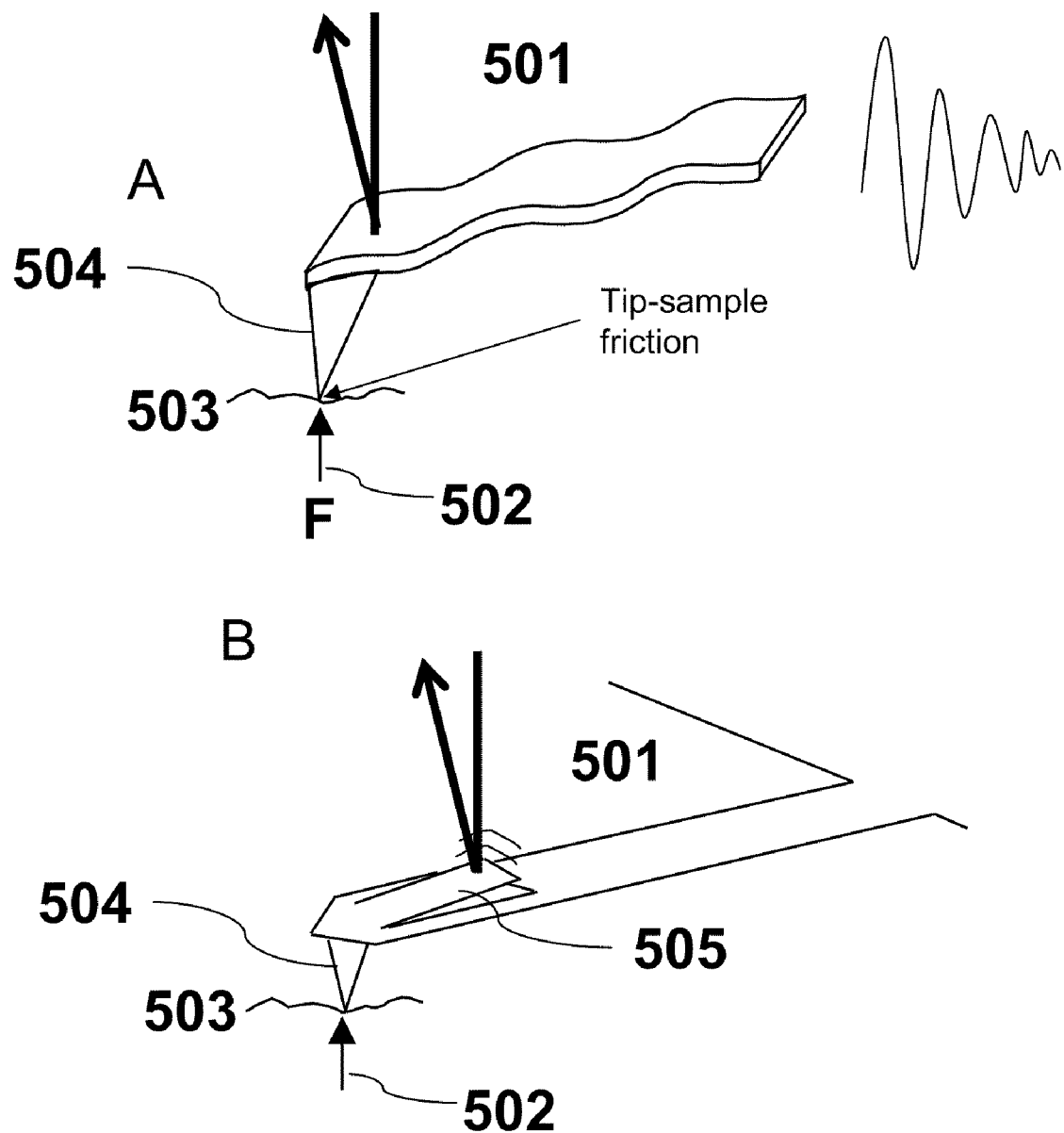
FIG. 5A shows a microcantilever embodiment without an internal resonator.
FIG. 5B shows a microcantilever embodiment with an internal resonator.

FIG. 5 illustrates two microcantilever embodiments. In both cases a microcantilever 501 has a tip 504 that is in contact with a surface 503. A pulsed force, F, 502 is generated at the contact point of tip 504 and sample surface 503. In the embodiment in FIG. 5A, the pulsed force 502 excites one or more contact resonant modes of the microcantilever 501. Because the tip 504 is in contact with a sample surface 503, dissipation between the tip and the sample dampens the oscillations of the cantilever due to the pulsed force 502 at the tip. When a standard AFM tip is in contact with a surface, frictional, hydrostatic, and viscoelastic forces can act to damp the oscillation of the cantilever. For this reason, contact resonant frequencies of an AFM cantilever may have a quality factor ~10, whereas the same cantilever may have a quality factor for a free resonance of several hundred.

In the embodiment in FIG. 5B, however, the microcantilever 501 has a freely resonant portion 505 which oscillates or rings substantially independently of damping between the tip and the surface. Free resonators such as this are useful, for example, for providing sensitive indicators of pulsed forces between a sample and a microcantilever tip. The reason is that the free resonators act as high quality factor oscillators that can amplify the detection of short duration forces, for example pulsed forces from rapid thermal expansion. The improvement in sensitivity comes in part from the decoupling of the free oscillator from the sample surface and partly from the ability to separately engineer and tune the resonant characteristics of the free resonator. As described above and in more detail below, these microcantilevers can provide improved measurements of infrared absorption of submicron regions of a sample. Additionally, they may be used to allow sensitive detection of other short duration forces, for example pulsed electrical and/or magnetic forces, deformations of a sample surface from acoustic and/or ultrasonic waves and/or other transient forces that can occur at the tip of an AFM.

Figure 6:
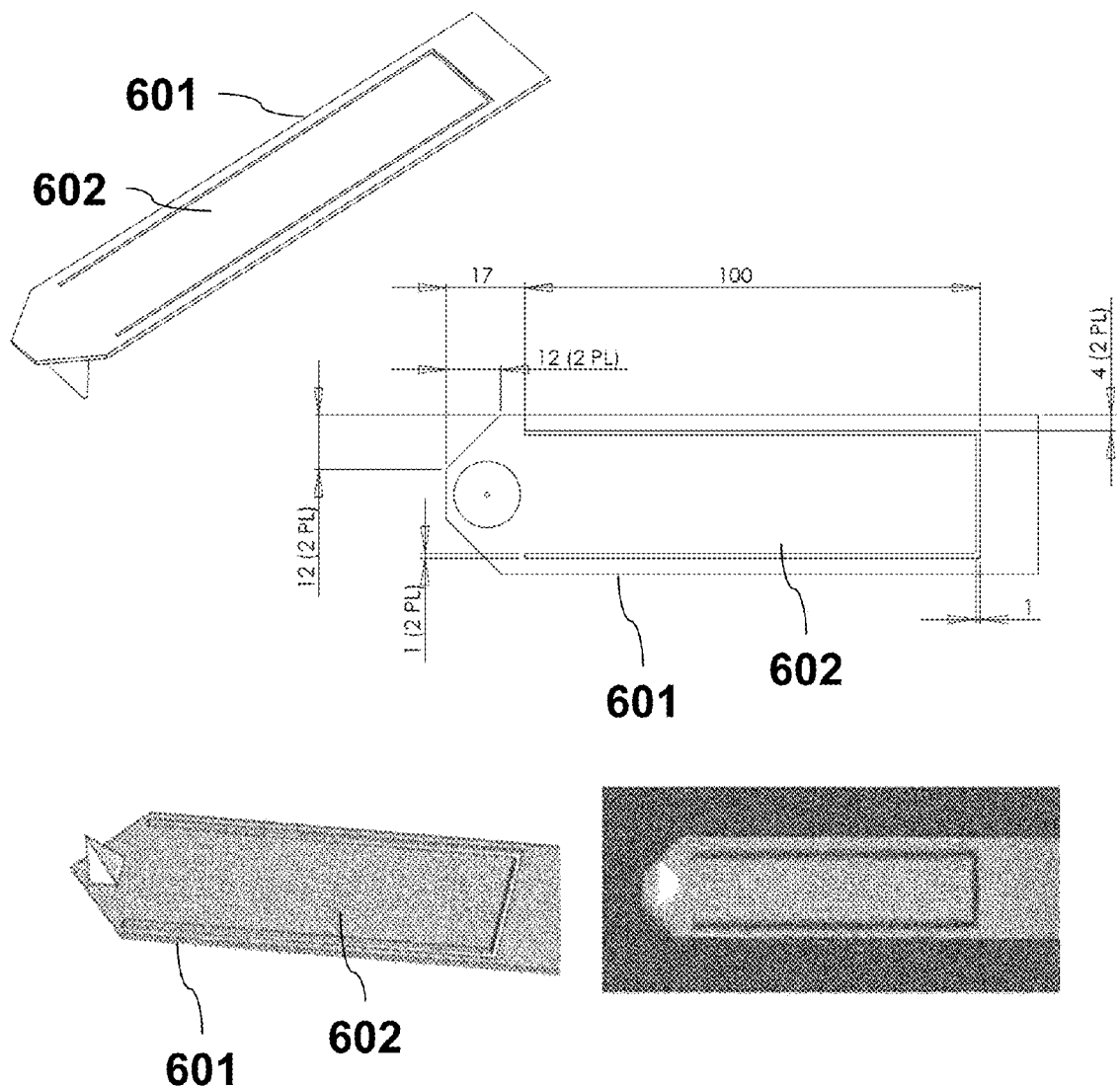
FIGS. 6 and 7 illustrate two additional microcantilever embodiments with internal resonators.
Figure 7:
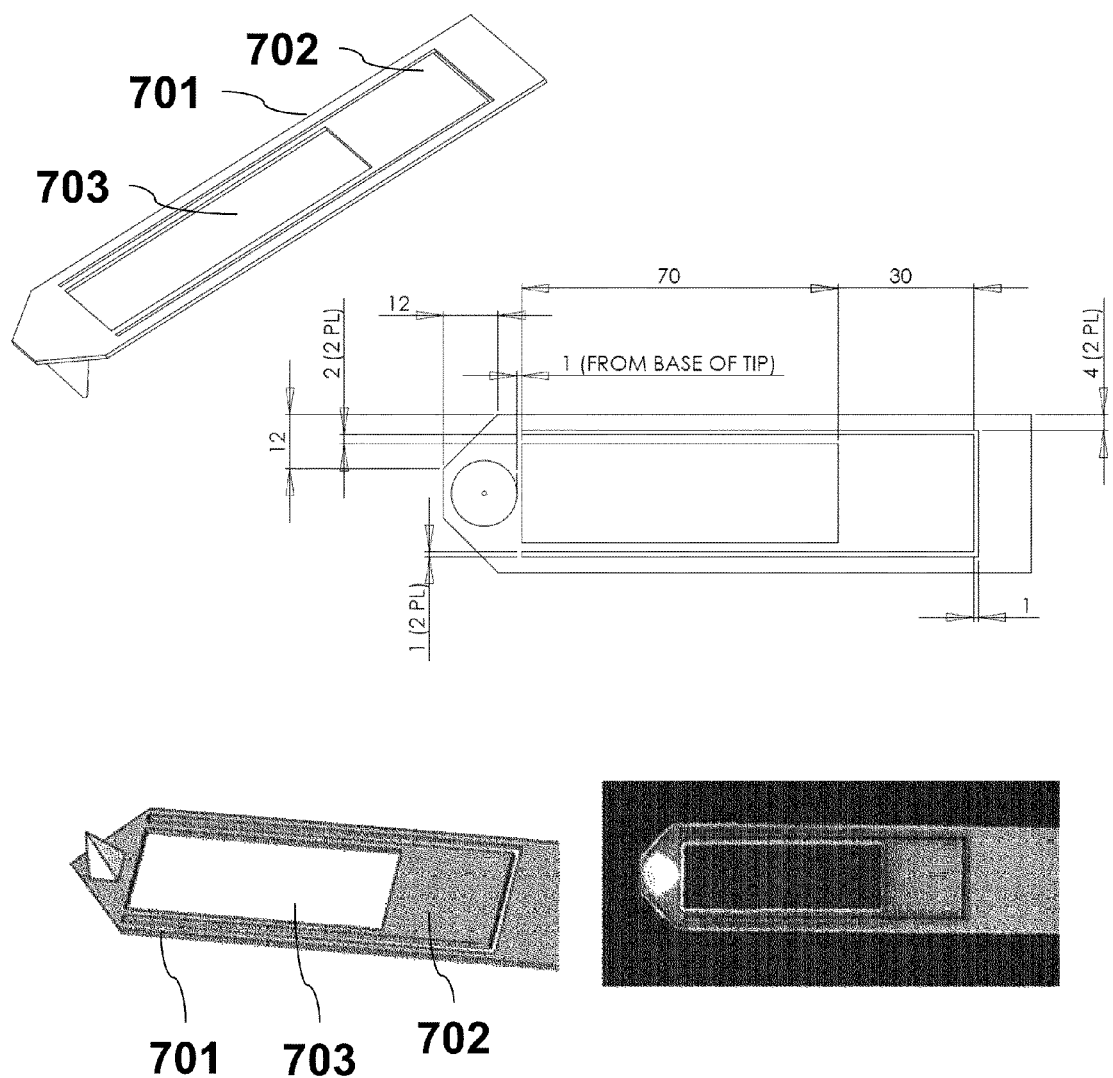

The figures below outline many different embodiments that provide free resonators incorporated with AFM cantilevers. FIGS. 6 and 7 illustrate two specific microcantilever embodiments. Dimensions shown in FIGS. 6 and 7 are in μm.

FIGS. 6 and 7 also provide electron micrograph images of cantilevers fabricated according to the shown designs. The microcantilever 601 in FIG. 6 features a single internal resonator 602 taking up a majority of the microcantilever surface area. The microcantilever embodiment of FIG. 7 also features a single internal resonator 701, but also includes an opening 702.

Figure 8:
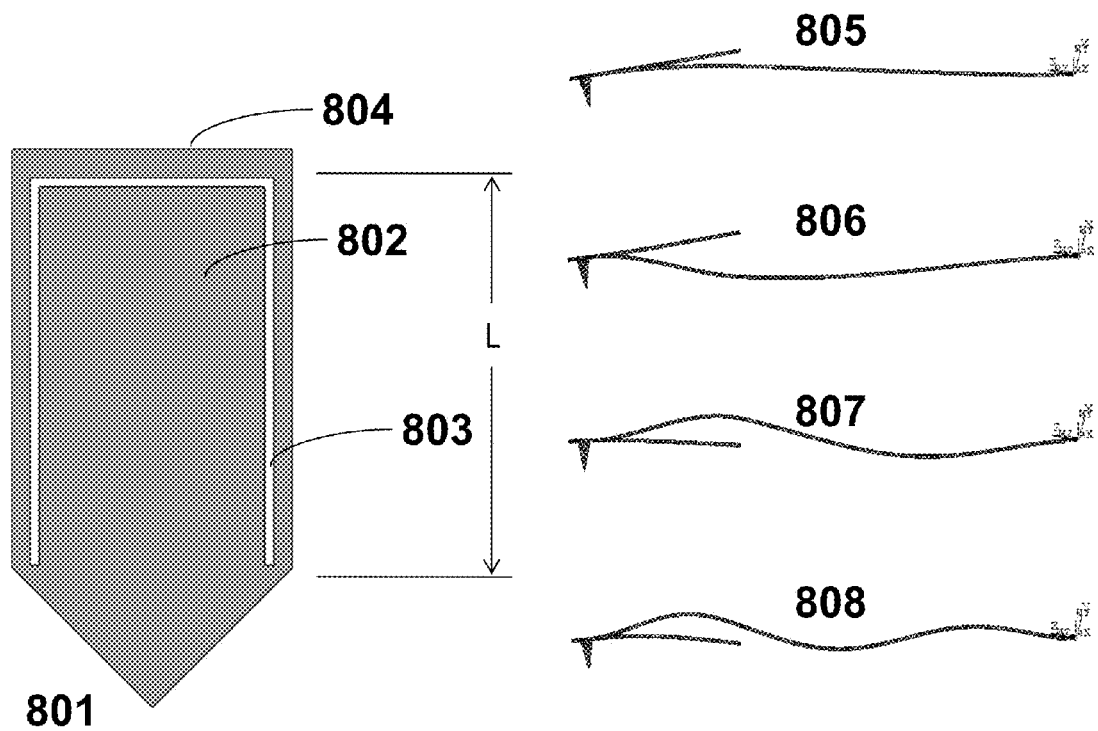
FIGS. 8, 9, 10, 11, 12, 13, 14, 15, 16, 17 and 18 illustrate additional microcantilever embodiments including one or more paddles or internal resonators.

The embodiment of FIG. 8 shows a microcantilever 801 which includes an internal resonator 802 of length L=100 μm surrounded by a gap 803 of 1 μm with a 2 μm border 804 of the main microcantilever periphery. The first four calculated contact mode flexural frequencies are $f_1$=53.372 kHz, $f_2$=139.56 kHz, $f_3$=362.82 kHz and $f_4$=854.86 kHz with respective flexural shapes 805, 806, 807 and 808.

Figure 9:
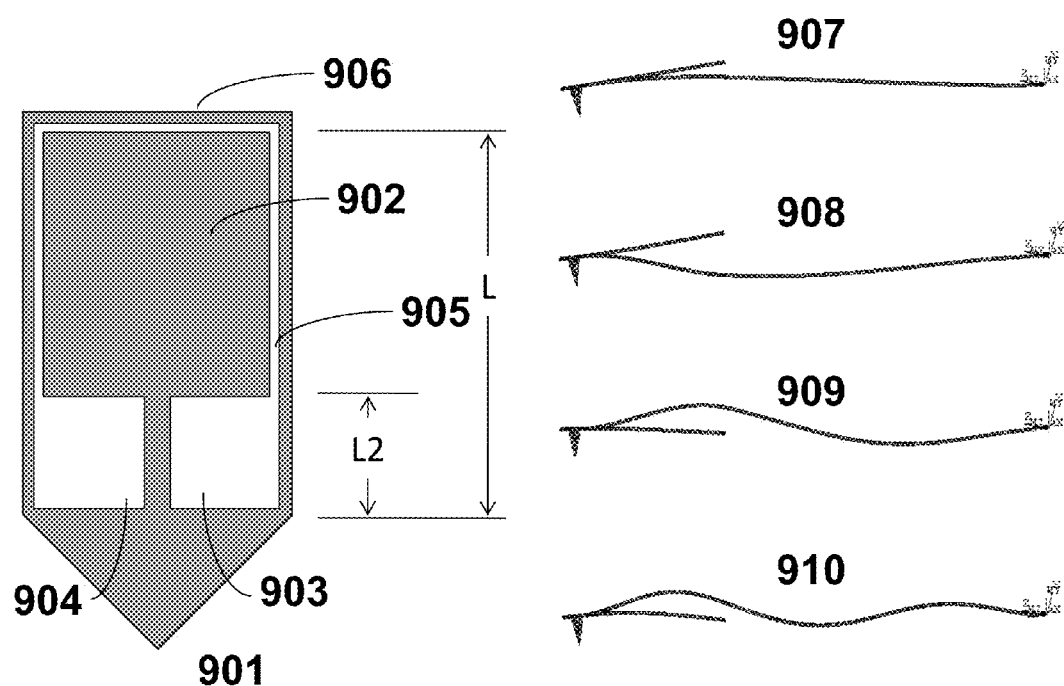

The embodiment of FIG. 9 shows a microcantilever 901 which includes an internal resonator 902 of length L=100 μm with two openings 903 and 904 of length L2=30 μm. A 1 μm gap 905 separates resonator 902 from a 2 μm border 906 of the main microcantilever periphery. The first four calculated contact mode flexural frequencies are $f_1$=49.440 kHz, $f_2$=111.51 kHz, $f_3$=349.33 kHz and $f_4$=786.01 kHz with respective flexural shapes 907, 908, 909 and 910.

Figure 10:
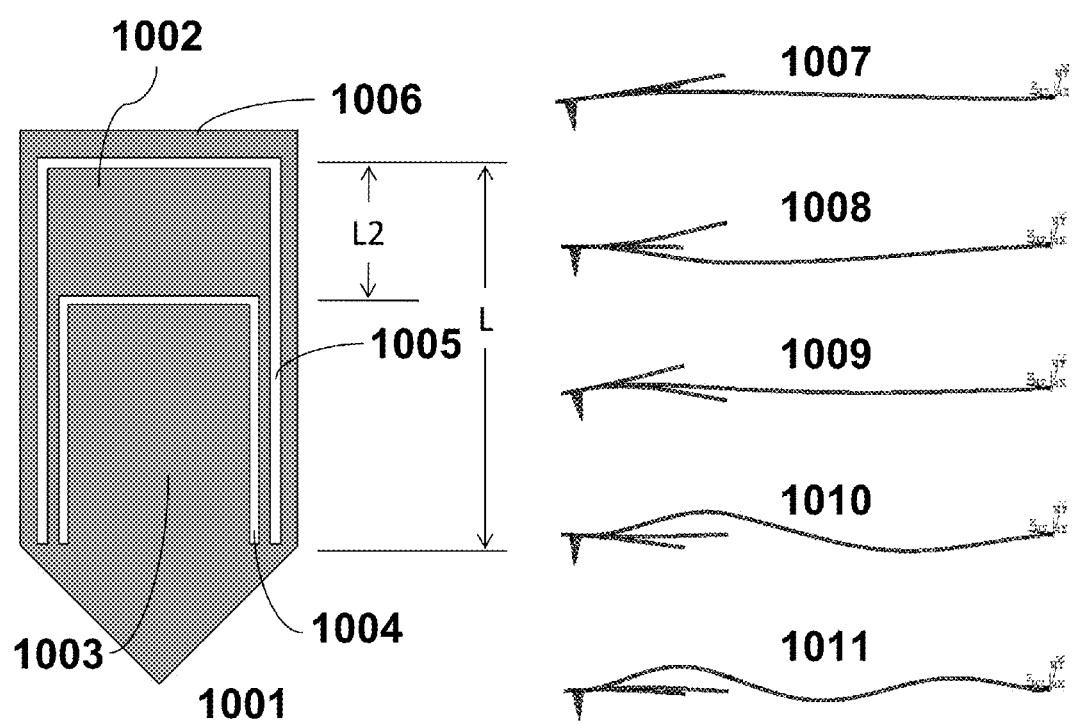

The embodiment of FIG. 10 shows a microcantilever 1001 which includes a first internal resonator 1002 of length L=100 μm with a second internal resonator 1003 of length L-L2=70 μm. Internal resonators 1002 and 1003 include a common fixed side, near to the microcantilever tip. A first 1 μm gap 1004 separates first internal resonator 1002 from second internal resonator 1003. A second 1 μm gap 1005 separates first internal resonator 1003 from a 2 μm border 1006 of the main microcantilever periphery. The first five calculated contact mode flexural frequencies are $f_1$=52.811 kHz, $f_2$=116.83 kHz, $f_3$=232.28 kHz, $f_4$=377.69 kHz and $f_5$=878.77 kHz with respective flexural shapes 1007, 1008, 1009, 1010 and 1011.

Figure 11:
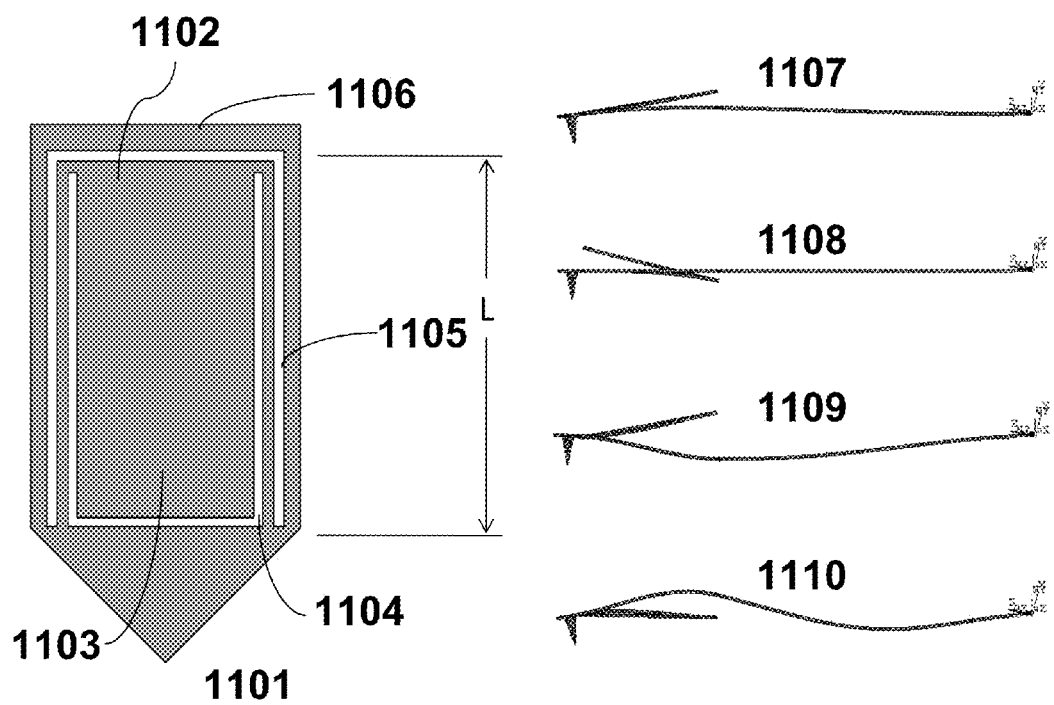

The embodiment of FIG. 11 shows a microcantilever 1101 which includes a first internal resonator 1102 of length L=100 μm with a second internal resonator 1103. Internal resonators 1102 and 1103 include opposite fixed sides. A first 1 μm gap 1104 separates first internal resonator 1102 from second internal resonator 1103. A second 1 μm gap 1105 separates first internal resonator 1103 from a 2 μm border 1106 of the main microcantilever periphery. The first four calculated contact mode flexural frequencies are $f_1$=51.455 kHz, $f_2$=106.23 kHz, $f_3$=114.75 kHz and $f_4$=357.48 kHz with respective flexural shapes 1107, 1108, 1109 and 1110.

Figure 12:
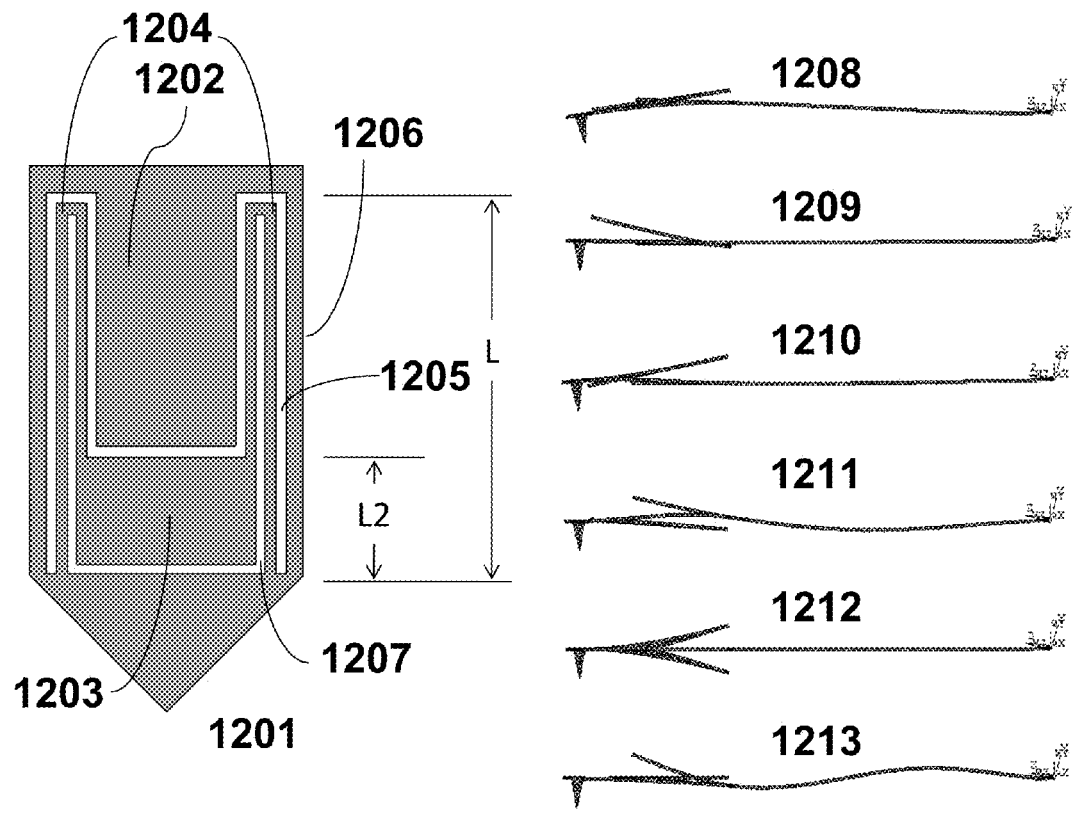

The embodiment of FIG. 12 shows a microcantilever 1201 which includes a first internal resonator 1202 of length L2-L1=70 μm with a second internal resonator 1203 having a main body of length L2=30 μm with folded support legs 1204 of length L=100 μm. A first 1 μm gap 1205 separates first internal resonator 1202 from second internal resonator 1203 and the inner of folded legs 1204 as well as the outer of folded legs 1204 from a 2 μm border 1206 of the main microcantilever. A second 1 μm gap 1207 separates the folded legs 1204 as well as the main body of second internal resonator 1203 from the tip region of the microcantilever. The first six calculated contact mode flexural frequencies are $f_1$=62.969 kHz, $f_2$=93.224 kHz, $f_3$=140.52 kHz, $f_4$=236.29 kHz, $f_5$=428.34 kHz and $f_6$=548.41 kHz with respective flexural shapes 1208, 1209, 1210, 1211, 1212 and 1213.

Figure 13:
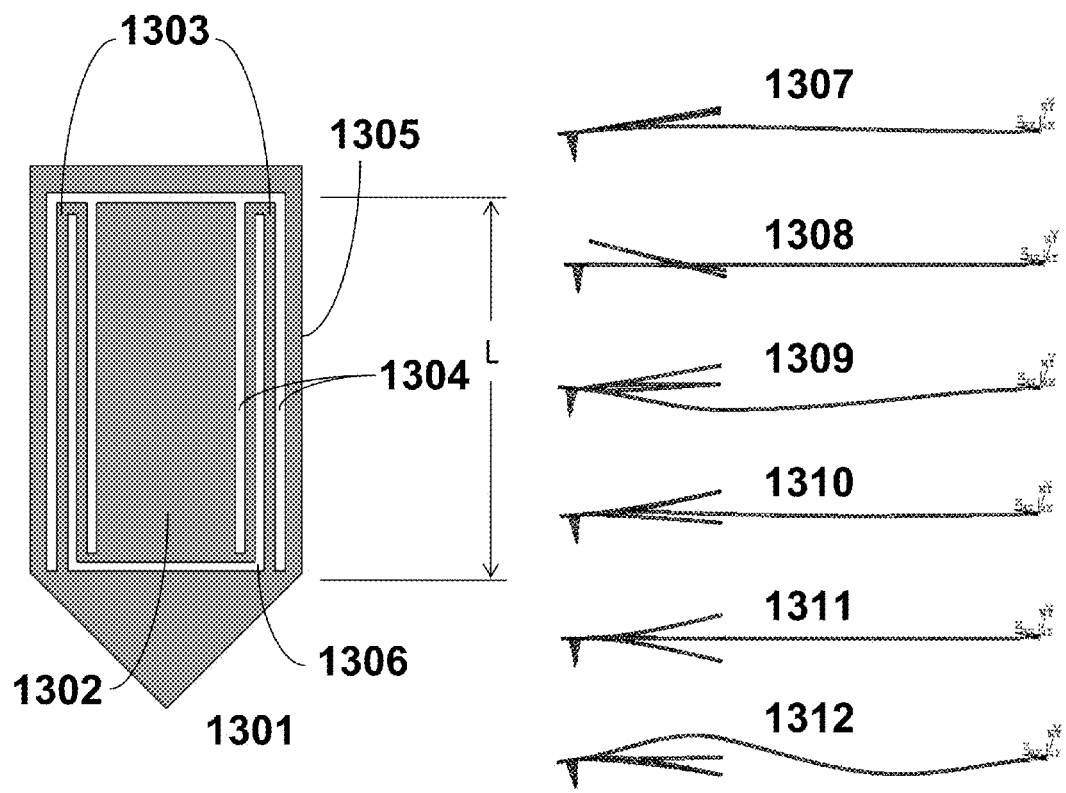

The embodiment of FIG. 13 shows a microcantilever 1301 which includes a single internal resonator 1302 of length L=100 μm with folded support legs 1303. A first 1 μm gap 1304 separates the main body of internal resonator 1302 and the outer of folded support legs 1303 from a 2 μm border 1305 of the main microcantilever periphery. First gap 1304 also separates the main body of internal resonator 1302 from the inner of folded support legs 1303. A second 1 µm gap 1306 separates the folded legs 1303 as well as the main body of first internal resonator 1302 from the tip region of the microcantilever. The first six calculated contact mode flexural frequencies are $f_1$=50.321 kHz, $f_2$=86.515 kHz, $f_3$=108.34 kHz, $f_4$=238.34 kHz, $f_5$=268.53 kHz and $f_6$=361.28 kHz with respective flexural shapes 1307, 1308, 1309, 1310, 1311 and 1312.

Figure 14:
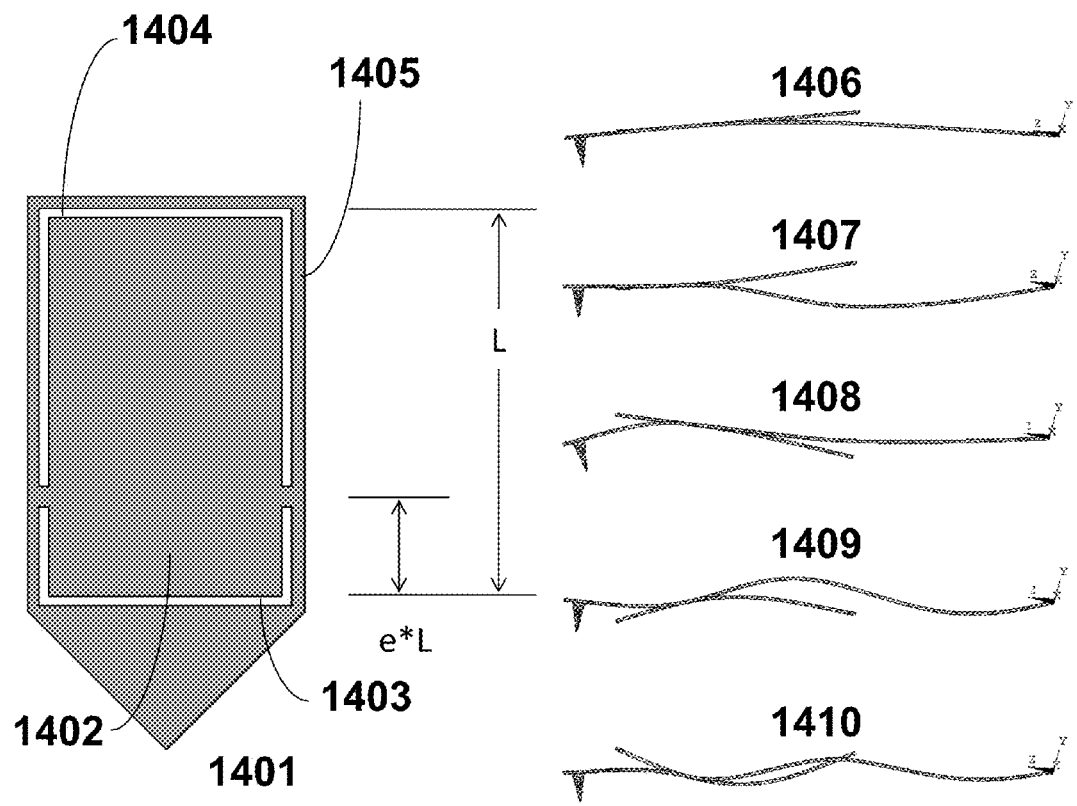

The embodiment of FIG. 14 shows a microcantilever 1401 which includes a single internal resonator 1402 of total length L=100 µm. Internal resonator 1402 is of a paddle design, with the tip/front facing portion having a length of e*L and the rear facing portion having a length (1−e)*L. In general, e can have a value selected between 0 and 1. A first 1 µm gap 1403 separates the tip/front facing portion of internal resonator 1402 from a 2 µm border 1404 of the main microcantilever periphery and the tip region of the microcantilever. A second 1 µm gap 1405 separates the rear facing portion of internal resonator 1402 from a 2 µm border 1404 of the main microcantilever periphery. The first five calculated contact mode flexural frequencies are $f_1$=37.020 kHz, $f_2$=161.52 kHz, $f_3$=216.36 kHz, $f_4$=596.46 kHz and $f_5$=733.36 kHz with respective flexural shapes 1406, 1407, 1408, 1409 and 1410.

Figure 15:
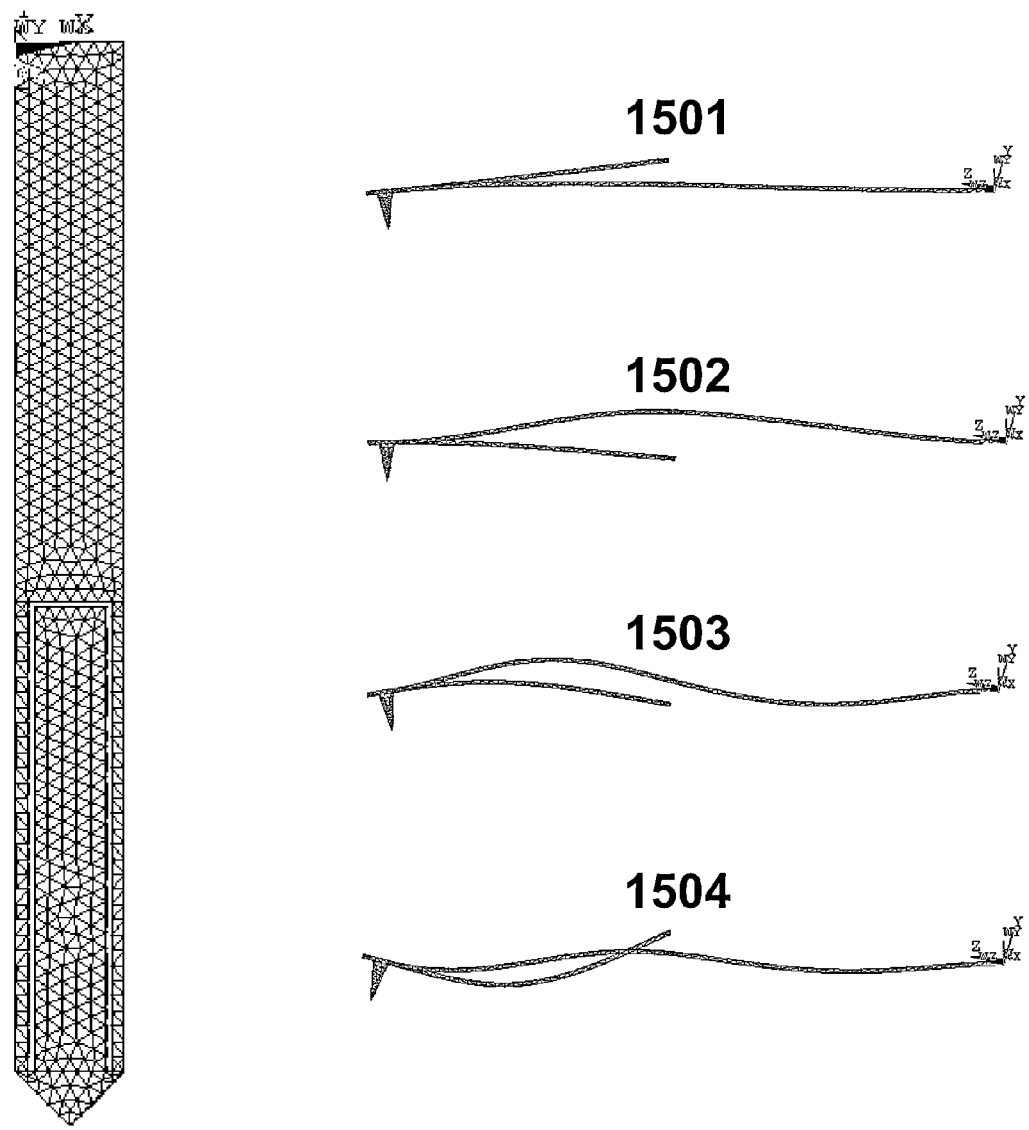

FIG. 15 shows a microcantilever embodiment with a single internal resonator. The first four calculated contact mode flexural mode frequencies are $f_1$=45.8 kHz, $f_2$=135.8 kHz, $f_3$=424.4 kHz and $f_4$=573.9 kHz with respective flexural shapes 1501, 1502, 1503 and 1504.

Figure 16:
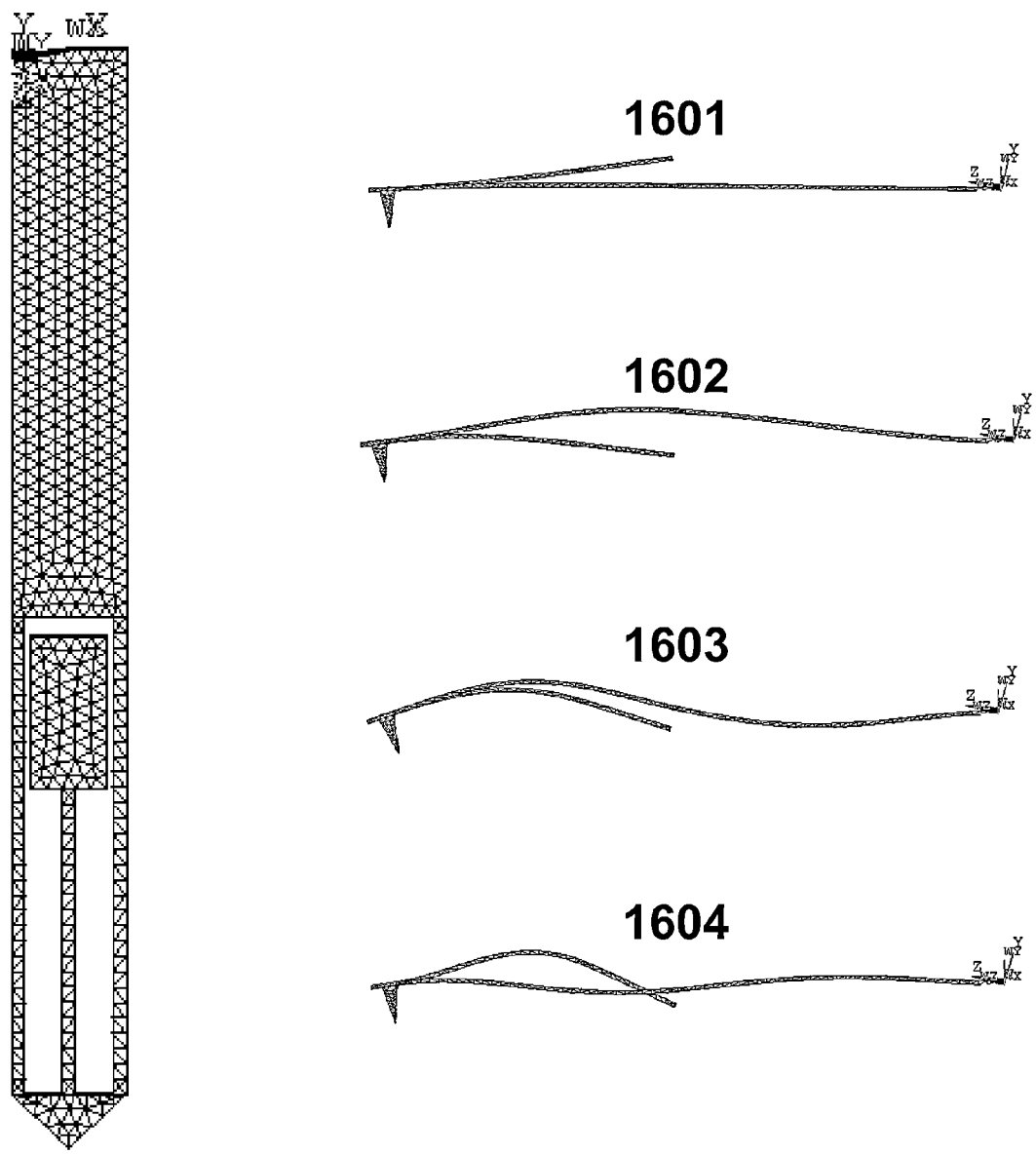

FIG. 16 shows a microcantilever embodiment with a single internal resonator, with openings similar to the embodiment shown in FIG. 9. The first four calculated contact mode flexural mode frequencies are $f_1$=39.9 kHz, $f_2$=119.0 kHz, $f_3$=381.8 kHz and $f_4$=534.4 kHz with respective flexural shapes 1601, 1602, 1603 and 1604.

Figure 17:
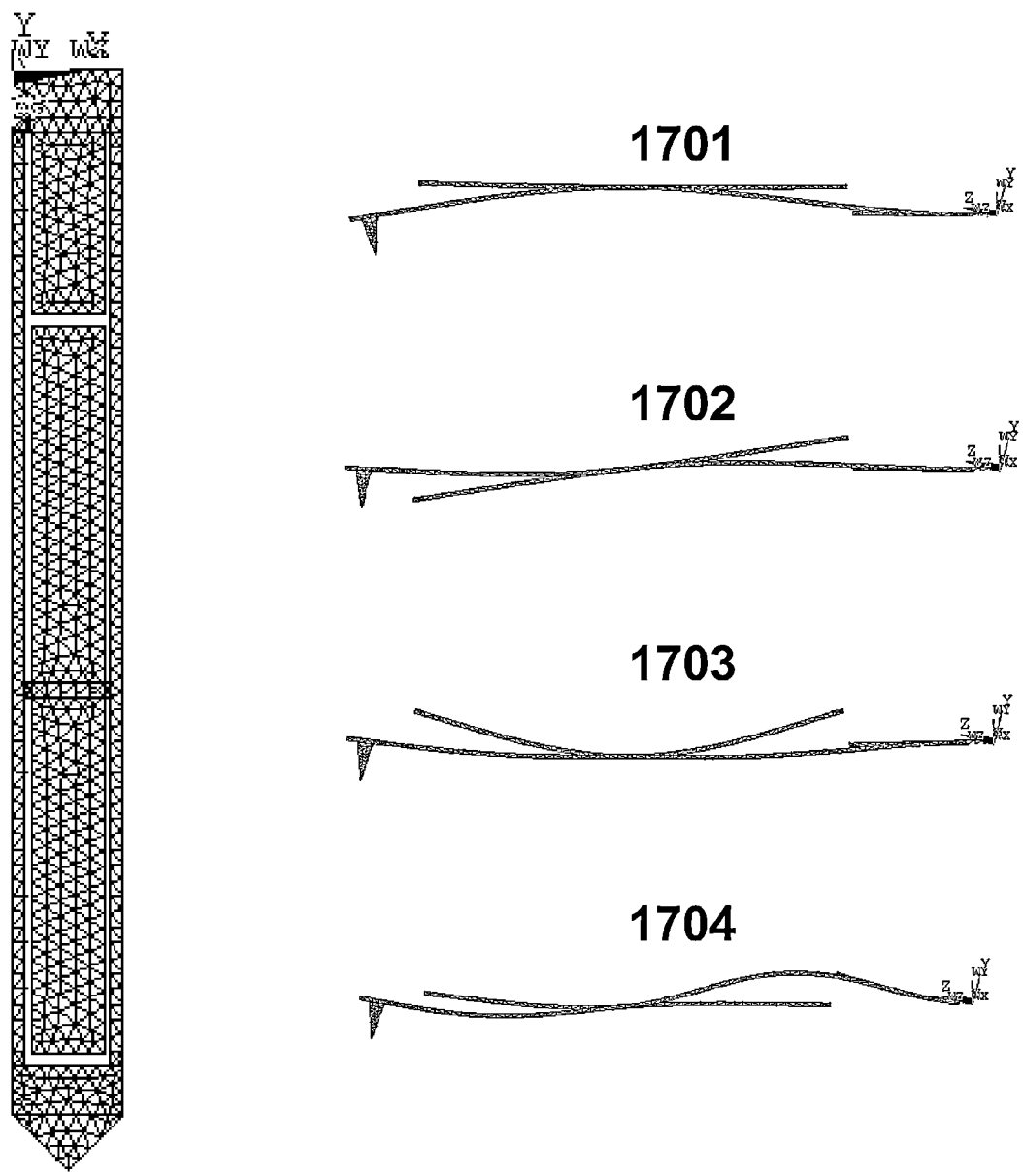

FIG. 17 shows a microcantilever embodiment with a first internal resonator near the microcantilever fixed end and a paddle type internal resonator. The first-four calculated contact mode flexural mode frequencies are $f_1$=48.6 kHz, $f_2$=85.6 kHz, $f_3$=295.5 kHz and $f_4$=465.5 kHz with respective flexural shapes 1701, 1702, 1703 and 1704.

Figure 18:
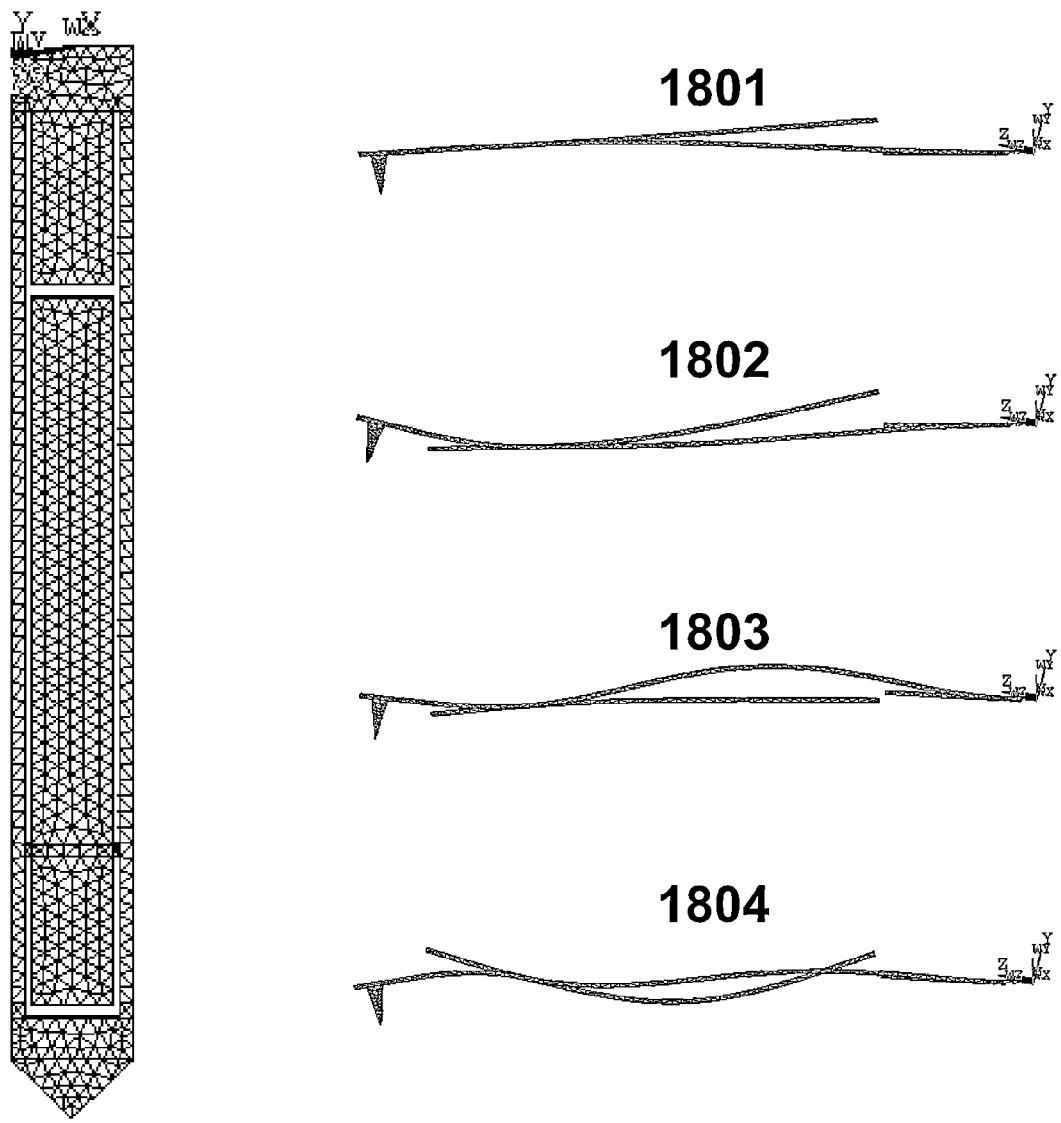

FIG. 18 shows another microcantilever embodiment with a first internal resonator near the microcantilever fixed end and a paddle type internal resonator. The first four calculated contact mode flexural mode frequencies are $f_1$=33.3 kHz, $f_2$=135.6 kHz, $f_3$=279.8 kHz and $f_4$=422.5 kHz with respective flexural shapes 1801, 1802, 1803 and 1804.

Figure 19:
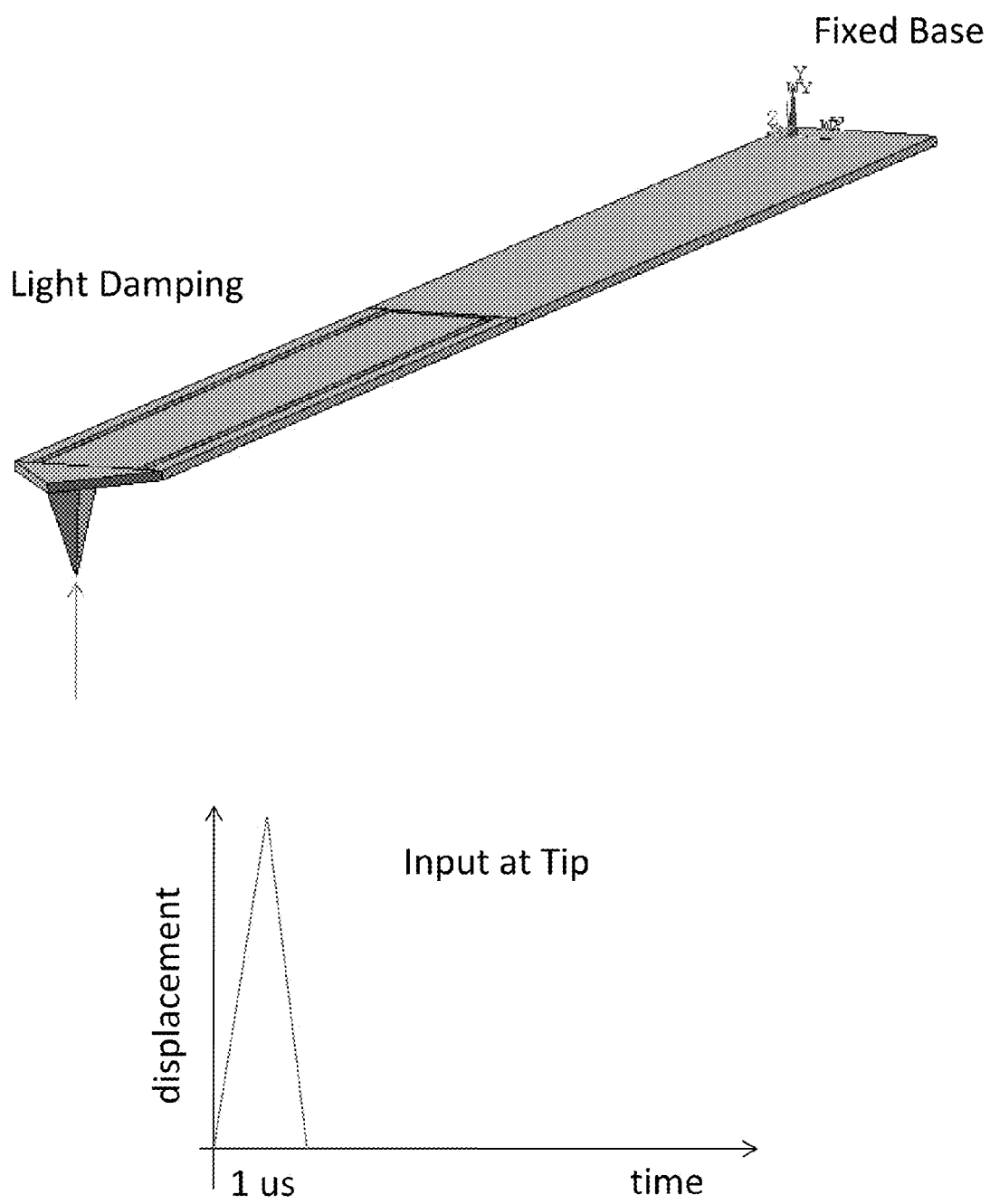
FIG. 19 illustrates the model used to calculate the contact mode flexural shapes and frequencies.
Figure 20A:
FIGS. 20A, 20B, 20C and 20D provide electron micrograph images of fabricated microcantilevers having one or more internal resonators.
Figure 20A:
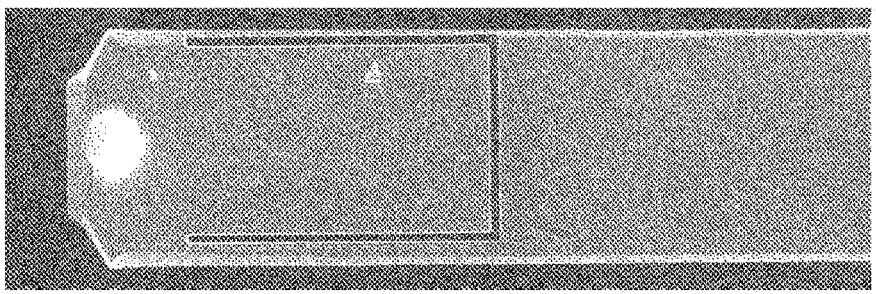
Figure 20A:
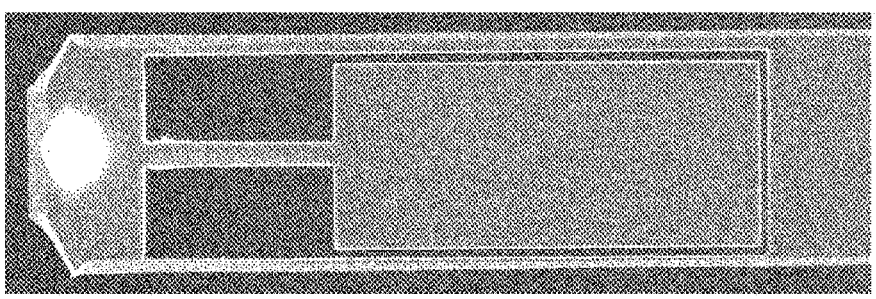
Figure 20B:
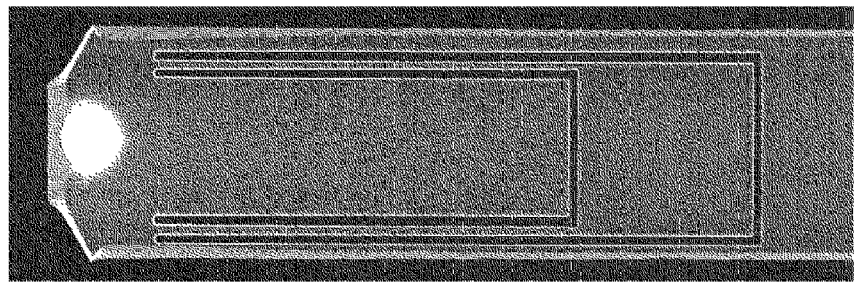
Figure 20B:
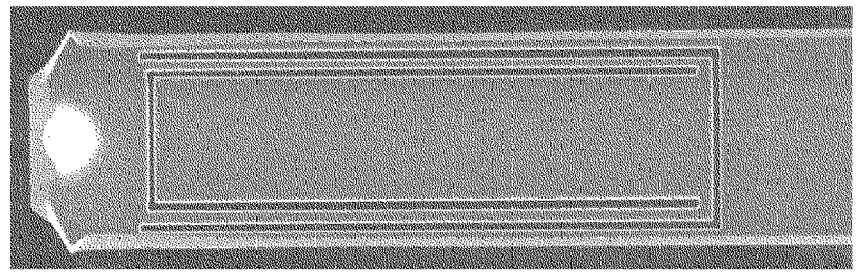
Figure 20B:
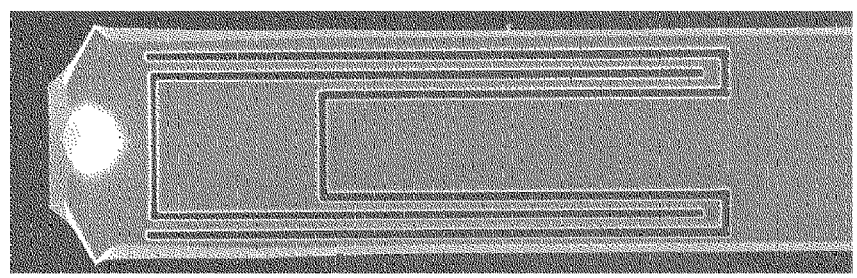
Figure 20C:
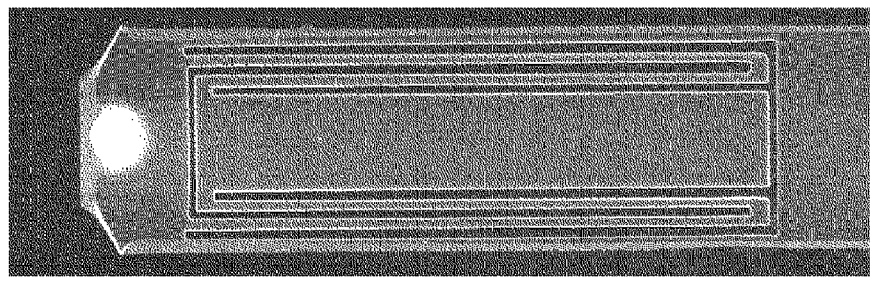
Figure 20C:
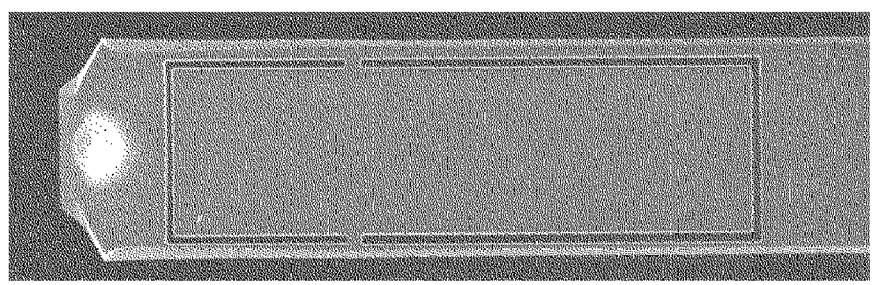
Figure 20C:
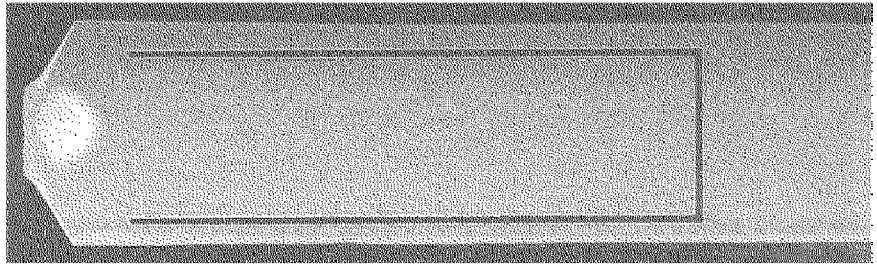
Figure 20D:
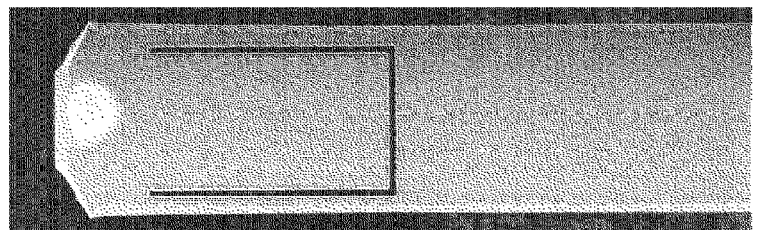
Figure 20D:
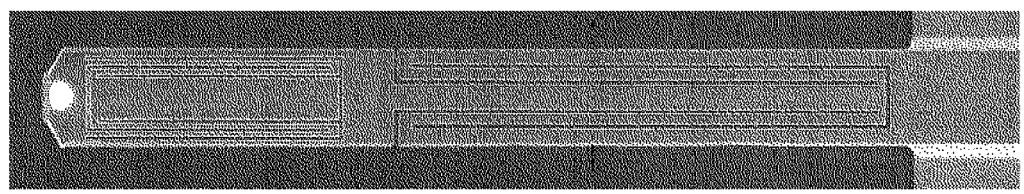

FIG. 19 illustrates the model used for calculation of the contact mode flexural mode frequencies and shapes. The microcantilevers have a fixed base and a simply supported tip. Light damping is used with a pulsed displacement of 1 µs duration to simulate a pulsed force at the tip.

FIG. 20A-20D show electron micrograph images of fabricated microcantilever embodiments with experimentally determined flexural mode frequencies and flexural mode quality factors (Q).

Figure 21:
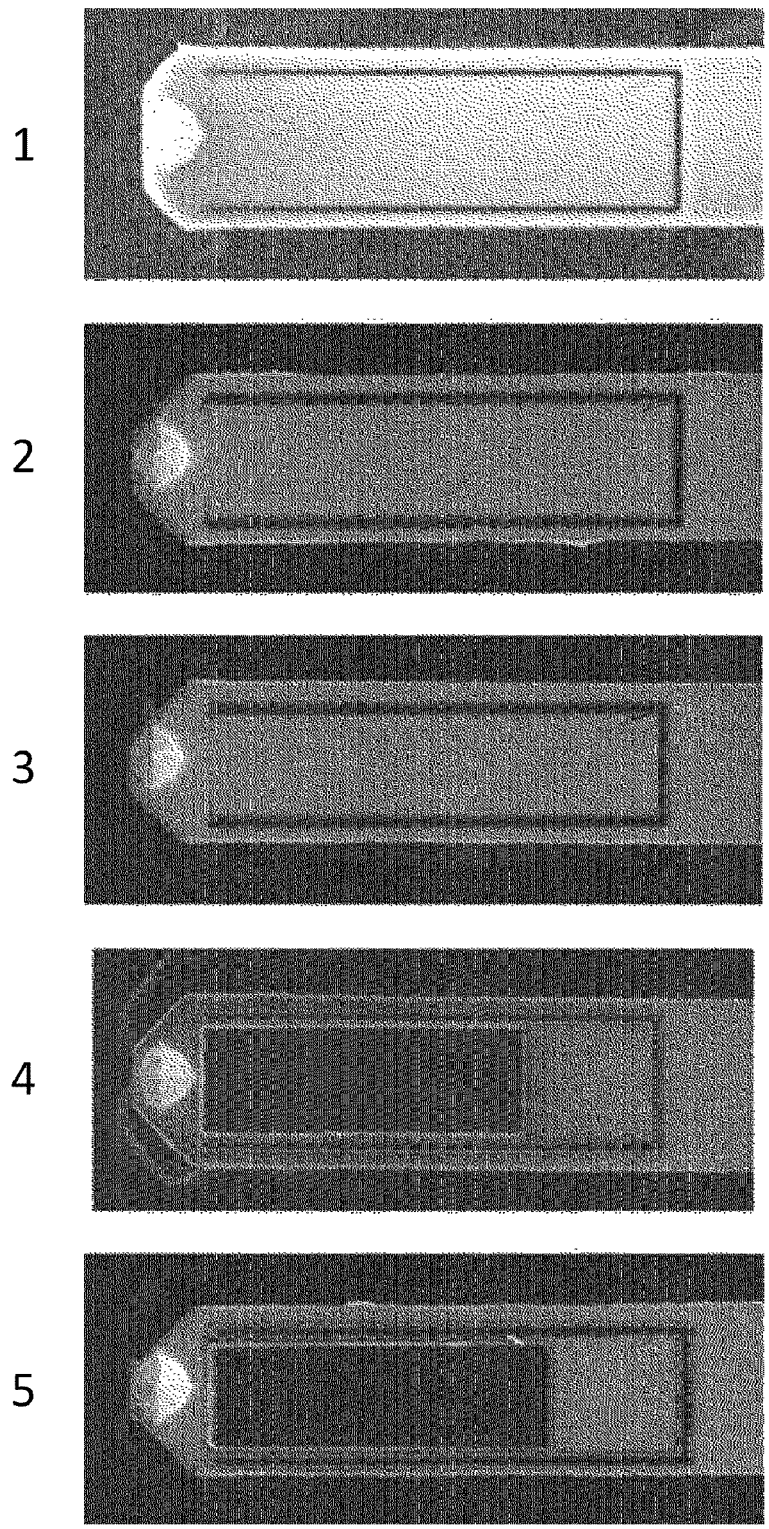
FIG. 21 provides electron micrograph images of fabricated microcantilevers having an internal resonator. The microcantilevers were CSC37B series before free ion beam milling removed portions to create the internal resonators.
Figure 22:
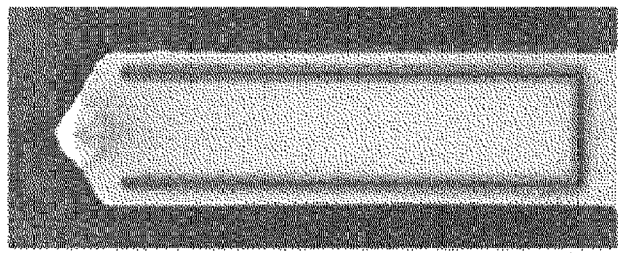
FIG. 22 provides electron micrograph images of fabricated microcantilevers having an internal resonator. The microcantilevers were NSC36C series before free ion beam milling removed portions to create the internal resonators.
Figure 22:
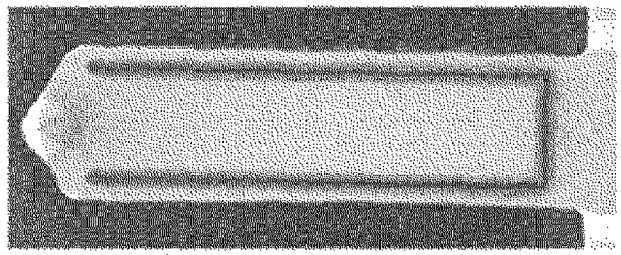
Figure 22:
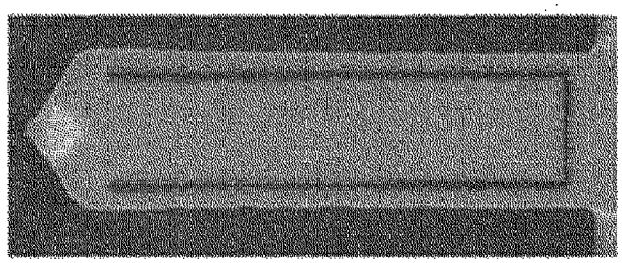
Figure 22:
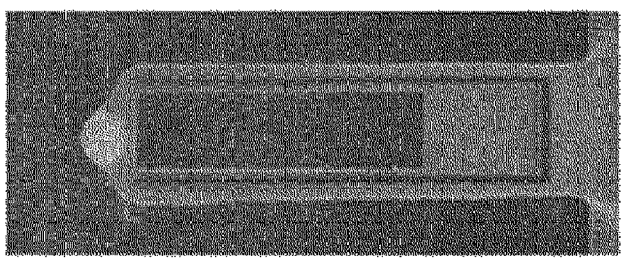
Figure 22:
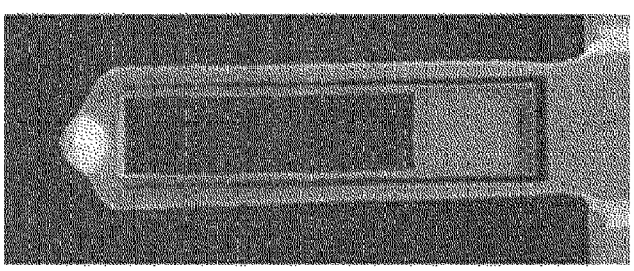
Figure 22:
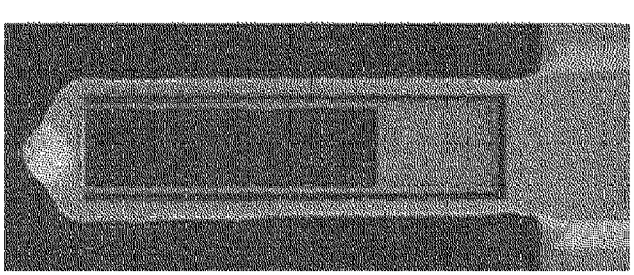

FIG. 21 shows electron micrograph images of five CSC37B series cantilevers which have undergone free ion beam milling to create a free resonator internal to the microcantilever. FIG. 22 shows electron micrograph images of six NSC36C series cantilevers which have undergone free ion beam milling to create a free resonator internal to the microcantilever.

The invention may be further understood by the following non-limiting examples.

EXAMPLE 1

Mechanical Design for Tailoring Resonance Harmonics of an Atomic Force Microscope Cantilever During Tip-Surface Contact This example describes an atomic force microscope cantilever design for which the second flexural mode frequency is tailored relative to the first mode frequency, for operation in contact with a substrate. A freely-resonating paddle internal to the cantilever reduces the stiffness of the second flexural mode relative to the first while nearly maintaining the mass of the original cantilever. Finite element analysis is used to predict the performance of various cantilever designs and several cantilevers are fabricated and tested. This strategy allows the ratio of the first two resonant modes $f_2/f_1$ to be controlled over the range 1.6-4.5. The ability to vary $f_2/f_1$ improves a variety of dynamic contact-mode measurements.

Introduction. The tip of an atomic force microscope (AFM) can measure nanometer-scale surface features and materials properties. Many AFM techniques have been proposed that use dynamic interaction of an AFM tip with a surface; the most widely used are those techniques that measure intermittent contact between an oscillating cantilever tip and a surface. Other dynamic approaches employ a tip in constant contact with a moving surface, in which mechanical energy is transferred from the surface, through the cantilever tip, and vibrates the cantilever. This type of dynamic contact measurement is used in piezoresponse force microscopy, scanning joule expansion microscopy, and for measuring adhesion, contact stiffness and chemical interactions.

While most dynamic AFM measurements are made at the first resonant mode, $f_1$, higher mode operation can improve contrast and resolution for many measurements. The relationship between $f_1$ and cantilever spring constant k, as well as the ratios $f_2/f_1$ and $f_3/f_1$ are well known for rectangular cantilevers. Other cantilever shapes provide different relationships between these cantilever characteristics. A number of strategies have been suggested to tune higher mode frequencies through the selective removal of mass along the length of the cantilever, ranging from simple rectangular notches to intricate geometrical cutouts. Other strategies add mass to specific locations of the cantilever or vary the cantilever thickness along its length.

These geometrical alterations enhance probe response in a number of AFM applications. Rectangular cutouts have increased sensitivity to material boundaries in Kelvin probe force microscopy (KPFM). Square notches have been designed to amplify the response of elastic modulus measurements to determine local material properties. These probes also detected features unresolved in fundamental mode operation. Secondary resonating structures loosely coupled to the contact mode probe improve the amplitude response in detecting piezoorientation in PFM by amplifying the probe input.

While not all of the modified probes focus on the effects of tuning the mode frequencies, tuning modes can improve AFM imaging in some cases. Tuning higher mode frequencies lower allows higher harmonics to pass through many electronic controllers that do not have the bandwidth to pass higher frequency information. Adjusting higher mode frequencies to harmonic multiples of the fundamental also provides an additional amplification. Mode frequency tuning can additionally be useful for tuning the cantilever response to the input signal to the substrate in dynamic contact mode applications. This example describes an AFM cantilever design for contact mode operation where the ratio of second resonance frequency to first resonance frequency ($f_2/f_1$) is controllable over the range 1.61-4.56, with 3.25 being the ratio of a regular cantilever beam in contact.

Cantilever design. For a cantilever operating in intermittent contact with a surface, the frequency of a specific vibration mode can be reduced by removing material from the highest flexural stress locations of that mode. For a cantilever in contact with a surface, the locations of highest flexural stress are in different locations than a freely resonating cantilever. To decrease the $f_2/f_1$ ratio, mass must be removed from the two max stress locations of the second mode shape, while retaining as much mass as possible at high stress locations in the first mode shape.

FIG. 3A shows the engineered AFM cantilever, which has a paddle in the middle of the cantilever that can vibrate freely. The paddle ends are located in the region of maximum stress of the second resonant mode. This strategy provides a larger tuning range over edge cutouts since edge cutouts reduce the mass and do not serve to greatly influence the resonance frequency for contact mode operation. The present design reduces stress at the locations of maximum stress while mostly preserving the cantilever mass.

FIG. 3B shows a fabricated cantilever. Prior to modification, the silicon cantilever was rectangular with a length of 350 μm, a width of 35 μm and a thickness of 2 μm. The cantilever had a nominal stiffness of 0.3 N m-1 before modification. The paddle was fabricated using an FEI Strata DB235 focused ion beam (FIB) to etch the patterns in a commercial silicon cantilever. The FIB ion emission current was maintained at 2.2 μA with a lens voltage of 30 kV. The emission current was reduced using a 7000 pA aperture to make the milling spot size 150 nm. This aperture choice was chosen based on the feature sizes of the milled areas and time. The etching pattern was constructed from a set of rectangles totaling 836 μm², and the time to etch through 2 μm thickness took approximately 1.5 h. The features were etched with a 1 μs dwell time and a beam overlap of 50%. The internal paddle has a length of 180 μm and a width of 27 μm, with the axis of rotation at the center of the paddle located 197 μm from the base of the cantilever beam. A second cantilever attached at the base is a result of the cutouts. It has a width of 27 μm and a length of 88 μm. This second cantilever is loosely coupled to the rest of the structure and does not significantly influence the cantilever dynamics. Note that the cantilever tip can be maintained sharp during this fabrication such that it can be used for measuring nanoscale features of a sample. Cantilevers of these and related geometries can also be fabricated using bulk microfabrication, for example photolithographic and/or e-beam patterning techniques.

A finite element model simulated the modified cantilever deflection and resonance characteristics to predict cantilever mechanical behavior. The three-dimensional model had an element size sufficiently small so that further decreases in element size resulted in negligible solution changes. The boundary conditions of the cantilever fixed the displacement at the base and simply supported the point of the tip to simulate the cantilever in contact with a substrate. A block Lanczos modal analysis produced the mode shapes.

FIG. 4 shows the cantilever flexural shape of the first four resonant modes. The shapes of the modes provide insight into the high stress locations of the modified cantilever, as well as information about the slope of the cantilever response along the length of the beam, which is the dominant signal for the AFM laser detection. The first mode shape exhibits a half sine standing wave pattern with a maximum at the location of the paddle's axis of rotation. Because the slope at this maximum is always zero, the slope along the entire length of the paddle is always zero. The second mode shape resembles a full sine standing wave pattern with a maximum slope at the paddle axis of rotation. Thus, the entire length of the paddle similarly contains this maximum slope along the entire length of the beam. The third mode shape is similar to the first, but now the paddle and the cantilever are oscillating out of phase, causing the paddle to flap at each end. The fourth mode shape is similar to the second, with the key difference again being the out of phase motion between the paddle and cantilever.

Figure 23:
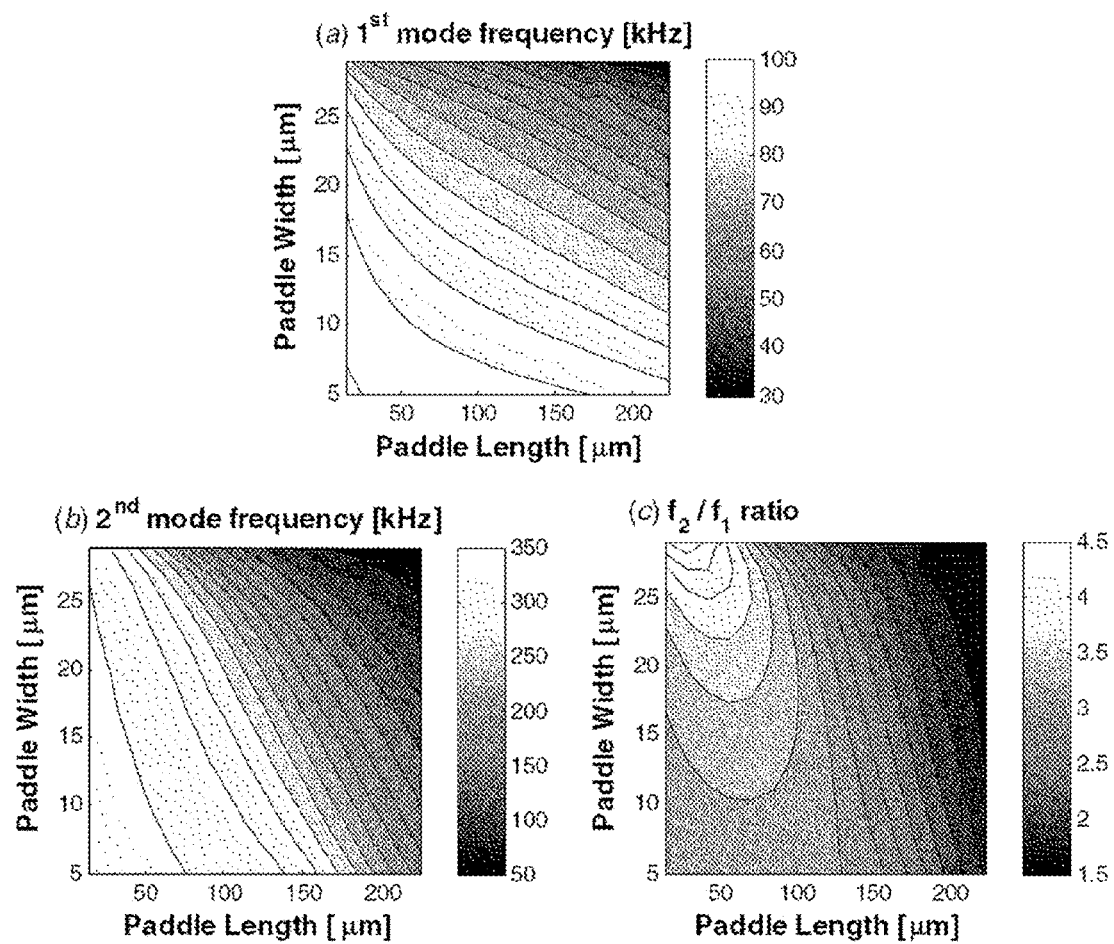
FIG. 23 shows the first and second mode frequency response of an internal paddle cantilever 350 μm in length, 35 μm wide and 2 μm thick as a function of internal paddle length and width.

The mode frequencies were simulated across a range of paddle lengths and widths to better understand the dynamics of the device and to predict the values of the mode frequencies. FIG. 23 shows the first and second mode frequency response of an internal paddle cantilever 350 μm in length, 35 μm wide and 2 μm thick as a function of internal paddle length and width. FIG. 23(a) shows the first mode frequency, and FIG. 23(b) shows the second mode frequency both as a function of paddle width and length. FIG. 23(c) shows the ratio of the second mode shape to the first. When the paddle width and length are both small, the $f_2/f_1$ ratio remains close to that of a normal cantilever, which is 3.25. If the paddle width is small and the length is increased, there is a decrease in the second mode frequency as the notches begin to relieve stress in the points of maximum stress in the second mode, while the first mode frequency remains roughly constant. When the paddle is short and wide, most of the stress is relieved in the maximum stress point of the first mode shape, resulting in a spike of $f_2/f_1$ with a calculated value of 4.5. The ratio is at a minimum when both the length and the width of the paddle are maximized at a value of 1.6. Varying the paddle center of mass and axis of rotation revealed that the ratio was optimized and the response behaved well when the center of mass was on the axis of rotation and when the axis of rotation coincided with the location of maximum slope of the cantilever's second contact mode. Overall, the predictions show that the ratio $f_2/f_1$ could be tailored over the range 1.6-4.5.

Figure 24:
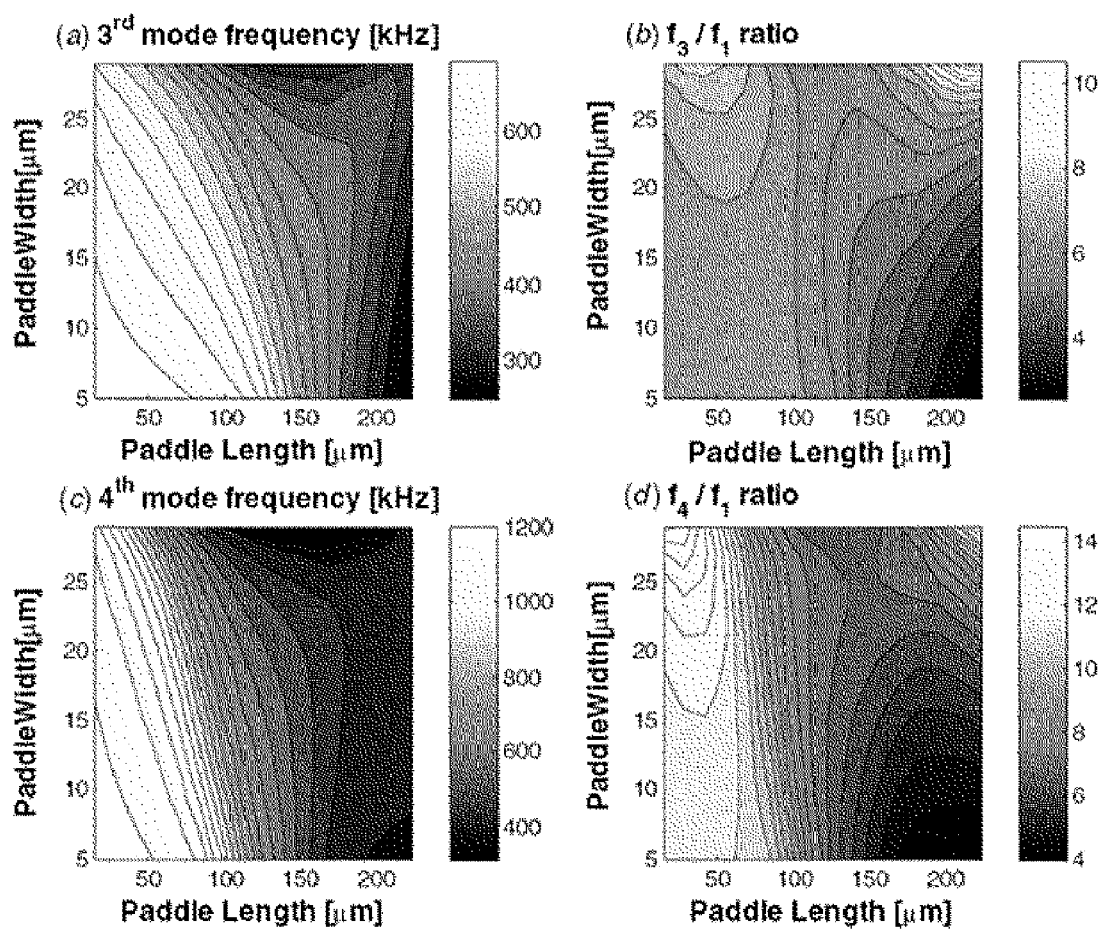
FIG. 24 shows the third and fourth mode frequency response of an internal paddle cantilever 350 μm in length, 35 μm wide and 2 μm thick as a function of internal paddle length and width.

FIG. 24 shows the third and fourth mode frequency response of an internal paddle cantilever 350 μm in length, 35 μm wide and 2 μm thick as a function of internal paddle length and width. FIG. 24(a) shows the frequency dependence on paddle width and length for the 3rd mode, and FIG. 24(b) shows the ratio of the third mode to the first. Similarly, FIG. 24(c) shows the frequency dependence on paddle width and length for the fourth mode, and FIG. 24(d) shows the ratio of the fourth mode to the first. The cutouts reduce the ratios of both the third and fourth modes in a similar fashion to the second, followed by increases in the ratio for long widths and lengths due to the inclusion of more maximum slope points along the cutouts.

Figure 25:
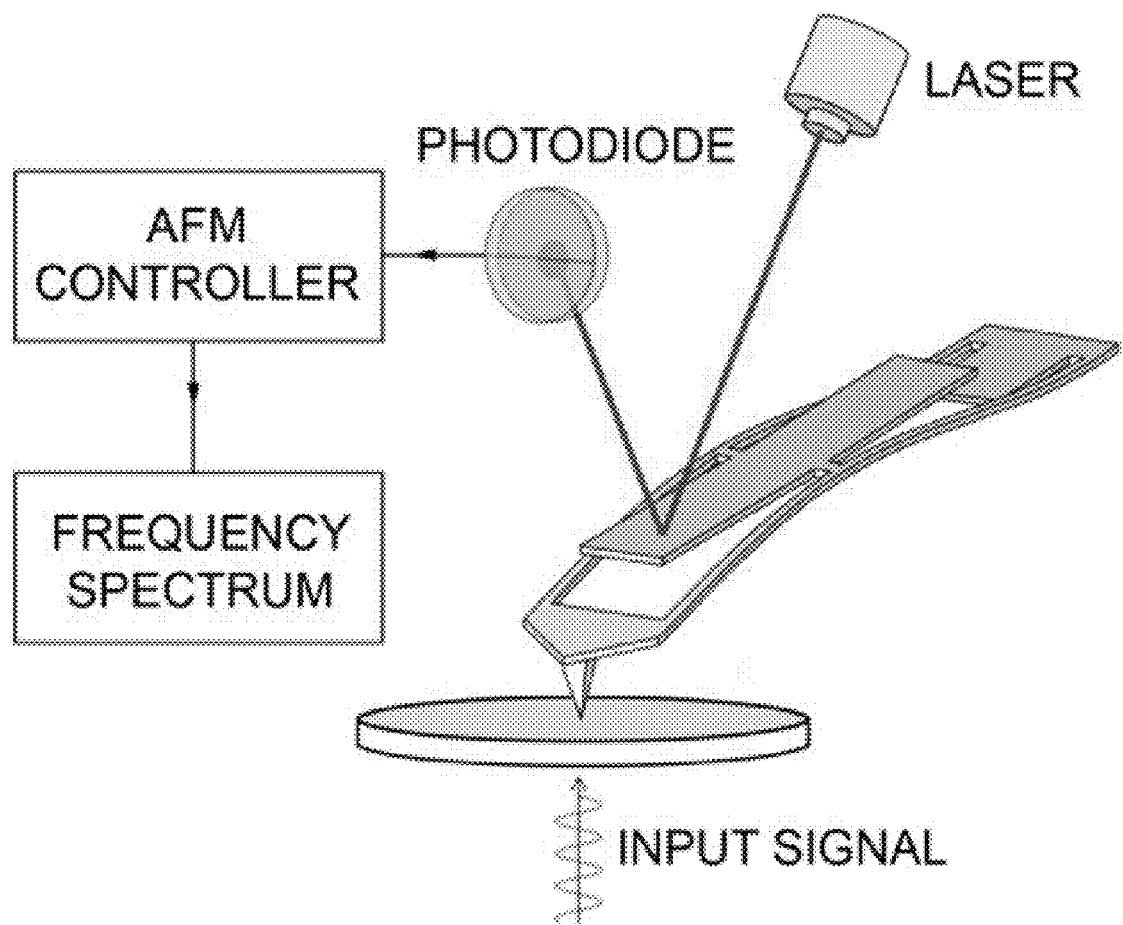
FIG. 25 shows an experimental setup for determining the frequency response of a microcantilever.

Experiment. Separate experiments were performed on rectangular cantilevers and cantilevers having the internal paddle. FIG. 25 shows the experimental setup. We mounted the cantilevers in a MFP-3D AFM system and we measured their resonance characteristics for the tip out of contact with a substrate and for the tip in contact with the substrate. A piezoceramic actuator served as the substrate for the in-contact experiments, which was driven by a noise signal from a function generator. The detection laser measures the deflection of the cantilever which is collected using the photodiode. The AFM controller integrated the laser input to the photodiode over time to produce the resonance spectra shown. The piezoceramic excitation was necessary to achieve a good signal to noise ratio in the response.

Figure 26:
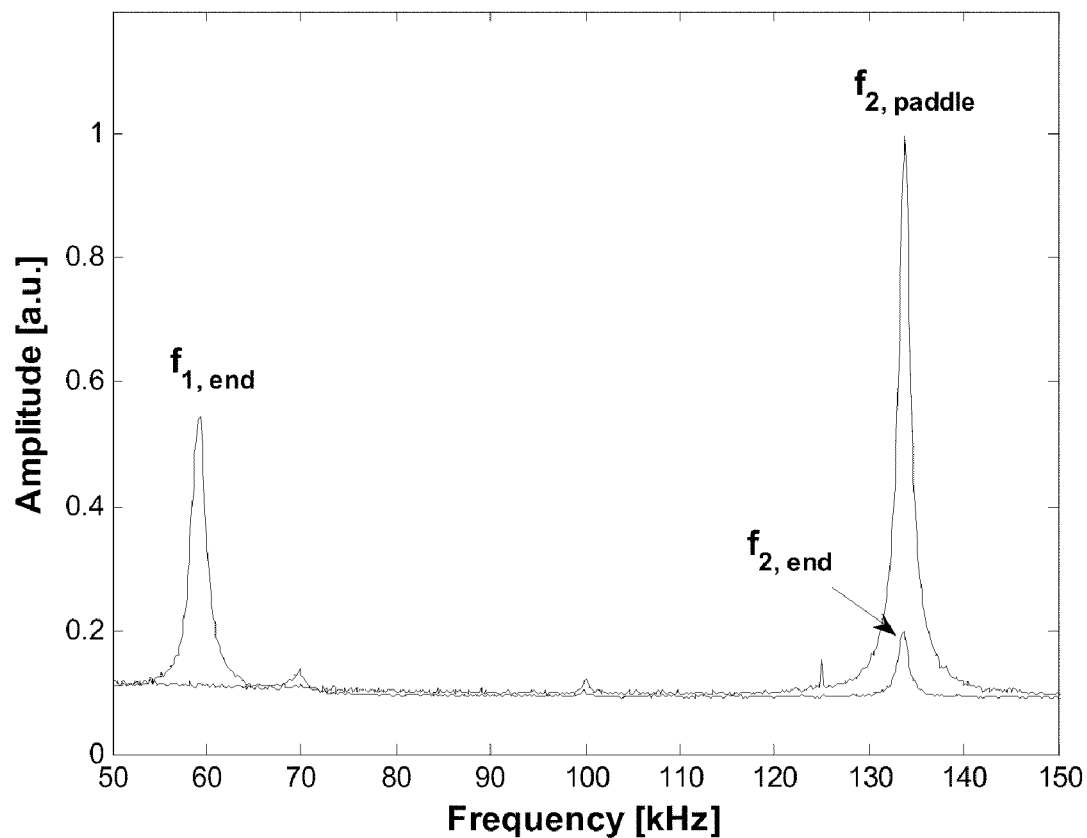
FIG. 26 provides a frequency spectrum for an internal paddle microcantilever for two deflection detection laser positions.

We obtained the frequency spectra for an internal paddle cantilever with the deflection detection laser positioned at various points along the cantilever to compare to the model and to determine the optimal detection point. FIG. 26 shows the experimental relationship between the position of the reflected laser spot on the cantilever and the measured resonant characteristics for the first two modes of an internal paddle cantilever. When the laser was directed at the end of the cantilever, the frequency spectrum showed a more pronounced first mode and a second mode response roughly five times smaller. The third mode response was barely detected, and no higher modes were found. When the laser was positioned on the end of the internal paddle, the frequency spectrum did not detect the first mode shape, confirming the simulation results that the paddle slope does not change at the frequency of the first mode. The second mode response was almost an order of magnitude greater than when the laser was positioned on the tip, and two additional modes beyond the third were detected. We chose a laser position for subsequent experiments such that the spot size covered both the tip of the beam and the end of the paddle to find a good balance between detecting the first mode and detecting the larger signal of the second mode from the paddle.

Figure 27:
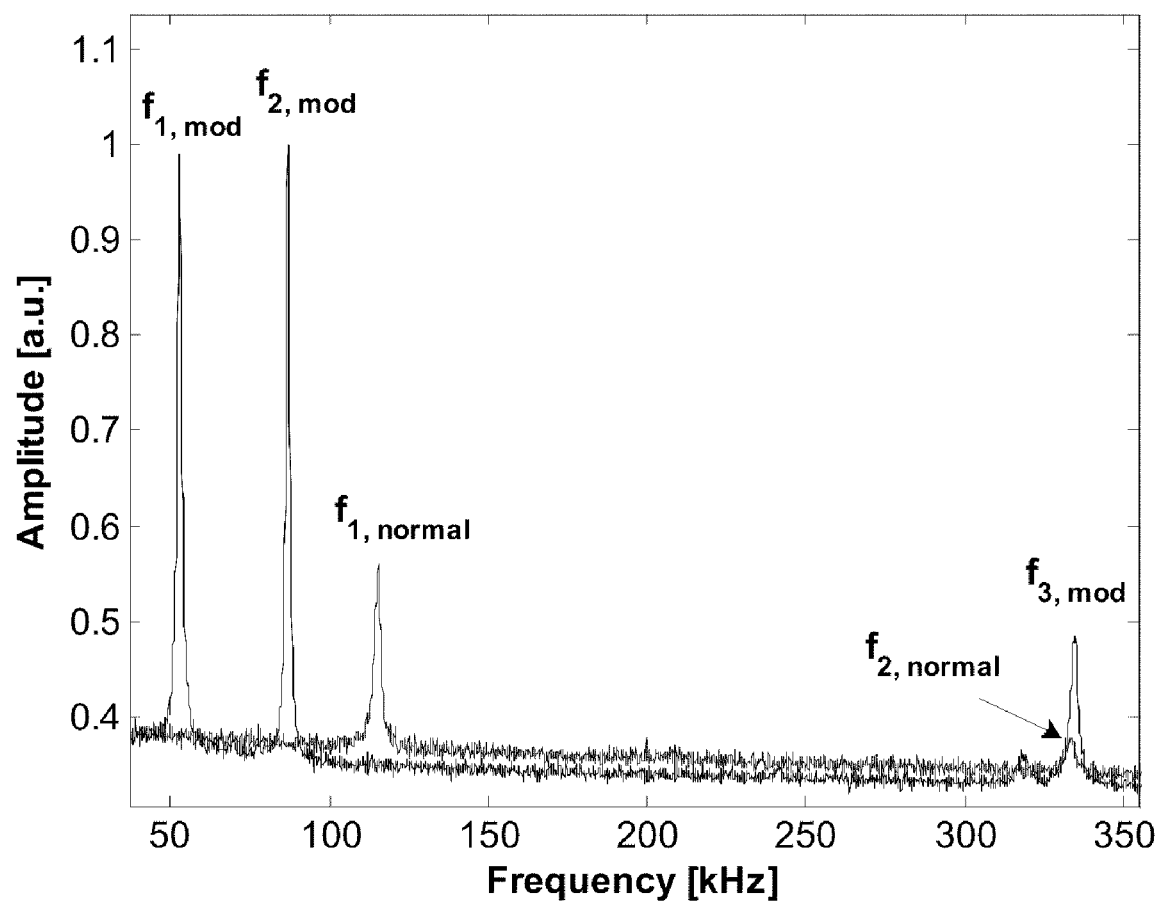
FIG. 27 provides frequency spectra of an unmodified microcantilever and a microcantilever with an internal paddle.

After determining the laser position, we measured the frequency spectra for both an unmodified rectangular cantilever and a cantilever with an internal paddle. FIG. 27 compares the first two modes of the unmodified cantilever to the first three modes of the modified cantilever. The original rectangular cantilever had in-contact mode frequencies $f_1=114.9$ kHz and $f_2=333.1$ kHz, with $f_2/f_1=2.90$ compared to 3.25 from simulation. The modified cantilever had mode frequencies $f_1=53.1$ kHz, $f_2=86.9$, and $f_3=334.7$ kHz, with $f_2/f_1=1.64$. In addition to the greatly reduced ratio between the second and first mode, the modified cantilever showed a much stronger signal than the unmodified cantilever. Table I compares the experimental frequencies with values predicted by finite element analysis, showing good agreement.

Table I shows the frequency spectrum for one modified probe with a length of 350 µm, a width of 35 µm and a thickness of 2 µm, and an internal paddle length of 180 µm and a width of 27 µm, with the axis of rotation 197 µm from the base of the cantilever beam. The cantilever stiffness was determined using the thermal method, and the experimental value was compared to the prediction from finite element analysis. This method relies on the equipartition principle from classical thermodynamics to attempt to equate the mechanical fluctuations of cantilever with its thermal energy. Other methods to find the stiffness of the cantilever, such as utilizing nano-indentation, proved problematic because the modified cantilever is softer than 1 N/m. The error in the thermal method is 45% for the normal cantilever and 100% for the modified cantilever. The error comes from the assumptions that the cantilever geometry is rectangular and that a majority of the thermal energy in the cantilever is stored in the fundamental mode. Even with this error, the modified cantilever has a spring constant about one order of magnitude softer than the unmodified cantilever.

We produced additional cantilevers with a range of paddle widths and lengths and obtained their mode frequencies to compare to the finite element model. Table II shows the first two mode frequencies and the ratio between the two for a cantilever with a length of 350 µm, a width of 35 µm, and a thickness of 2 µm. The paddles were 75-235 µm in length and 10-29 µm in width. Finite element simulations predicted the device mode frequencies by interpolating between data points. The predictions showed that the experimental data agree well with the general contour of the models with less than 30% errors for all but two values. Deviations from the model are attributed to poor tolerances on commercial cantilever thicknesses, as well as FIB instrument alignment error. These data demonstrate that the model is valid for a wide range of paddle sizes, allowing for customization of frequency values and ratios.

Conclusion. This technique shows future promise in the many varied forms of contact atomic force microscopy. These AFM probes demonstrate the ability to tune the second mode frequency to the first, while additionally lowering the probe stiffness. The resulting shape of the modes altered the optical measurement of deflection, so the internal paddle had the same slope along its length as its axis of rotation for the first two modes. Focused ion beam etching allowed simple fabrication with commercially available cantilevers, although once the appropriate design is identified such cantilevers could easily be batch fabricated. The fabricated cantilever characteristics compared well with finite element simulations. This technique to tailor $f_2/f_1$ over a large range is independent of the value of $f_1$ and thus it could be applied to cantilevers of arbitrary stiffness for many applications of dynamic contact mode AFM.

TABLE I

Frequency spectra data for unmodified and modified cantilevers.

| | | $f_1$ (kHz) | $f_2$ (kHz) | $f_3$ (kHz) | k (N/m) |
|---|---|---|---|---|---|
| Modified Probe | Model | 50 | 90 | 323 | 0.10 |
| | Experiment | 53 | 87 | 335 | 0.05 |
| Original Probe | Model | 106 | 345 | 717 | 0.29 |
| | Experiment | 115 | 333 | — | 0.20 |

TABLE II

First two modes across a range of paddle widths and lengths.

| Paddle Length (µm) | Paddle Width (µm) | Experimental Data | | | Model Interpolation | | | Error | | |
|---|---|---|---|---|---|---|---|---|---|---|
| | | $f_1$ (kHz) | $f_2$ (kHz) | $f_1/f_2$ | $f_1$ (kHz) | $f_2$ (kHz) | $f_1/f_2$ | $f_1$ (%) | $f_2$ (%) | $f_1/f_2$ (%) |
| 75 | 10 | 108 | 354 | 3.28 | 99 | 335 | 3.39 | 9.09 | 5.67 | 3.24 |
| 75 | 29 | 64 | 250 | 3.91 | 61 | 204 | 3.33 | 4.92 | 22.5 | 17.4 |
| 155 | 10 | 93 | 231 | 2.48 | 93 | 266 | 2.85 | 0.00 | 13.2 | 13.0 |
| 155 | 29 | 56 | 101 | 1.80 | 46 | 90 | 1.98 | 21.7 | 12.2 | 9.09 |
| 235 | 10 | 107 | 139 | 1.30 | 87 | 87 | 1.85 | 23.0 | 59.8 | 29.7 |
| 235 | 29 | 38 | 51 | 1.34 | 32 | 32 | 1.62 | 18.8 | 59.4 | 17.3 |

FIG. 3A: Schematic of the cantilever having an internal paddle. The paddle design reduces the high stress locations of the second mode shape while retaining as much original mass as possible. FIG. 3B: Scanning electron microscope image of the modified cantilever fabricated using focused ion beam etching.

FIG. 4: First four mode shapes for the internal torsion paddle cantilever fixed at the base and simply supported at the probe tip. The shape of the mode shows where high stress locations are, as well as providing insight into how the laser deflection system of the AFM will detect the probe response along the probe length.

FIG. 23: First and second finite element mode shape frequencies for an internal paddle cantilever 350 μm long, 35 μm wide, and 2 μm thick as a function of internal paddle length and width. a) The first mode shape frequency as a function of paddle width and length. b) The second mode shape frequency as a function of paddle width and length. c) The ratio of the second mode frequency to the first.

FIG. 24: Third and fourth finite element mode shape frequencies for a cantilever 350 μm long, 35 μm wide, and 2 μm thick as a function of the internal paddle length and width. a) The third mode shape frequency as a function of paddle width and length. b) The ratio of the third mode frequency to the first. c) The fourth mode shape frequency as a function of paddle width and length. d) The ratio of the fourth mode frequency to the first.

FIG. 25: The experimental setup for detecting cantilever frequency response. A piezoceramic actuates the cantilever in contact, and the excitation deflection is captured using a laser and a photodiode. The AFM controller integrated the laser input to the photodiode over time to produce the resonance spectra.

FIG. 26: Frequency response of an internal paddle cantilever over the first two modes with the detection laser at the end of the cantilever and on the internal paddle. The first mode is undetected when the laser is on the paddle, which agrees with intuition from the finite element mode shapes. The displacements are typically in the nm range, and are normalized here FIG. 27: Frequency spectrum for both a modified (mod) cantilever and the original cantilever. The original cantilever has mode frequencies at 114.9 and 333.1 kHz, with an $f_2/f_1$ ratio of 2.90. The modified cantilever has mode frequencies at 53.1, 86.9, and 334.7 kHz, with an $f_2/f_1$ ratio of 1.64. The displacements are typically in the nm range, and are normalized here.

EXAMPLE 2

Infrared Absorbance Measurements Using Microcantilevers Having Free Resonators

Figure 28:
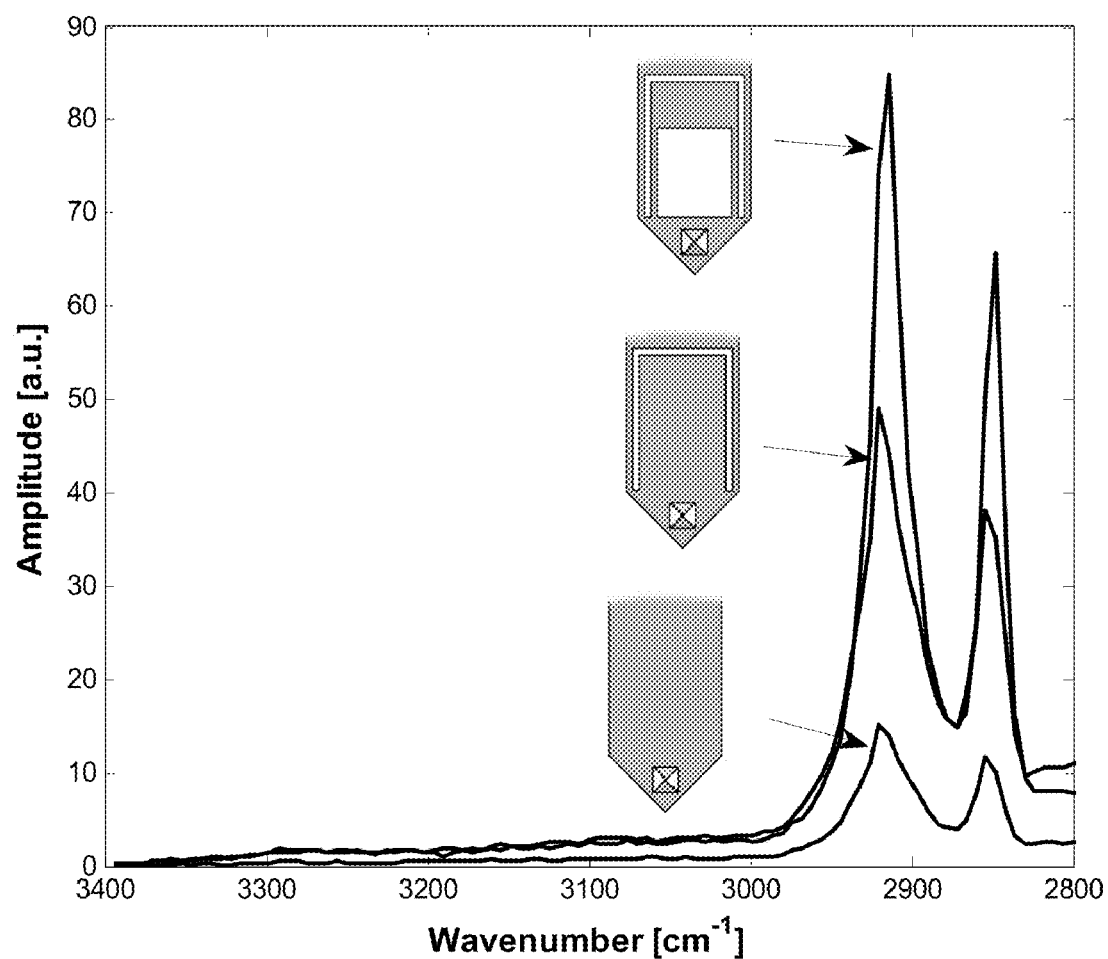
FIGS. 28 and 29 show infrared absorption spectra for polyethylene determined using methods described herein.

Using an experimental setup shown in FIG. 2B, infrared absorption spectra were obtained for a polyethylene (PE) sample using three different microcantilever probes. FIG. 28 shows the infrared absorption spectrum obtained for each of the microcantilever probes: an unmodified cantilever (bottom), a single internal resonator (middle) and a single internal resonator with an opening (top).

Figure 29:
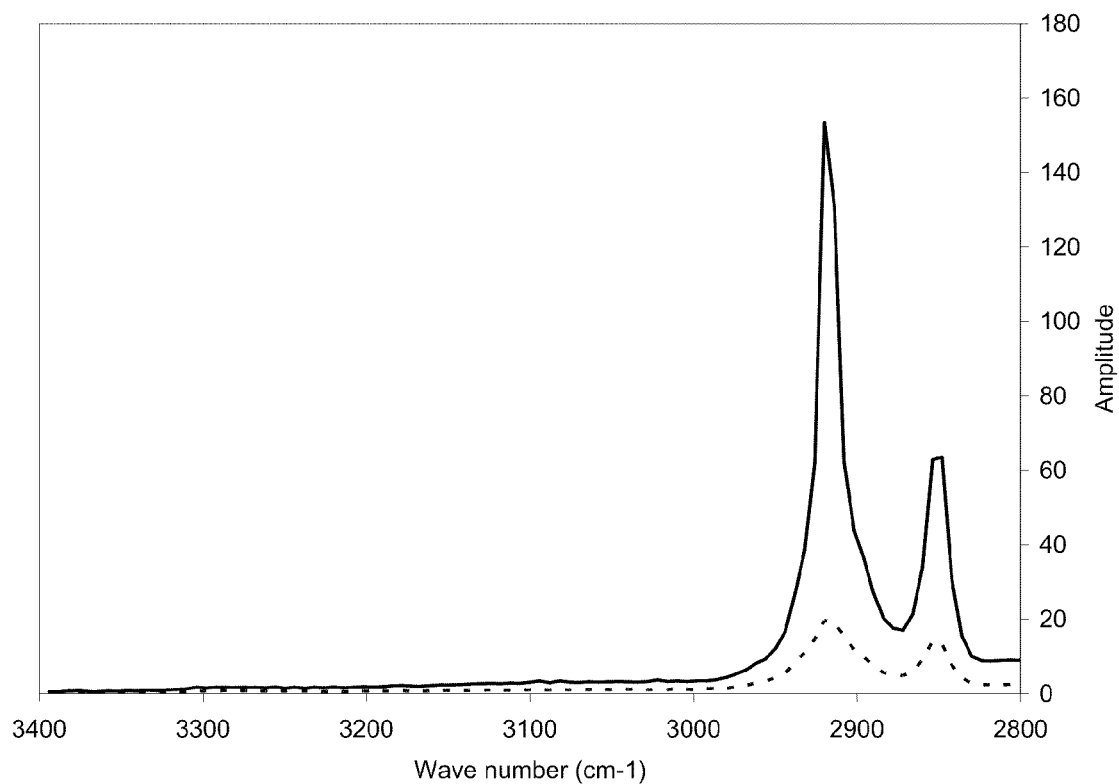

FIG. 29 shows results of PE infrared absorption as measured by additional microcantilever embodiments, comparing spectra obtained with conventional (unmodified) AFM cantilever (dashed line) and a FIB cut probe. The modified probe has a spectral response almost 8× higher than the unmodified probe, and signal-to-noise ratio of 80 vs. 27 for the unmodified probe.

Figure 30:
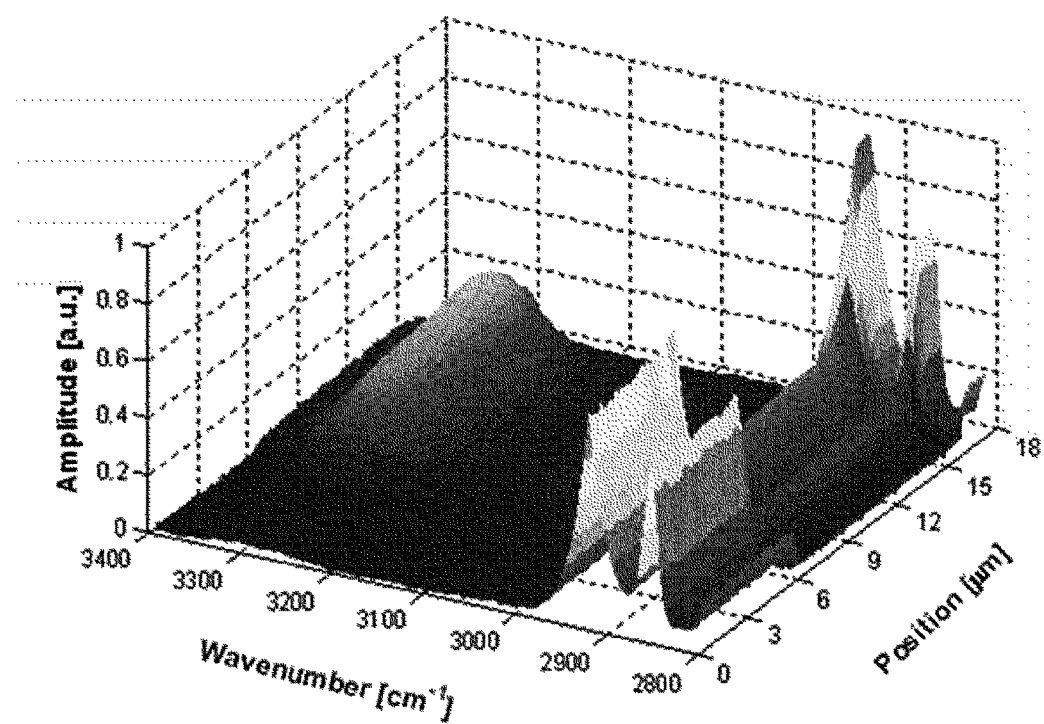
FIG. 30 shows frequency spectra of a layered nylon/polyethylene sample as a function of position.

A horizontally layered nylon/polyethylene sample was prepared and used for surface absorbance mapping experiments. Absorption spectra were obtained as a function of tip/sample position. FIG. 30 shows results of these experiments, showing infrared absorbances due to the presence of specific molecular species. The three dimensional spectra show absorbance amplitude (in arbitrary units) as a function of wavenumber and position. Between 0 and approximately 6 μm, absorption by polyethylene dominates. Between approximately 6 and approximately 16 μm, absorption by nylon dominates. At positions greater than approximately 16 μm, absorption by polyethylene again dominates.

Figure 31:
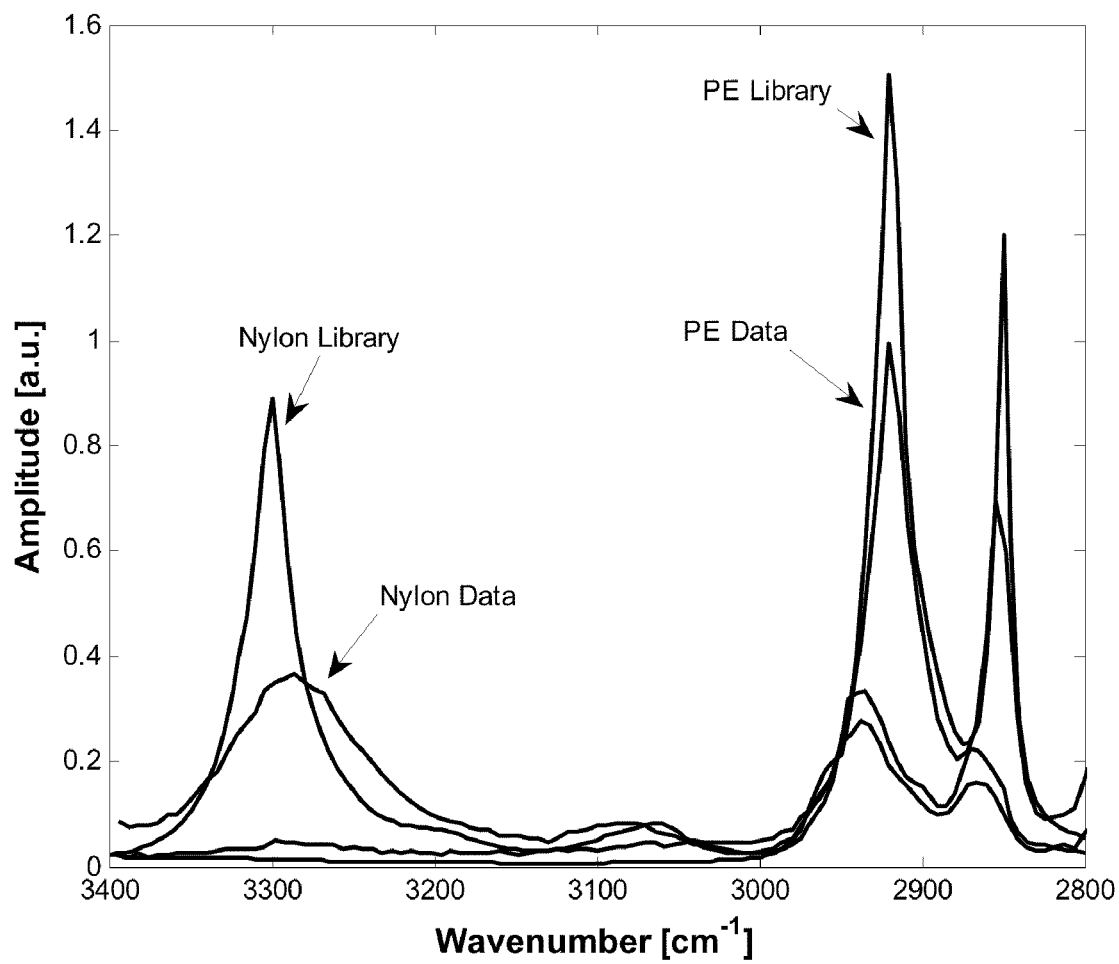
FIG. 31 shows experimental and reference infrared spectra nylon and polyethylene.

FIG. 31 shows absorption spectra for a nylon samples and polyethylene samples. Plots labeled Nylon Data and PE Data are spectra experimentally obtained using a microcantilever with an internal resonator. Plots labeled Nylon Library and PE Library are reference spectra obtained using FTIR for nylon and polyethylene, respectively, for comparison with the features observed in the experimental spectra. The two peaks at 2854 and 2920 $cm^{-1}$ show C—H stretch peaks for PE. Nylon has an N—H stretch peak near 3286 $cm^{-1}$.

Figure 32:
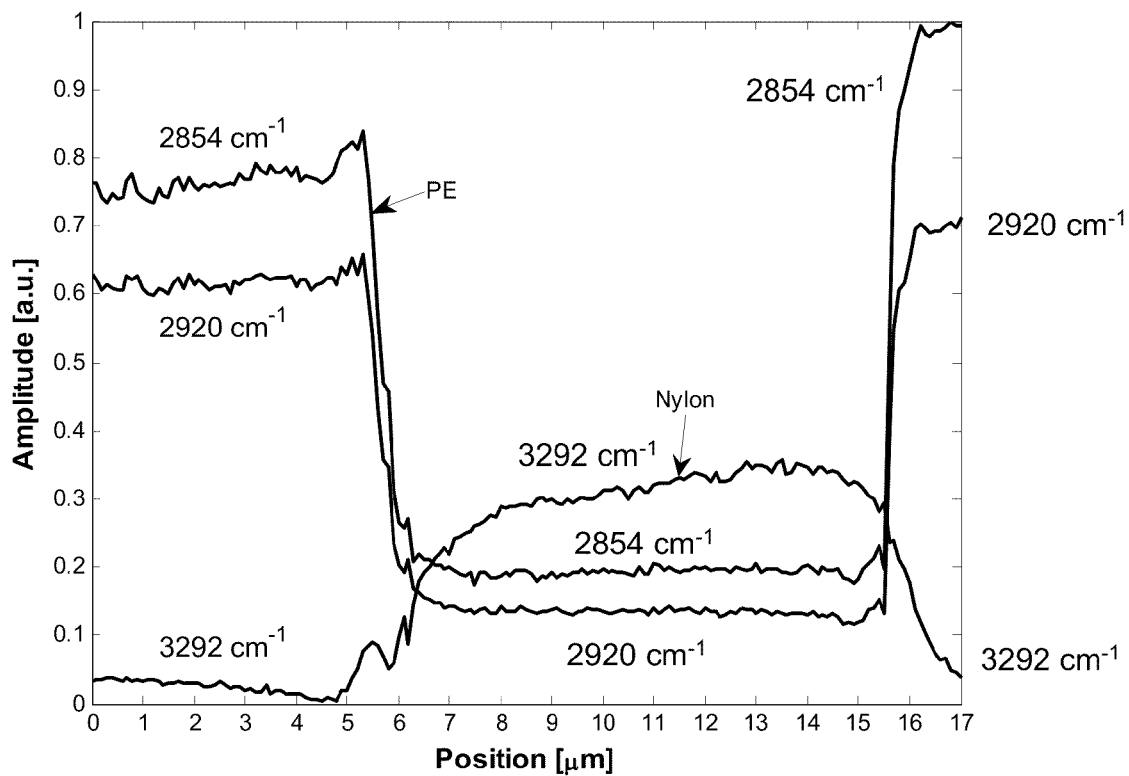
FIG. 32 shows absorbance as a function of position for three different excitation frequencies for the layered nylon/polyethylene sample.

FIG. 32 provides plots of absorption amplitude on the nylon/PE surface as a function of position for three different frequencies: 2854 $cm^{-1}$, 2920 $cm^{-1}$ and 3292 $cm^{-1}$. Nylon is present from about 6 μm to about 16 μm. PE is present from 0 to about 6 μm and from about 15.5 μm to 17 μm. The plots resolve a material boundary to 100 nm between 15.5-15.6 microns.

Figure 33:
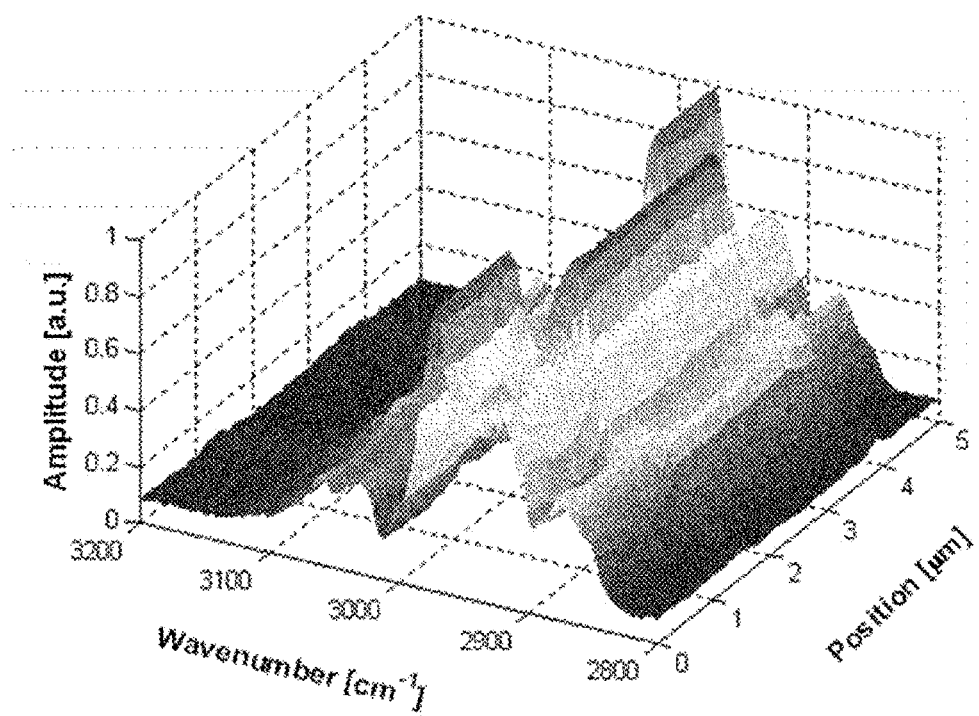
FIG. 33 shows frequency spectra of a layered acrylonitrile-butadiene-styrene/polycarbonate (ABS/PC) sample as a function of position.

A layered acrylonitrile-butadiene-styrene/polycarbonate (ABS/PC) sample was prepared and used for surface absorbance mapping experiments. Absorption spectra were obtained as a function of tip/sample position. FIG. 33 shows results of these experiments, showing infrared absorbances due to the presence of specific molecular species. The three dimensional spectra show absorbance amplitude (in arbitrary units) as a function of wavenumber and position.

Figure 34:
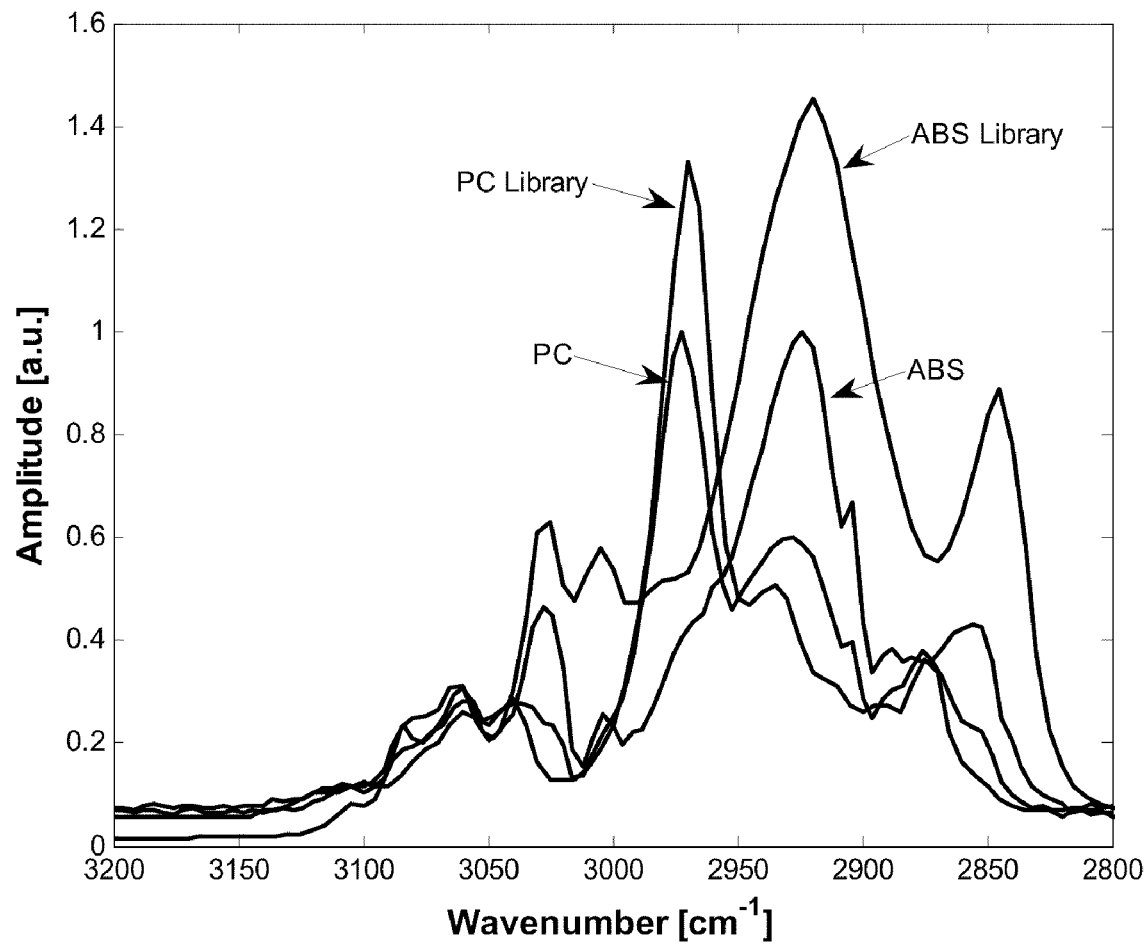
FIG. 34 shows experimental and reference infrared spectra of ABS and PC.

FIG. 34 shows absorption spectra for ABS and PC samples. Plots labeled PC and ABS are spectra experimentally obtained using a microcantilever with an internal resonator. Plots labeled PC Library and ABS Library are reference spectra obtained using FTIR for PC and ABS, respectively, for comparison with the features observed in the experimental spectra. ABS has an absorption near 2938 $cm^{-1}$ and PC has an absorption near 2984 $cm^{-1}$.

Figure 35:
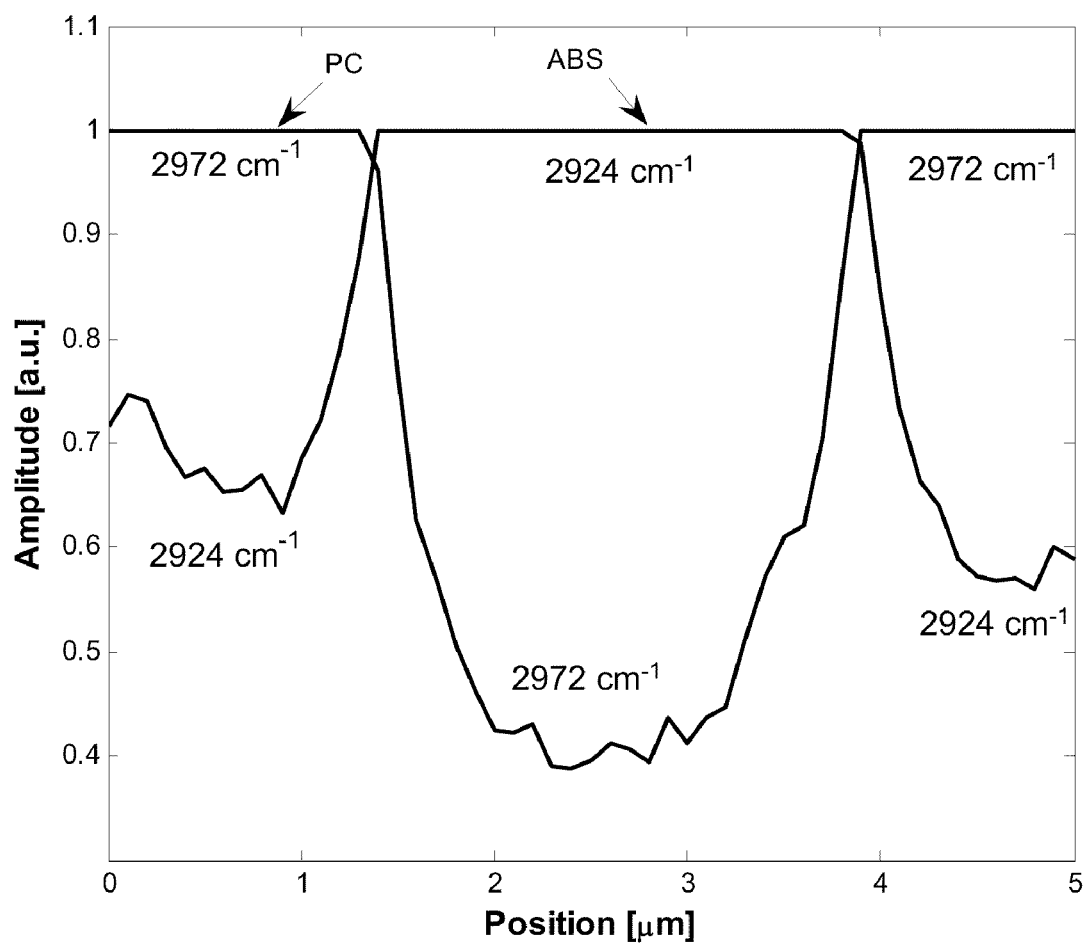
FIG. 35 shows absorbance as a function of position for two different excitation frequencies for the layered ABS/PC sample.

FIG. 35 provides plots of absorption amplitude on the ABS/PC surface as a function of position for two different frequencies: 2924 $cm^{-1}$ and 2972 $cm^{-1}$. PC is present from 0 to about 1.37 μm and from about 3.87 μm to 5 μm. ABS is present from 1.37 μm to about 3.87 μm.

Figure 36A:
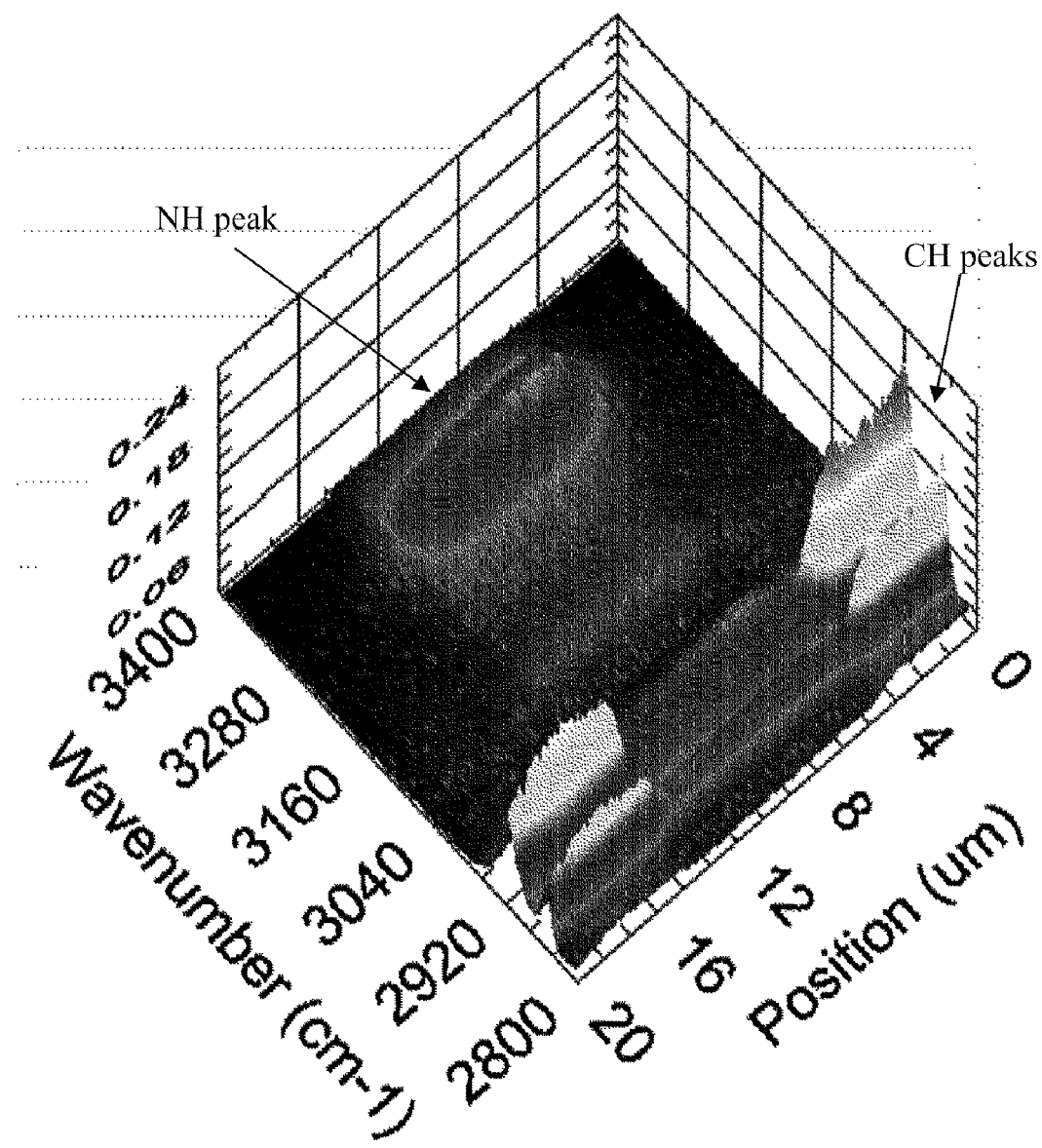
FIG. 36A shows an array of experimental infrared spectra taken across a polyethylene/nylon/polyethylene sandwich structure.

FIG. 36A shows an array of spectra taken across a polyethylene/nylon/polyethylene sandwich structure showing infrared absorbance data obtained using microcantilever probes with internal resonators (nanoIR).

Figure 36B:
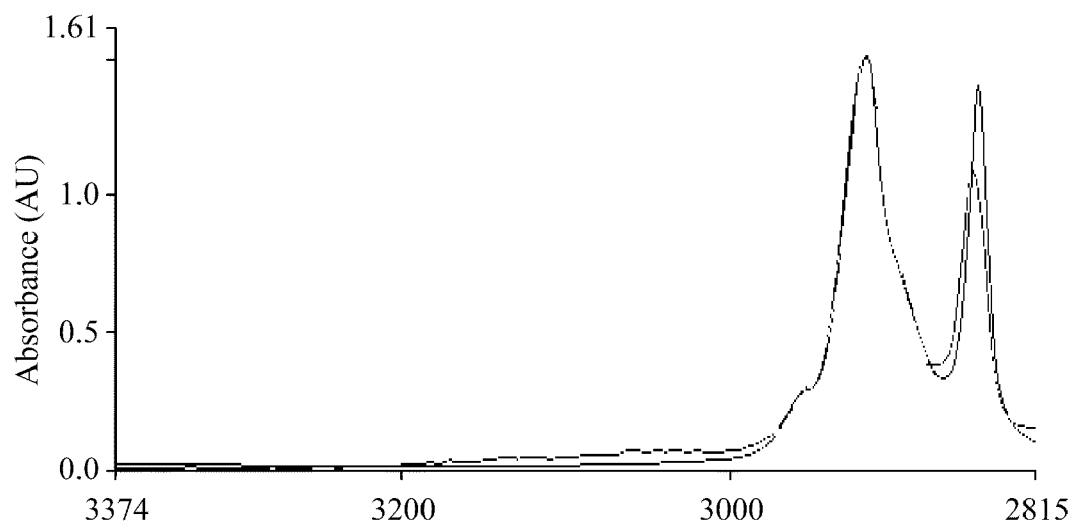
FIG. 36B shows reference and experimentally determined infrared spectra for polyethylene (top) and nylon (bottom).
Figure 36B:
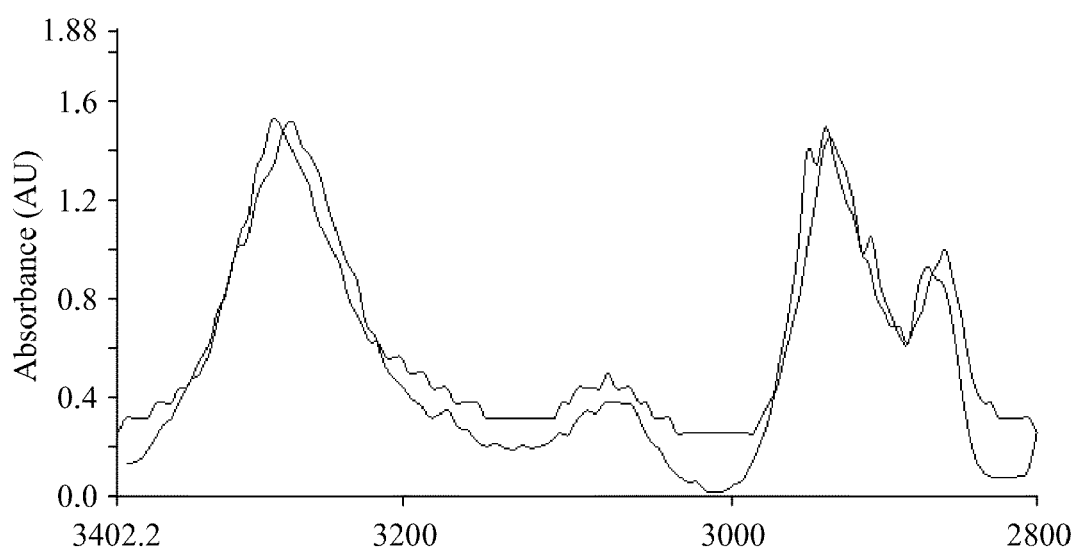

FIG. 36B provides a comparison between nanoIR spectra and conventional FTIR library spectra for PE (top) and nylon (bottom).

Figure 36C:
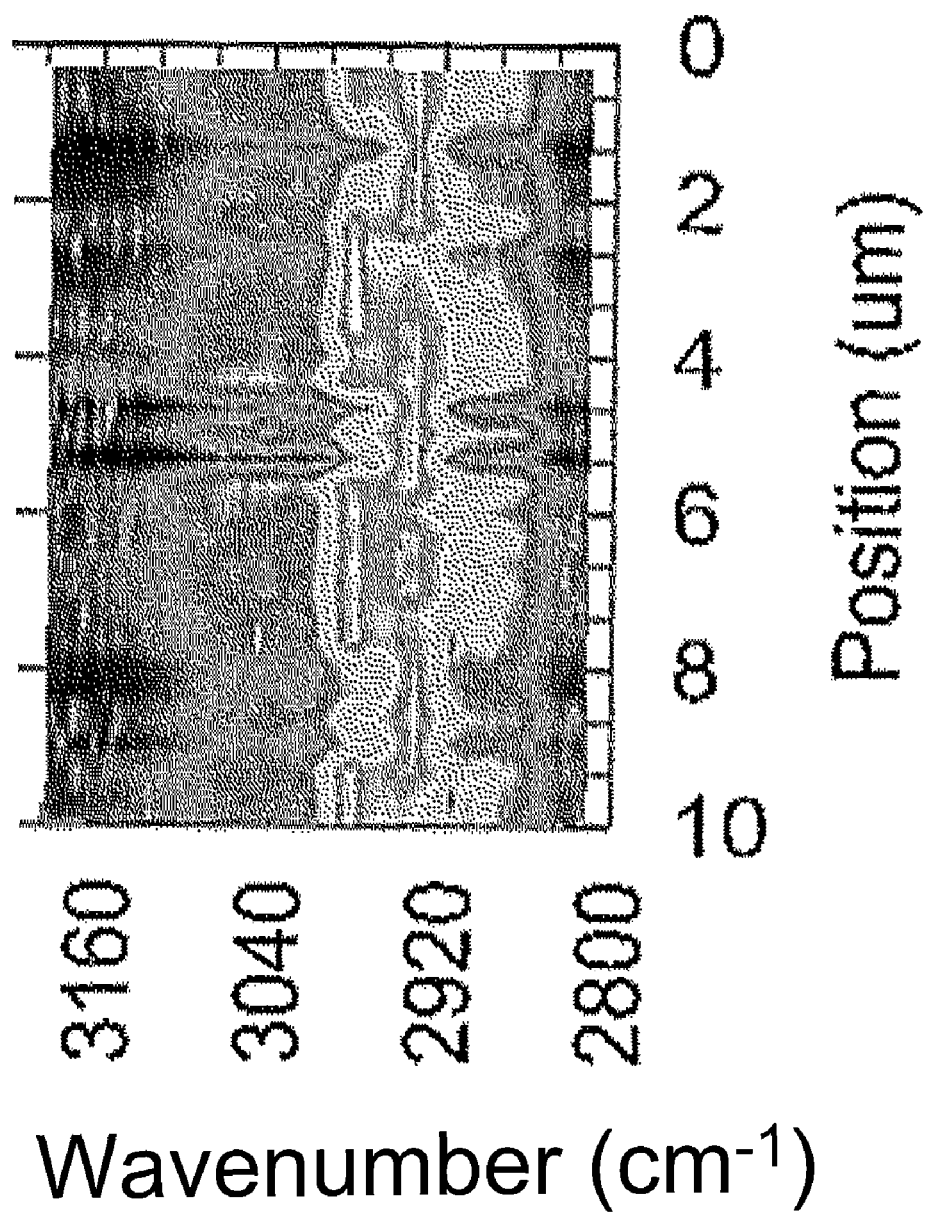
FIG. 36C provides a top down view of an array of experimentally determined infrared spectra on a polycarbonate/ABS polymer blend.

FIG. 36C provides a top down view of an array of spectra on a polycarbonate/ABS polymer blend. Note the shifts in the location of the C—H peaks in the 2900-3000 $cm^{-1}$ range as the nanoIR probe moves across different material domains.

REFERENCES

U.S. Pat. Nos. 6,452,170, 6,785,041, 6,935,167, 7,404, 314.
U.S. Patent Application Publications US 2006/0222047, US 2008/0283755, US 2008/0295583, US 2009/0013770.

International Patent Application Publication WO 2006/107991.

U.S. patent application Ser. No. 12/315,859.

G. Binnig, C. F. Quate, and C. Gerber, "Atomic force microscope," Phys. Rev. Lett. 56 (9), 930-933 (1986).

Q. Zhong, D. Inniss, K. Kjoller et al., "Fractured polymer silica fiber surface studied by tapping mode atomic-force microscopy," Surf. Sci. 290 (1-2), L688-L692 (1993).

U. Rabe, K. Janser, and W. Arnold, "Vibrations of free and surface-coupled atomic force microscope cantilevers: Theory and experiment," Rev. Sci. Instrum. 67 (9), 3281-3293 (1996).

A. Gruverman, O. Auciello, and H. Tokumoto, "Scanning force microscopy for the study of domain structure in ferroelectric thin films," Journal of Vacuum Science & Technology B: Microelectronics and Nanometer Structures 14 (2), 602-605 (1996).

J. Varesi and A. Majumdar, "Scanning Joule expansion microscopy at nanometer scales," Applied Physics Letters 72 (1), 37-39 (1998).

C. Daniel Frisbie, F. Rozsnyai, Aleksandr Noy et al., "Functional group imaging by chemical force microscopy," Science v265 (n5181), p2071 (2074) (1994).

U. Rabe, S. Amelio, E. Kester et al., "Quantitative determination of contact stiffness using atomic force acoustic microscopy," Ultrasonics 38 (1-8), 430-437 (2000).

R. W. Stark, T. Drobek, and W. M. Heckl, "Tapping-mode atomic force microscopy and phase-imaging in higher eigenmodes," Applied Physics Letters 74 (22), 3296-3298 (1999).

G. Rinaldi, M. Packirisamy, and I. Stiharu, "Frequency tuning AFM optical levers using a slot," Microsyst. Technol. 14 (3), 361-369 (2008).

G. Rinaldi, M. Packirisamy, and I. Stiharu, "Tuning the dynamic behaviour of cantilever MEMS based sensors and actuators," Sens. Rev. 27 (2), 142-150 (2007).

B. Zeyen and K. L. Turner, "Design and test of a novel higher harmonic imaging AFM probe with a dedicated second cantilever for harmonic amplification," Transducers and Eurosensors '07-14th International Conference on Solid-State Sensors, Actuators and Microsystems, 1545-1548 (2007).

S. Sadewasser, G. Villanueva, and J. A. Plaza, "Special cantilever geometry for the access of higher oscillation modes in atomic force microscopy," Applied Physics Letters 89 (3), 3 (2006).

O. Sahin, G. Yaralioglu, R. Grow et al., "High-resolution imaging of elastic properties using harmonic cantilevers," Sensors and Actuators A: Physical 114 (2-3), 183-190 (2004).

A. R. Hodges, K. M. Bussmann, and J. H. Hoh, "Improved atomic force microscope cantilever performance by ion beam modification," Rev. Sci. Instrum. 72 (10), 3880-3883 (2001).

A. Maali, T. Cohen-Bouhacina, C. Jai et al., "Reduction of the cantilever hydrodynamic damping near a surface by ion-beam milling," Journal of Applied Physics 99 (2), 024908 (2006).

Huiling Li, Yan Chen, and Lanhong Dai, "Concentrated-mass cantilever enhances multiple harmonics in tapping-mode atomic force microscopy," Applied Physics Letters 92 (15), 151903 (2008).

S. Fernando, M. Austin, and J. Chaffey, "Improved cantilever profiles for sensor elements," J. Phys. D-Appl. Phys. 40 (24), 7652-7655 (2007).

R. W. Stark, "Optical lever detection in higher eigenmode dynamic atomic force microscopy," Rev. Sci. Instrum. 75 (11), 5053-5055 (2004).

H. J. Butt and M. Jaschke, "Calculation of thermal noise in atomic force microscopy," Nanotechnology 6 (1), 1-7 (1995).

J. D. Holbery, V. L. Eden, M. Sarikaya et al., "Experimental determination of scanning probe microscope cantilever spring constants utilizing a nanoindentation apparatus," Rev. Sci. Instrum. 71 (10), 3769-3776 (2000).

Beyder et al., "Reducing probe dependent drift in atomic force microscope with symmetrically supported torsion levers," Rev. Sci Instrum. 77, 0056105 (2006).

Dazzi et al., "Subwavelength infrared spectromicroscopy using an AFM as a local absorption sensor," Infrared Physics & Technology, 49, 113-121, (2006).

A. Dazzi, "Sub-100 nm infrared Spectroscopy and Imaging based on a near-field photo-thermal technique ("PTIR")," Biomedical vibrational spectroscopy, J. Wiley ed., 291 (2008).

Sadewasser et al., "Modified atomic force microscopy cantilever design to facilitate access of higher modes of oscilllation," Rev. Sci Instrum. 77, 073703 (2006).

Dazzi et al., "Theoretical study of an absorbing sample in infrared near-field spectromicroscopy," Optics Communications 235, 351-360 (2004).

Dazzi et al., "Local infrared microspectroscopy with sub-wavelength spatial resolution with an atomic force microscope tip used as a photothermal sensor," Optics Letters, 30, 18, 2388-2390 (2005).

Brown et al.; "Cantilever-in-Cantilever Micromachined Pressure Sensors Fabricated in CMOS Technology," Proc. 1999 IEEE Can. Conf. on Elec. and Comp. Eng., 1686-1691 (1999).

Zeyen et al., "Preamplifying cantilevers for dynamic atomic force microscopy," Appl. Phys. Lett., 94, 103507 (2009).

Zeyen et al., "Preamplifying cantilevers for contact resonance mode imaging," Solid-State Sensors, Actuators, and Microsystems Workshop, Hilton Head Island, S.C. (2008).

Dazzi et al., "Analysis of nano-chemical mapping performed by an AFM-based ("AFMIR") acousto-optic technique," Ultramicroscopy, 107, 12, 1194-1200 (2007).

Statements Regarding Incorporation By Reference And Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for sensing a pulsed force, the method comprising the steps of:
    providing a sample having a surface;
    providing a microcantilever comprising a fixed end, a non-fixed end with a tip and a freely resonating portion, wherein the tip is in contact with the surface;
    providing a pulsed force between the sample and the tip; and
    detecting a deflection of the freely resonating portion of the microcantilever, wherein the freely resonating portion of the microcantilever vibrates independent of friction between the tip and the surface, thereby sensing a response of the microcantilever to the pulsed force.

2. The method of claim 1, further comprising a step of providing a plurality of relative translations between the tip and the surface, thereby positioning the tip in contact with a plurality of locations of the surface.

3. The method of claim 2, further comprising repeating the steps of providing a pulsed force between the sample and the tip and detecting a deflection of the freely resonating portion for each of the plurality of locations.

4. The method of claim 1, further comprising a step of exposing at least a portion of the sample to a pulse of electromagnetic radiation.

5. The method of claim 4, wherein the electromagnetic radiation comprises infrared radiation and the pulsed force is the result of thermal expansion of the sample due to absorption of infrared radiation by at least a portion of the sample.

6. The method of claim 1, wherein the microcantilever is excited in one or more vibrational modes.

7. The method of claim 1, wherein a quality factor for one or more vibrational modes of the microcantilever is selected over the range of 10 to 1000, thereby amplifying detection of the pulsed force between the sample and the tip.

8. The method of claim 4, further comprising a step of sensing the response of the cantilever as a function of wavelength of incident electromagnetic radiation.

9. The method of claim 1, further comprising a step of sensing the response of the cantilever at a plurality of locations on the sample.

10. The method of claim 9, wherein the responses of the cantilever as a function of relative tip-sample position are indicative of compositional variations in the sample over the plurality of locations.

11. The method of claim 1, wherein the freely resonating portion comprises one or more internal resonators.

12. The method of claim 1, wherein the freely resonating portion of the microcantilever comprises a first internal resonator having a fixed end and a free end.

13. The method of claim 12, wherein the freely resonating portion of the microcantilever comprises a second internal resonator having a fixed end and a free end.

14. The method of claim 13, wherein the second internal resonator is positioned substantially within the first internal resonator.

15. The method of claim 1, wherein the pulsed force between the tip and the surface is a transient force.

16. The method of claim 1, wherein the pulsed force between the tip and the surface has a duration selected over the range of 0 to 100 µs.

17. The method of claim 16, wherein the pulsed force between the tip and the surface has a duration selected over the range of 1 to 100 ns.

18. The method of claim 17, wherein the pulsed force between the tip and the surface has a duration selected over the range of 1 to 100 µs.

19. The method of claim 1, wherein the tip is in contact with a submicron region of the surface, wherein the step of providing a pulsed force comprises exposing at least the submicron region of the surface to a pulse of infrared electromagnetic radiation and wherein the response of the microcantilever is indicative of absorption of infrared electromagnetic radiation by the submicron region of the surface.

20. The method of claim 1, wherein the pulsed force between the sample and the tip originates from the sample.

21. The method of claim 20, wherein the pulsed force is the result of thermal expansion of the sample due to absorption of infrared radiation by at least a portion of the sample.

22. A method for sensing an infrared absorption of a submicron region of a sample, the method comprising the steps of:
   providing a sample having a surface;
   providing a microcantilever comprising a fixed end, a non-fixed end with a tip and a freely resonating portion, wherein the tip is in contact with a submicron region of the surface;
   exposing at least the submicron region of the surface in contact with the tip to a pulse of infrared electromagnetic radiation; and
   detecting a deflection of the freely resonating portion of the microcantilever, wherein the freely resonating portion of the microcantilever vibrates independent of friction between the tip and the surface, thereby sensing absorption of infrared electromagnetic radiation by the submicron region of the sample.

23. The method of claim 22, further comprising a step of providing a plurality of relative translations between the tip and the surface, thereby positioning the tip in contact with a plurality of locations of the surface.

24. The method of claim 23, further comprising repeating the steps of exposing at least the submicron region of the surface in contact with the tip to a pulse of infrared electromagnetic radiation and detecting a deflection of the freely resonating portion for each of the plurality of locations.

25. The method of claim 22, wherein the pulse of infrared electromagnetic radiation comprises a pulse of infrared electromagnetic radiation of a first wavelength, thereby sensing absorption of infrared electromagnetic radiation of the first wavelength by a submicron region of the sample.

26. The method of claim 25, further comprising repeating the exposing and detecting steps for a plurality of submicron regions of the sample to create a chemical map of the sample, wherein the chemical map of the sample is a plot indicating the composition of the surface as a function of relative translation between the tip and the sample based on the absorption of infrared radiation from the plurality of submicron regions of the sample.

27. The method of claim 22, further comprising the steps of exposing at least the submicron region of the surface in contact with the tip to a plurality of pulses of infrared electromagnetic radiation over a range of wavelengths and detecting a deflection of the freely resonating portion, thereby determining an infrared absorption spectrum of a submicron region of the sample.

28. The method of claim 22, wherein the step of exposing at least the submicron region of the surface in contact with the tip to a pulse of infrared electromagnetic radiation results in a force being applied to the tip by the sample.

29. The method of claim 28, wherein the force is the result of thermal expansion of the sample due to absorption of infrared electromagnetic radiation by at least a portion of the sample.

30. A device for sensing a pulsed force, the device comprising:
   a surface;
   a microcantilever having a fixed end, a non-fixed end with a tip and a freely resonating portion, wherein the tip is in contact with the surface;
   a force generator configured for providing a pulsed force between the tip and the surface; and
   a detector, configured for sensing a deflection of the microcantilever in response to the pulsed force, wherein the freely resonating portion of the microcantilever vibrates independent of friction between the tip and the surface.

31. The device of claim 30, wherein electromagnetic radiation from a source is directed on to the microcantilever, wherein at least a portion of the electromagnetic radiation is reflected onto the detector.

32. The method of claim 30, wherein the pulsed force between the tip and the sample originates from the sample.

33. The method of claim 32, wherein the pulsed force is the result of thermal expansion of the sample due to absorption of infrared radiation by at least a portion of the sample.

34. A device for sensing absorption of electromagnetic radiation by a submicron region of a sample, the device comprising:
   a sample;
   a microcantilever having a fixed end, a non-fixed end with a tip and a freely resonating portion, wherein the tip is in contact with the surface;
   a source of electromagnetic radiation, positioned to direct a beam of electromagnetic radiation at a surface of the sample; and
   a detector, configured for detecting a deflection of the microcantilever in response to absorption of electromagnetic radiation from the first source by the surface, wherein the freely resonating portion of the microcantilever vibrates independent of friction between the tip and the surface.

\* \* \* \* \*

UNITED STATES PATENT AND TRADEMARK OFFICE
CERTIFICATE OF CORRECTION

PATENT NO. : 8,387,443 B2
APPLICATION NO. : 12/558150
DATED : March 5, 2013
INVENTOR(S) : William P. King et al.

Page 1 of 1

It is certified that error appears in the above-identified patent and that said Letters Patent is hereby corrected as shown below:

In the Claims:

In claim 18, column 24, line 52, replace "claim 17" with --claim 16--.

Signed and Sealed this
Eleventh Day of June, 2013

Teresa Stanek Rea
*Acting Director of the United States Patent and Trademark Office*